United States Patent
Kolkman et al.

(10) Patent No.: US 12,448,626 B2
(45) Date of Patent: *Oct. 21, 2025

(54) **COMPOSITIONS AND METHODS FOR INCREASED PROTEIN PRODUCTION IN *BACILLUS LICHENIFORMIS***

(71) Applicant: DANISCO US INC., Palo Alto, CA (US)

(72) Inventors: Marc Anton Bernhard Kolkman, Oegstgeest (NL); Steven D. Doig, Wilmington, DE (US); Ryan L. Frisch, Newark, DE (US); Hongxian He, Wilmington, DE (US); Frank Wouter Koopman, Utrecht (NL); Chris Leeflang, Twisk (NL)

(73) Assignee: DANISCO US INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/524,856

(22) Filed: Nov. 30, 2023

(65) Prior Publication Data

US 2024/0182914 A1    Jun. 6, 2024

Related U.S. Application Data

(62) Division of application No. 16/486,892, filed as application No. PCT/US2018/019140 on Feb. 22, 2018, now Pat. No. 11,866,713.

(60) Provisional application No. 62/463,268, filed on Feb. 24, 2017.

(51) Int. Cl.
*C12N 15/75* (2006.01)
*C07K 14/32* (2006.01)
*C12P 21/02* (2006.01)

(52) U.S. Cl.
CPC .............. *C12N 15/75* (2013.01); *C07K 14/32* (2013.01); *C12P 21/02* (2013.01)

(58) Field of Classification Search
CPC .......... C12N 15/75; C07K 14/32; C12P 21/02
See application file for complete search history.

(56) References Cited

U.S. PATENT DOCUMENTS 7,494,798 B2 *  2/2009  Berka .................... C12Q 1/689
                                                    435/320.1

FOREIGN PATENT DOCUMENTS

| JP | 2007074933 A | * | 3/2007 |
| WO | 200229113 A2 | | 4/2002 |
| WO | 2008066931 A2 | | 6/2008 |

OTHER PUBLICATIONS

Degering et al. 2010 Optimization of Protease Secretion in Bacillus subtilis and Bacillus licheniformis by Screening of Homologous and Heterologous Signal Peptides Applied and Environmental Microbiology, p. 6370-6376 vol. 76, No. 19 (Year: 2010).*
International Search Report from PCT Application No. PCT/US2018/019140 dated Jun. 11, 2018, 5 pages.
Written Opinion from PCT Application No. PCT/US2018/019140 dated Jun. 11, 2018, 6 pages.
International Preliminary Report on Patentability from PCT/US2018/019140 dated Aug. 27, 2019, 7 pages.
Dischinger et al., "Production of the Novel Two-Peptide Lantibiotic Lichenicidin by Bacillus licheniformis DSM 13" PLoS One 4(8). 2009, e6788.
Genbank, AE017333.1 Bacillus licheniformis DSM 13 = ATCC 14580, complete genome, 2015.
Genbank: AAU42468.1 HTH-type transcriptional regulator RghR [Bacillus licheniformis DSM 13 = ATCC 14580], 2015.
Hayashi et al., "Bacillus subtilis RghR (YvaN) represses rapG and rapH, which encode inhibitors of expression of the srfA operon", Molecular Microbiology 59 (6), 1714-1729, 2006.
Veith et al., "The Complete Genome Sequence of Bacillus licheniformis DSM13, an Organism with Great Industrial Potential", J Mol Microbial Biotechnol, vol. 7, 2004, pp. 204-211.

* cited by examiner

*Primary Examiner* — Jennifer Dunston
*Assistant Examiner* — Tiffany Nicole Grooms

(57) ABSTRACT

The present disclosure is generally related to compositions and methods for obtaining *Bacillus licheniformis* cells/strains having increased protein production capabilities. Certain embodiments of the disclosure are related to genetically modified *Bacillus licheniformis* cells/strains derived from parental *B. licheniformis* cells/strains comprising a variant rghR2 gene.

4 Claims, 9 Drawing Sheets

Specification includes a Sequence Listing.

```
                         1                                                    50
RghR2 Bra7     (1)   MAMTRFGERLKELREQRSLSVNQLAMYAGVSAAAISRAAAISRIENGHRG
RghR2 DSM13    (1)   MAMTRFGERLKELREQRSLSVNQLAMYAGVSAAAISR------IENGHRG
  Consensus    (1)   MAMTRFGERLKELREQRSLSVNQLAMYAGVSAAAISR      IENGHRG 51                                                  100
RghR2 Bra7    (51)   VPKPATIRKLAEALKMPYEQLMDIAGYMRADEIREQPRGYVTMQEIAAKH
RghR2 DSM13   (45)   VPKPATIRKLAEALKMPYEQLMDIAGYMRADEIREQPRGYVTMQEIAAKH
  Consensus   (51)   VPKPATIRKLAEALKMPYEQLMDIAGYMRADEIREQPRGYVTMQEIAAKH 101                                   140
RghR2 Bra7   (101)   GVEDLWLFKPEKWDCLSREDLLNLEQYFHFLVNEAKKRQS
RghR2 DSM13   (95)   GVEDLWLFKPEKWDCLSREDLLNLEQYFHFLVNEAKKRQS
  Consensus  (101)   GVEDLWLFKPEKWDCLSREDLLNLEQYFHFLVNEAKKRQS
```

FIG. 1

COMPOSITIONS AND METHODS FOR INCREASED PROTEIN PRODUCTION IN BACILLUS LICHENIFORMIS

CROSS-REFERENCE TO RELATED APPLICATIONS

The present application is a divisional of U.S. patent application Ser. No. 16/486,892, filed Aug. 19, 2019, which is a U.S. National Stage Application under 35 U.S.C. § 371 of International Application No. PCT/US2018/019140, filed Feb. 22, 2018, which claims priority to U.S. Provisional Patent Application Ser. No. 62/463,268, filed Feb. 24, 2017, all of which are hereby incorporated by reference in their entirety.

FIELD

The present disclosure is generally related to the fields of bacteriology, microbiology, genetics, molecular biology, enzymology, industrial protein production the like. More particularly, the present disclosure is related to compositions and methods for obtaining *Bacillus licheniformis* cells/strains (e.g., a protein production host; cell factory) having increased protein production capabilities. Thus, certain embodiments of the disclosure are related to modified *B. licheniformis* cells derived from parental *B. licheniformis* cells comprising a chromosomal rghR2 gene (variant) encoding a RghR2 protein of SEQ ID NO: 4, wherein the modified cells comprise a genetic modification of the rghR2 gene which encodes a RghR2 protein of SEQ ID NO: 2.

REFERENCE TO A SEQUENCE LISTING

The contents of the electronic submission of the text file Sequence Listing, named "NB41203USPCT_SequenceListing.txt" was created on Aug. 26, 2020 and is 183 KB in size, which is hereby incorporated by reference in its entirety.

BACKGROUND

Gram-positive bacteria such as *Bacillus subtilis*, *Bacillus licheniformis* and *Bacillus amyloliquefaciens* are frequently used as microbial factories for the production of industrial relevant proteins, due to their excellent fermentation properties and high yields (e.g., up to 25 grams per liter culture; Van Dijl and Hecker, 2013). For example, *B. subtilis* is well known for its production of α-amylases (Jensen et al., 2000; Raul et al., 2014) and proteases (Brode et al., 1996) necessary for food, textile, laundry, medical instrument cleaning, pharmaceutical industries and the like (Westers et al., 2004). Because these non-pathogenic Gram-positive bacteria produce proteins that completely lack toxic by-products (e.g., lipopolysaccharides; LPS, also known as endotoxins) they have obtained the "Qualified Presumption of Safety" (QPS) status of the European Food Safety Authority, and many of their products gained a "Generally Recognized As Safe" (GRAS) status from the US Food and Drug Administration (Olempska-Beer et al., 2006; Earl et al., 2008; Caspers et al., 2010).

Thus, the production of proteins (e.g., enzymes, antibodies, receptors, etc.) in microbial host cells is of particular interest in the biotechnological arts. Likewise, the optimization of *Bacillus* host cells for the production and secretion of one or more protein(s) of interest is of high relevance, particularly in the industrial biotechnology setting, wherein small improvements in protein yield are quite significant when the protein is produced in large industrial quantities. More particularly, *B. licheniformis* is a *Bacillus* species host cell of high industrial importance, and as such, the ability to modify and engineer *B. licheniformis* host cells for enhanced/increased protein expression/production is highly desirable for construction of new and improved *B. licheniformis* production strains. The present disclosure is thus related to the highly desirable and unmet need for obtaining and constructing *B. licheniformis* cells (e.g., protein production host cells) having increased protein production capabilities.

SUMMARY

The present disclosure is generally related to compositions and methods for obtaining *B. licheniformis* cells (e.g., a protein production host; cell factory) having increased protein production capabilities. Certain embodiments of the disclosure are related to a modified *Bacillus licheniformis* cell derived from a parental *B. licheniformis* cell comprising a rghR2 gene encoding a RghR2 protein comprising 90% sequence identity to SEQ ID NO: 4, wherein the modified cell comprises a genetic modification of the rghR2 gene which encodes a RghR2 protein comprising 90% sequence identity to SEQ ID NO: 2, wherein the modified host cell produces an increased amount of a protein of interest (relative to the unmodified parental cell). In certain embodiments, the RghR2 protein comprising 90% sequence identity to SEQ ID NO: 4 is substantially inactive as a transcriptional regulatory protein, relative to the RghR2 protein comprising 90% sequence identity to SEQ ID NO: 2. In other embodiments, the parental cell comprising the rghR2 gene encoding the RghR2 protein comprising 90% sequence identity to SEQ ID NO: 4 comprises an 18-nucleotide duplication in the rghR2 gene (rghR2$_{dup}$) which corresponds to a repeat of amino acids AAAISR at amino acid positions 38-43 of the RghR2 protein comprising 90% sequence identity to SEQ ID NO: 4, and wherein the modified cell comprises a modification which deletes of the 18-nucleotide duplication in the rghR2 gene (rghR2$_{rest}$), thereby encoding a RghR2 protein comprising 90% sequence identity to SEQ ID NO: 2. In certain other embodiments, the rghR2 gene encoding the RghR2 protein comprising 90% sequence identity to SEQ ID NO: 4 comprises a nucleic acid sequence having at least 90% sequence identity to SEQ ID NO:3 and comprises an 18 nucleotide duplication encoding a repeat of amino acids AAAISR at amino acid positions 38-43 of the RghR2 protein of SEQ ID NO: 4. In other embodiments, the rghR2 gene encoding the RghR2 protein of SEQ ID NO: 2 comprises a nucleic acid sequence comprising 90% sequence identity to the rghR2 gene of SEQ ID NO: 1. In yet another embodiment, the increased amount of a protein of interest is at least 1.0% increased relative to the parental cell. In certain other embodiments, the modified cell further comprising a genetic modification which disrupts, deletes, inactivates or down-regulates at least one endogenous *B. licheniformis* gene selected from the group consisting of abrB1, rpmJ, rpIM, BLi00412, rapK, phrK, BLi00753, yfjT, BLi00828, yhdX, yhzC, terf2, zosA, abbA, speG, yppF, BLi02543, mntR, BLi02768, sspA, BLi03127, BLi03635, mrgA, BLi03644, yvzC, rghR1, spo0F, ywjG, ywq12, BLi04199, BLi04200, licT, bglH and bglP. In certain embodiments, the modified cell comprises a genetic modification which deletes, disrupts or down-regulates an endogenous *B. licheniformis* gene selected from yvzC, Bli03644, AbrB1 and abh (AbrB2), or at least two endogenous *B. lichenifor-*

*mis* genes selected from the group consisting of yvzC, Bli03644, AbrB1 and abh (AbrB2), or at least three endogenous *B. licheniformis* genes selected from the group consisting of yvzC, Bli03644, AbrB1 and abh (AbrB2) or all four endogenous *B. licheniformis* genes yvzC, Bli03644, AbrB1 and abh (AbrB2). In another embodiment, the increased amount of a protein of interest is a heterologous protein. Thus, in certain embodiments, the modified cell comprises an expression construct encoding a heterologous protein of interest. Such expression constructs encoding heterologous proteins of interest may be introduced (e.g., transformed) into the parental *B. licheniformis* cell prior to the one or more genetic modifications described above, introduced (e.g., transformed) into the modified *B. licheniformis* (daughter) cell during the one or more genetic modifications described above, or introduced (e.g., transformed) into the modified *B. licheniformis* (daughter) after performing the one or more genetic modifications described above. In certain other embodiments, the protein of interest is selected from the group consisting of acetyl esterases, aminopeptidases, amylases, arabinases, arabinofuranosidases, carbonic anhydrases, carboxypeptidases, catalases, cellulases, chitinases, chymosins, cutinases, deoxyribonucleases, epimerases, esterases, α-galactosidases, β-galactosidases, α-glucanases, glucan lyases, endo-β-glucanases, glucoamylases, glucose oxidases, α-glucosidases, β-glucosidases, glucuronidases, glycosyl hydrolases, hemicellulases, hexose oxidases, hydrolases, invertases, isomerases, laccases, lipases, lyases, mannosidases, oxidases, oxidoreductases, pectate lyases, pectin acetyl esterases, pectin depolymerases, pectin methyl esterases, pectinolytic enzymes, perhydrolases, polyol oxidases, peroxidases, phenoloxidases, phytases, polygalacturonases, proteases, peptidases, rhamno-galacturonases, ribonucleases, transferases, transport proteins, transglutaminases, xylanases and hexose oxidases.

In another embodiment, the disclosure is directed to a modified *B. licheniformis* cell derived from a parental *B. licheniformis* cell comprising a rghR2$_{dup}$ gene encoding a RghR2 protein of SEQ ID NO: 4, wherein the modified cell comprises a rghR2$_{rest}$ gene encoding a RghR2 protein of SEQ ID NO: 2, wherein the modified cell produces an increased amount of a protein of interest relative to the unmodified parental cell.

In certain other embodiments, the disclosure is related to a modified *B. licheniformis* cell derived from a parental *B. licheniformis* cell comprising a rghR2 gene encoding a RghR2 protein comprising 90% sequence identity to SEQ ID NO: 4, wherein the modified cell comprises a polynucleotide construct introduced therein comprising a 5' promoter region operably linked to a nucleic acid sequence encoding a RghR2 protein comprising 90% sequence identity to SEQ ID NO: 2, wherein the modified cell produces an increased amount of a protein of interest relative to the unmodified parental cell. In certain embodiments, the RghR2 protein comprising 90% sequence identity to SEQ ID NO: 4 is substantially inactive as a transcriptional regulatory protein relative to the RghR2 protein comprising 90% sequence identity to SEQ ID NO: 2. In another embodiment, the parental cell comprising the rghR2 gene encoding the RghR2 protein comprising 90% sequence identity to SEQ ID NO: 4 comprises an 18-nucleotide duplication in the rghR2 gene which corresponds to a repeat of amino acids AAAISR at amino acid positions 38-43 of the RghR2 protein comprising 90% sequence identity to SEQ ID NO: 4. In other embodiments, the modified cell further comprises a genetic modification which deletes, disrupts, inactivates or down-regulates the endogenous rghR2 gene encoding the RghR2 protein comprising 90% sequence identity to SEQ ID NO: 4. In other embodiments, the rghR2 gene encoding the RghR2 protein comprising 90% sequence identity to SEQ ID NO: 2 comprises a nucleic acid sequence having at least 90% sequence identity to SEQ ID NO: 1. In another embodiment, the modified cell further comprises a genetic modification which deletes, disrupts or down-regulates at least one endogenous *B. licheniformis* gene selected from the group consisting of yvzC, Bli03644, AbrB1 and abh (AbrB2). In certain other embodiments, the polynucleotide construct comprising a 5' promoter region operably linked to a nucleic acid sequence encoding a RghR2 protein comprising 90% sequence identity to SEQ ID NO: is comprised within a vector. In certain embodiments, the vector is a plasmid. In certain other embodiments, the vector is integrated into the *B. licheniformis* genome. In another embodiment, the vector integrates into the *B. licheniformis* genome at the native rghR2 chromosomal locus, thereby deleting or disrupting the gene encoding the RghR2 protein comprising 90% sequence identity to SEQ ID NO: 4 and inserting therefore the introduced polynucleotide construct comprising the 5' promoter region operably linked to the nucleic acid sequence encoding the RghR2 protein comprising 90% sequence identity to SEQ ID NO: 2. In other embodiments, the increased amount of a protein of interest is a heterologous protein. In another embodiment, the modified cell comprises an expression construct encoding a heterologous protein of interest. In certain embodiments, a protein of interest is selected from the group consisting of acetyl esterases, aminopeptidases, amylases, arabinases, arabinofuranosidases, carbonic anhydrases, carboxypeptidases, catalases, cellulases, chitinases, chymosins, cutinases, deoxyribonucleases, epimerases, esterases, α-galactosidases, β-galactosidases, α-glucanases, glucan lyases, endo-β-glucanases, glucoamylases, glucose oxidases, α-glucosidases, β-glucosidases, glucuronidases, glycosyl hydrolases, hemicellulases, hexose oxidases, hydrolases, invertases, isomerases, laccases, lipases, lyases, mannosidases, oxidases, oxidoreductases, pectate lyases, pectin acetyl esterases, pectin depolymerases, pectin methyl esterases, pectinolytic enzymes, perhydrolases, polyol oxidases, peroxidases, phenoloxidases, phytases, polygalacturonases, proteases, peptidases, rhamno-galacturonases, ribonucleases, transferases, transport proteins, transglutaminases, xylanases and hexose oxidases. In other embodiments, the increased amount of a protein of interest is at least 1.0% increased relative to the parental host cell. In another embodiment, the modified cell further comprises an expression construct comprising allele glcT1 (SEQ ID NO: 144), encoding a variant GlcT protein comprising a Leucine (L) to Phenylalanine (F) substitution at amino acid position 67 of the variant GlcT protein.

In other embodiments, the disclosure is related to a modified *B. licheniformis* cell derived from a parental *B. licheniformis* cell, the modified cell comprising a genetic modification which deletes, disrupts or down-regulates an endogenous *B. licheniformis* yvzC gene encoding a YvzC protein comprising 90% sequence identity to SEQ ID NO: 18, wherein the modified cell produces an increased amount of a protein of interest relative to the unmodified parental cell.

In other embodiments, the disclosure is related to a modified *B. licheniformis* cell derived from a parental *B. licheniformis* cell, the modified cell comprising a genetic modification which deletes, disrupts or down-regulates an endogenous *B. licheniformis* Bli03644 gene encoding a Bli03644 protein comprising 90% sequence identity to SEQ ID NO: 20, wherein the modified cell produces an increased amount of a protein of interest relative to the unmodified parental cell.

In other embodiments, the disclosure is related to a modified *B. licheniformis* cell derived from a parental *B. licheniformis* cell, the modified cell comprising a genetic modification which deletes, disrupts or down-regulates an endogenous *B. licheniformis* AbrB1 gene encoding a AbrB1 protein comprising 90% sequence identity to SEQ ID NO: 22, wherein the modified cell produces an increased amount of a protein of interest relative to the unmodified parental cell.

In other embodiments, the disclosure is related to a modified *B. licheniformis* cell derived from a parental *B. licheniformis* cell, the modified cell comprising a genetic modification which deletes, disrupts or down-regulates an endogenous *B. licheniformis* abh (AbrB2) gene encoding a abh (AbrB2) protein comprising 90% sequence identity to SEQ ID NO: 24, wherein the modified cell produces an increased amount of a protein of interest relative to the unmodified parental cell.

In certain other embodiments, the disclosure is directed to a modified *B. licheniformis* cell derived from a parental *B. licheniformis* cell comprising a rghR2 gene encoding a RghR2 protein comprising 90% sequence identity to SEQ ID NO: 2, wherein the modified cell comprises a genetic modification which deletes, disrupts or down-regulates at least one endogenous *B. licheniformis* gene selected from the group consisting of yvzC, Bli03644, AbrB1 and abh (AbrB2), wherein the modified cell produces an increased amount of a protein of interest relative to the unmodified parental cell. In certain embodiments, the rghR2 gene encoding the RghR2 protein comprising 90% sequence identity to SEQ ID NO: 2, comprises a nucleic acid sequence having at least 90% sequence identity to SEQ ID NO: 1. In another embodiment, the aforementioned modified cells further comprise an expression construct comprising allele glcT1 (SEQ ID NO: 144), encoding a variant GlcT protein comprising a Leucine (L) to Phenylalanine (F) substitution at amino acid position 67 of the variant GlcT protein.

In another embodiment, the disclosure is related to a modified *B. licheniformis* cell derived from a parental *B. licheniformis* cell comprising a rghR2 gene encoding a RghR2 protein comprising 90% sequence identity to SEQ ID NO: 4, wherein the modified cell comprises a genetic modification which deletes, disrupts or down-regulates at least one endogenous *B. licheniformis* gene selected from the group consisting of yvzC, Bli03644, AbrB1 and abh (AbrB2), wherein the modified cell produces an increased amount of a protein of interest relative to the unmodified parental cell. In certain embodiments, the rghR2 gene encoding the RghR2 protein comprising 90% sequence identity to SEQ ID NO: 4, comprises a nucleic acid sequence having at least 90% sequence identity to SEQ ID NO: 3. In other embodiments, the RghR2 protein comprising 90% sequence identity to SEQ ID NO: 4 is substantially inactive as a transcriptional regulatory protein relative to the RghR2 protein comprising 90% sequence identity to SEQ ID NO: 2. In other embodiments, the parental cell comprising the rghR2 gene encoding the RghR2 protein comprising 90% sequence identity to SEQ ID NO: 4, comprises an 18-nucleotide duplication in the rghR2 gene which corresponds to a repeat of amino acids AAAISR at amino acid positions 38-43 of the RghR2 protein comprising 90% sequence identity to SEQ ID NO: 4. In certain other embodiments the increased expression of a protein of interest is a heterologous protein of interest.

In certain other embodiments, the disclosure is related to a method for restoring the activity of a substantially inactive RghR2 protein in a parental *B. licheniformis* cell, wherein the parental cell comprises a rghR2 gene encoding a substantially inactive RghR2 protein comprising 90% sequence identity to SEQ ID NO: 4, the method comprising: (a) obtaining a parental *B. licheniformis* cell comprising a gene encoding a RghR2 protein comprising 90% sequence identity to SEQ ID NO: 4, wherein gene encoding the RghR2 protein comprising 90% sequence identity to SEQ ID NO: 4 comprises an 18-nucleotide duplication in the rghR2 gene which corresponds to a repeat of amino acids AAAISR at amino acid positions 38-43 of the RghR2 protein of SEQ ID NO: 4, and (b) modifying the cell of step (a) by deleting the 18-nucleotide duplication in the rghR2 gene to yield a $rghR2_{rest}$ gene, wherein the $rghR2_{rest}$ gene thereby encodes an active RghR2 protein comprising 90% sequence identity to SEQ ID NO: 2. In certain embodiments of the method, the modified cell of step (b) further comprises an introduced polynucleotide expression construct encoding a heterologous protein of interest. In another embodiment of the method, deleting the 18-nucleotide duplication in the rghR2 gene of step (b) comprises deleting the nucleotide duplication by a method selected from homologous recombination, site directed mutagenesis, CRISPR-Cas9 gene editing, TALEN gene editing, homing endonuclease gene editing and ZFN gene editing. In certain embodiments, the rghR2 gene encoding the RghR2 protein comprising 90% sequence identity to SEQ ID NO: 4 comprises a nucleic acid sequence comprising 90% sequence identity to SEQ ID NO: 3, wherein the 18-nucleotide duplication at nucleotides 111-129 of SEQ ID NO: 3 are deleted. In other embodiments, the modified cell of step (b) further comprises a genetic modification which deletes, disrupts, or down-regulates at least one endogenous *B. licheniformis* gene selected from the group consisting of yvzC, Bli03644, AbrB1 and abh (AbrB2). In certain embodiments of the method, the genetic modification which deletes at least one endogenous *B. licheniformis* gene is a complete gene deletion or a partial deletion. In certain embodiments, a partial gene deletion comprises deleting the gene's operator, deleting the gene's promoter, deleting the gene's enhancer, deleting the gene's 5' UTR, deleting the gene's start codon, deleting the gene's encoded ribosomal binding site (RBS), deleting the gene's 3' UTR, deleting the 10% of the gene's coding sequence, deleting the 25% of the gene's coding sequence, deleting the 50% of the gene's coding sequence, deleting the 75% of the gene's coding sequence or any combination thereof.

In another embodiment, the disclosure is related to a method for restoring the activity of a substantially inactive RghR2 protein in a parental *B. licheniformis* cell, wherein the parental cell comprises a $rghR2_{dup}$ gene encoding a substantially inactive RghR2 protein comprising 90% sequence identity to SEQ ID NO: 4, the method comprising: (a) obtaining a parental *B. licheniformis* cell comprising a $rghR2_{dup}$ gene encoding a RghR2 protein comprising at least 90% sequence identity to SEQ ID NO: 4, wherein the $rghR2_{dup}$ gene encoding the RghR2 protein of SEQ ID NO: 4 comprises an 18-nucleotide duplication in the rghR2 gene which corresponds to a repeat of amino acids AAAISR at amino acid positions 38-43 of the RghR2 protein of SEQ ID NO: 4, (b) modifying the parental cell of step (a) by introducing therein a polynucleotide construct comprising a 5' promoter region operably linked to a $rghR2_{rest}$ nucleic acid sequence encoding a RghR2 protein comprising 90% sequence identity to SEQ ID NO: 2, and (c) expressing the polynucleotide construct introduced into the modified cell of step (b) encoding the active RghR2 protein comprising 90% sequence identity to SEQ ID NO: 2. In particular embodiments, the modified cell comprises an introduced polynucleotide expression construct encoding a heterologous protein of interest. In another embodiment, the modified cell comprises a genetic modification which deletes, disrupts, or down-regulates at least one endogenous *B. licheniformis* gene selected from the group consisting of yvzC, Bli03644, AbrB1 and abh (AbrB2). In another embodiment, the genetic modification which deletes at least one endogenous *B. licheniformis* gene is a complete gene deletion or a partial deletion. In certain embodiments, a partial gene deletion comprises deleting the gene's operator, deleting the gene's promoter, deleting the gene's enhancer, deleting the gene's 5' UTR, deleting the gene's start codon, deleting the gene's encoded ribosomal binding site (RBS), deleting the gene's 3' UTR, deleting the 10% of the gene's coding sequence, deleting the 25% of the gene's coding sequence, deleting the 50% of the gene's coding sequence, deleting the 75% of the gene's coding sequence or any combination thereof.

In other embodiments, the disclosure is related to a method for increasing the production of an endogenous protein of interest in *B. licheniformis* cells comprising: (a) obtaining a parental *B. licheniformis* cell comprising a gene encoding a RghR2 protein comprising at least 90% sequence identity to SEQ ID NO: 4, wherein gene encoding the RghR2 protein of SEQ ID NO: 4 comprises an 18-nucleotide duplication in the rghR2 gene which corresponds to a repeat of amino acids AAAISR at amino acid positions 38-43 of the RghR2 protein of SEQ ID NO: 4, (b) modifying the cell of step (a) by deleting the 18-nucleotide duplication in the rghR2 gene, wherein the rghR2 gene thereby encodes a RghR2 protein comprising 90% sequence identity to SEQ ID NO: 2, (c) cultivating the modified cell of step (b) in a medium suitable for the production of the endogenous protein, and (d) recovering the endogenous protein produced in step (c) from the cultivation medium or cell lysate, wherein the modified *B. licheniformis* cell of step (b) produces an increased amount of the endogenous protein, relative to the parental *B. licheniformis* cell obtained in step (a), when both the cells of step (a) and the cells of step (b) are cultivated under the same conditions. In certain embodiments, the rghR2 gene encoding the RghR2 protein comprising 90% sequence identity to SEQ ID NO: 4 comprises a nucleic acid sequence comprising 90% sequence identity to SEQ ID NO: 3, wherein the 18-nucleotide duplication at nucleotides 111-129 of SEQ ID NO: 3 are deleted. In certain embodiments, the genetic modification which deletes at least one endogenous *B. licheniformis* gene is a complete gene deletion or a partial gene deletion. In certain embodiments, a partial gene deletion comprises deleting the gene's operator, deleting the gene's promoter, deleting the gene's enhancer, deleting the gene's 5' UTR, deleting the gene's start codon, deleting the gene's encoded ribosomal binding site (RBS), deleting the gene's 3' UTR, deleting 10% of the gene's coding sequence, deleting 25% of the gene's coding sequence, deleting 50% of the gene's coding sequence, deleting 75% of the gene's coding sequence or any combination thereof.

In yet other embodiments the disclosure is directed to a method for increasing the production of a heterologous protein of interest in *B. licheniformis* cells comprising: (a) obtaining a parental *B. licheniformis* cell comprising a gene encoding a RghR2 protein comprising at least 90% sequence identity to SEQ ID NO: 4, wherein gene encoding the RghR2 protein of SEQ ID NO: 4 comprises an 18-nucleotide duplication in the rghR2 gene which corresponds to a repeat of amino acids AAAISR at amino acid positions 38-43 of the RghR2 protein of SEQ ID NO: 4, (b) modifying the cell of step (a) by deleting the 18-nucleotide duplication in the rghR2 gene, wherein the rghR2 gene thereby encodes a RghR2 protein comprising 90% sequence identity to SEQ ID NO: 2, (c) introducing an expression construct encoding a heterologous protein into the modified *B. licheniformis* cell of step (b), (d) cultivating the modified cell of step (c) in a medium suitable for the production of the heterologous protein, and (e) recovering the heterologous protein produced in step (d) from the cultivation medium or cell lysate, wherein the modified *B. licheniformis* cell of step (b) produces an increased amount of the heterologous protein relative to the parental *B. licheniformis* cell obtained in step (a), comprising the same introduced expression construct encoding the heterologous protein, when both the cells of step (a) and cells of step (b) are cultivated under the same conditions. In certain embodiments, the rghR2 gene encoding the RghR2 protein comprising 90% sequence identity to SEQ ID NO: 4 comprises a nucleic acid sequence comprising 90% sequence identity to SEQ ID NO: 3, wherein the 18-nucleotide duplication at nucleotides 111-129 of SEQ ID NO: 3 are deleted.

In certain other embodiments, the disclosure is related to a method for restoring the activity of a substantially inactive RghR2 protein in a parental *B. licheniformis* cell, wherein the parental cell comprises a rghR2 gene encoding a substantially inactive RghR2 protein comprising 90% sequence identity to SEQ ID NO: 4, the method comprising: (a) obtaining a parental *B. licheniformis* cell comprising a gene encoding a RghR2 protein comprising at least 90% sequence identity to SEQ ID NO: 4, wherein gene encoding the RghR2 protein of SEQ ID NO: 4 comprises an 18-nucleotide duplication in the rghR2 gene which corresponds to a repeat of amino acids AAAISR at amino acid positions 38-43 of the RghR2 protein of SEQ ID NO: 4, and (b) modifying the parental cell of step (a) by: (i) deleting the 18-nucleotide duplication in the rghR2 gene, or (ii) by deleting, disrupting, or down-regulating the rghR2 gene, and (c) deleting, disrupting, or down-regulating at least one endogenous *B. licheniformis* gene selected from the group consisting of yvzC, Bli03644, AbrB1 and abh (AbrB2), wherein the modified cell produces an increased amount of a protein of interest relative to the unmodified parental cell.

In other embodiments, the disclosure is directed to isolated (modified) *B. licheniformis* cell produced by the methods disclosed herein.

In other embodiments, the disclosure is related to a method for identifying a *B. licheniformis* strain comprising a variant rghR2 gene encoding a substantially inactive RghR2 protein, the method comprising: (a) obtaining a *B. licheniformis* strain and sequencing the rghR2 gene therein, (b) aligning and comparing the sequenced rghR2 gene with the native rghR2 gene of SEQ ID NO: 1, wherein a *B. licheniformis* strain comprising a sequenced rghR2 gene comprising an insertion, deletion, substitution and/or duplication of one or more nucleotides in the HTH domain of the rghR2 gene of SEQ ID NO: 1 comprises a variant rghR2 gene encoding a substantially inactive RghR2 protein. In certain embodiments, the HTH domain of a native rghR2 protein of SEQ ID NO: 2 is comprised within amino acid residues 5-58 of SEQ ID NO: 2. In another embodiment, the insertion of one or more nucleotides in the HTH domain of the rghR2 gene of is between nucleotides 111 and 112 of SEQ ID NO: 1. In another embodiment, the *B. licheniformis* strain comprising a variant rghR2 gene encoding a substantially inactive RghR2 protein comprises a six amino acid repeat present in the RghR2 variant protein of SEQ ID NO: 4.

Thus, certain embodiments of the disclosure are related to modified *Bacillus licheniformis* cells (i.e., daughter cells) derived from parental *B. licheniformis* cells, wherein the modified (daughter) cells are capable of expressing/producing increased amounts of one or more proteins of interest, particularly industrially relevant proteins (enzymes) such as amylases, proteases, lipases, esterases and the like.

BRIEF DESCRIPTION OF DRAWINGS

FIG. 1 shows an amino acid sequence alignment of the RghR2 protein (SEQ ID NO: 2) of *B. licheniformis* DSM13 strain and the RghR2 protein of *B. licheniformis* Bra7 strain. As presented in FIG. 1, the RghR2 protein (SEQ ID NO: 4) from *B. licheniformis* isolates Bra7, a Bra7 derived isolate, T5, ATCC-6598 and ATCC-9789 (e.g., see the full length variant RghR2 protein of SEQ ID NO: 4), each comprise a direct repeat of amino acids "Ala-Ala-Ala-Ile-Ser-Arg". For example, as presented in FIG. 1, the variant RghR2 proteins from *B. licheniformis* isolates Bra7, Bra7 derivative, T5, ATCC-6598 and ATCC-9789 (SEQ ID NO: 4) comprise the six (6) amino acid repeat "AAISR" inserted as follows: $Ala_{32}$-$Ala_{33}$-$Ala_{34}$-$Ile_{35}$-$Ser_{36}$-$Arg_{37}$-$Ala_{38}$-$Ala_{39}$-$Ala_{40}$-$Ile_{41}$-$Ser_{42}$-$Arg_{43}$ (SEQ ID NO: 6). In contrast, as presented in FIG. 1, the native RghR2 proteins from *B. licheniformis* isolates such as DSM13, ATCC-27811 and DSM603, do not comprise the repeated "Ala-Ala-Ala-Ile-Ser-Arg" sequence set forth in SEQ ID NO: 6 (e.g., see full length native RghR2 protein of SEQ ID NO: 2).

BRIEF DESCRIPTION OF THE BIOLOGICAL SEQUENCES

Figure 2:
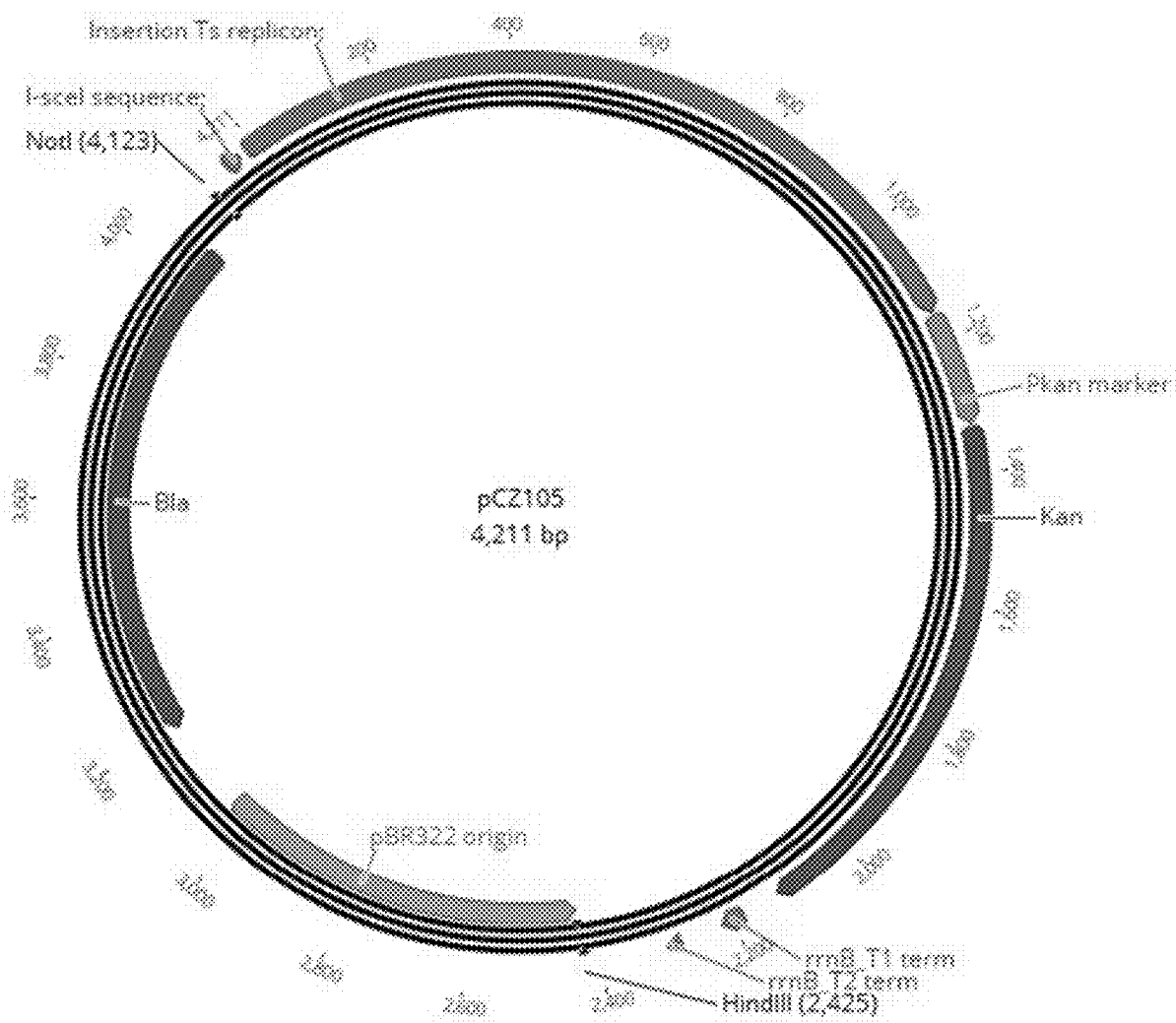
FIG. 2 shows plasmid "pCZ105", which comprises various restriction enzyme sites, amongst which are the HindIII and NotI, a pE194 temperature sensitive replicon (Ts replicon), a kanamycin coding sequence (Kan), a kanamycin promoter (pKan marker), a ribosomal terminator sequence (Term rrnB), a β-lactamase ("Bla") gene and an I-Sce site are present.

SEQ ID NO: 1 is a nucleic acid sequence encoding a native *Bacillus licheniformis* RghR2 protein of SEQ ID NO: 2.

SEQ ID NO: 2 is the amino acid sequence of the native *B. licheniformis* RghR2 protein encoded by nucleic acid sequence of SEQ ID NO: 1.

SEQ ID NO: 3 is a variant *B. licheniformis* nucleic acid sequence encoding a variant *B. licheniformis* RghR2 protein of SEQ ID NO: 4. More particularly, the variant nucleic acid sequence of SEQ ID NO: 3 comprises an 18-base pair (bp) nucleotide duplication, which is not present in the nucleic acid sequence of SEQ ID NO: 1.

SEQ ID NO: 4 is the amino acid sequence of the variant RghR2 protein encoded by the nucleic acid sequence of SEQ ID NO: 3. More particularly, the variant RghR2 protein of SEQ ID NO: 4 comprises a six (6) amino acid residue repeat of "Ala-Ala-Ala-Ile-Ser-Arg" at amino acid residues 36-41 (of SEQ ID NO: 4), wherein the native RghR2 protein of SEQ ID NO: 2 does not comprise the six (6) amino acid residue repeat of "Ala-Ala-Ala-Ile-Ser-Arg" at amino acid residues 36-41.

SEQ ID NO: 5 shows amino acid residues 30-35 ($Ala_{30}$-$Ala_{31}$-$Ala_{32}$-$Ile_{33}$-$Ser_{34}$-$Arg_{35}$) of the native *B. licheniformis* RghR2 protein (i.e., encoded by SEQ ID NO: 1).

SEQ ID NO: 6 shows amino acid residues 30-41 ($Ala_{30}$-$Ala_{31}$-$Ala_{32}$-$Ile_{33}$-$Ser_{34}$-$Arg_{35}$-$Ala_{36}$-$Ala_{37}$-$Ala_{38}$-$Ile_{39}$-$Ser_{40}$-$Arg_{41}$) of the variant *B. licheniformis* RghR2 protein encoded by SEQ ID NO: 3), which comprises a repeat of SEQ ID NO: 5 at amino acid positions 36-41 in SEQ ID NO: 4. Thus, the 18-bp nucleotide duplication set forth in SEQ ID NO: 3 encodes a 6-amino acid repeat of Ala-Ala-Ala-Ile-Ser-Arg, which is represented herein as "Ala-Ala-Ala-Ile-Ser-Arg-Ala-Ala-Ala-Ile-Ser-Arg" as set forth in SEQ ID NO: 6.

SEQ ID NO: 7 is a nucleic acid sequence of primer 369.
SEQ ID NO: 8 is a nucleic acid sequence of primer 378.
SEQ ID NO: 9 is a nucleic acid sequence of primer 379.
SEQ ID NO: 10 is a nucleic acid sequence of primer 380.
SEQ ID NO: 11 is a nucleic acid sequence of primer 381.
SEQ ID NO: 12 is a nucleic acid sequence of primer 384.
SEQ ID NO: 13 is a nucleic acid sequence of primer 752.

SEQ ID NO: 14 is a nucleic acid sequence of primer 753.

SEQ ID NO: 15 is a nucleic acid sequence encoding a native *Bacillus licheniformis* RghR1 protein of SEQ ID NO: 16.

SEQ ID NO: 16 is the amino acid sequence of the native *B. licheniformis* RghR1 protein encoded by nucleic acid sequence of SEQ ID NO: 15.

SEQ ID NO: 17 is the nucleic acid sequence encoding the *B. licheniformis* YvzC protein of SEQ ID NO: 18.

SEQ ID NO: 18 is the amino acid sequence of the *B. licheniformis* YvzC protein encoded by nucleic acid sequence of SEQ ID NO: 17.

SEQ ID NO: 19 is the nucleic acid sequence encoding the *B. licheniformis* Bli03644 protein of SEQ ID NO: 20.

SEQ ID NO: 20 is the amino acid sequence of the *B. licheniformis* Bli03644 protein encoded by nucleic acid sequence of SEQ ID NO: 19.

SEQ ID NO: 21 is the nucleic acid sequence encoding the *B. licheniformis* AbrB1 protein of SEQ ID NO: 22.

SEQ ID NO: 22 is the amino acid sequence of the *B. licheniformis* AbrB1 protein encoded by nucleic acid sequence of SEQ ID NO: 21.

SEQ ID NO: 23 is the nucleic acid sequence encoding the *B. licheniformis* Abh (AbrB2) protein of SEQ ID NO: 24.

SEQ ID NO: 24 is the amino acid sequence of the *B. licheniformis* Abh (AbrB2) protein encoded by nucleic acid sequence of SEQ ID NO: 23.

SEQ ID NO: 25 is the nucleic acid sequence encoding the *B. licheniformis* RpmJ protein of SEQ ID NO: 26.

SEQ ID NO: 26 is the amino acid sequence of the *B. licheniformis* RpmJ protein encoded by nucleic acid sequence of SEQ ID NO: 25.

SEQ ID NO: 27 is the nucleic acid sequence encoding the *B. licheniformis* RpIM protein of SEQ ID NO: 28.

SEQ ID NO: 28 is the amino acid sequence of the *B. licheniformis* RpIM protein encoded by nucleic acid sequence of SEQ ID NO: 27.

SEQ ID NO: 29 is the nucleic acid sequence encoding the *B. licheniformis* BLi00412 protein of SEQ ID NO: 30.

SEQ ID NO: 30 is the amino acid sequence of the *B. licheniformis* BLi00412 protein encoded by nucleic acid sequence of SEQ ID NO: 29.

SEQ ID NO: 31 is the nucleic acid sequence encoding the *B. licheniformis* RapK protein of SEQ ID NO: 32.

SEQ ID NO: 32 is the amino acid sequence of the *B. licheniformis* RapK protein encoded by nucleic acid sequence of SEQ ID NO: 31.

SEQ ID NO: 33 is the nucleic acid sequence encoding the *B. licheniformis* PhrK protein of SEQ ID NO: 34.

SEQ ID NO: 34 is the amino acid sequence of the *B. licheniformis* PhrK protein encoded by nucleic acid sequence of SEQ ID NO: 33.

SEQ ID NO: 35 is the nucleic acid sequence encoding the *B. licheniformis* BLi00753 protein of SEQ ID NO: 36.

SEQ ID NO: 36 is the amino acid sequence of the *B. licheniformis* BLi00753 protein encoded by nucleic acid sequence of SEQ ID NO: 35.

SEQ ID NO: 37 is the nucleic acid sequence encoding the *B. licheniformis* YfjT protein of SEQ ID NO: 38.

SEQ ID NO: 38 is the amino acid sequence of the *B. licheniformis* YfjT protein encoded by nucleic acid sequence of SEQ ID NO: 37.

SEQ ID NO: 39 is the nucleic acid sequence encoding the *B. licheniformis* BLi00828 protein of SEQ ID NO: 40.

SEQ ID NO: 40 is the amino acid sequence of the *B. licheniformis* BLi00828 protein encoded by nucleic acid sequence of SEQ ID NO: 39.

SEQ ID NO: 41 is the nucleic acid sequence encoding the *B. licheniformis* YhdX protein of SEQ ID NO: 42.

SEQ ID NO: 42 is the amino acid sequence of the *B. licheniformis* YhdX protein encoded by nucleic acid sequence of SEQ ID NO: 41.

SEQ ID NO: 43 is the nucleic acid sequence encoding the *B. licheniformis* YhzC protein of SEQ ID NO: 44.

SEQ ID NO: 44 is the amino acid sequence of the *B. licheniformis* YhzC protein encoded by nucleic acid sequence of SEQ ID NO: 43.

SEQ ID NO: 45 is the nucleic acid sequence encoding the *B. licheniformis* Terf2 protein of SEQ ID NO: 46.

SEQ ID NO: 46 is the amino acid sequence of the *B. licheniformis* Terf2 protein encoded by nucleic acid sequence of SEQ ID NO: 45.

SEQ ID NO: 47 is the nucleic acid sequence encoding the *B. licheniformis* ZosA protein of SEQ ID NO: 48.

SEQ ID NO: 48 is the amino acid sequence of the *B. licheniformis* ZosA protein encoded by nucleic acid sequence of SEQ ID NO: 47.

SEQ ID NO: 49 is the nucleic acid sequence encoding the *B. licheniformis* AbbA protein of SEQ ID NO: 50.

SEQ ID NO: 50 is the amino acid sequence of the *B. licheniformis* AbbA protein encoded by nucleic acid sequence of SEQ ID NO: 49.

SEQ ID NO: 51 is the nucleic acid sequence encoding the *B. licheniformis* SpeG protein of SEQ ID NO: 52.

SEQ ID NO: 52 is the amino acid sequence of the *B. licheniformis* SpeG protein encoded by nucleic acid sequence of SEQ ID NO: 51.

SEQ ID NO: 53 is the nucleic acid sequence encoding the *B. licheniformis* YppF protein of SEQ ID NO: 54.

SEQ ID NO: 54 is the amino acid sequence of the *B. licheniformis* YppF protein encoded by nucleic acid sequence of SEQ ID NO: 53.

SEQ ID NO: 55 is the nucleic acid sequence encoding the *B. licheniformis* BLi02543 protein of SEQ ID NO: 56.

SEQ ID NO: 56 is the amino acid sequence of the *B. licheniformis* BLi02543 protein encoded by nucleic acid sequence of SEQ ID NO: 55.

SEQ ID NO: 57 is the nucleic acid sequence encoding the *B. licheniformis* MntR protein of SEQ ID NO: 58.

SEQ ID NO: 58 is the amino acid sequence of the *B. licheniformis* MntR protein encoded by nucleic acid sequence of SEQ ID NO: 57.

SEQ ID NO: 59 is the nucleic acid sequence encoding the *B. licheniformis* BLi02768 protein of SEQ ID NO: 60.

SEQ ID NO: 60 is the amino acid sequence of the *B. licheniformis* BLi02768 protein encoded by nucleic acid sequence of SEQ ID NO: 59.

SEQ ID NO: 61 is the nucleic acid sequence encoding the *B. licheniformis* SspA protein of SEQ ID NO: 62.

SEQ ID NO: 62 is the amino acid sequence of the *B. licheniformis* SspA protein encoded by nucleic acid sequence of SEQ ID NO: 61.

SEQ ID NO: 63 is the nucleic acid sequence encoding the *B. licheniformis* BLi03127 protein of SEQ ID NO: 64.

SEQ ID NO: 64 is the amino acid sequence of the *B. licheniformis* BLi03127 protein encoded by nucleic acid sequence of SEQ ID NO: 63.

SEQ ID NO: 65 is the nucleic acid sequence encoding the *B. licheniformis* BLi03635 protein of SEQ ID NO: 66.

SEQ ID NO: 66 is the amino acid sequence of the *B. licheniformis* BLi03635 protein encoded by nucleic acid sequence of SEQ ID NO: 65.

SEQ ID NO: 67 is the nucleic acid sequence encoding the *B. licheniformis* MrgA protein of SEQ ID NO: 68.

SEQ ID NO: 68 is the amino acid sequence of the *B. licheniformis* MrgA protein encoded by nucleic acid sequence of SEQ ID NO: 67.

SEQ ID NO: 69 is the nucleic acid sequence encoding the *B. licheniformis* Spo0F protein of SEQ ID NO: 70.

SEQ ID NO: 70 is the amino acid sequence of the *B. licheniformis* Spo0F protein encoded by nucleic acid sequence of SEQ ID NO: 69.

SEQ ID NO: 71 is the nucleic acid sequence encoding the *B. licheniformis* YwjG protein of SEQ ID NO: 72.

SEQ ID NO: 72 is the amino acid sequence of the *B. licheniformis* YwjG protein encoded by nucleic acid sequence of SEQ ID NO: 71.

SEQ ID NO: 73 is the nucleic acid sequence encoding the *B. licheniformis* YwqI2 protein of SEQ ID NO: 74.

SEQ ID NO: 74 is the amino acid sequence of the *B. licheniformis* YwqI2 protein encoded by nucleic acid sequence of SEQ ID NO: 73.

SEQ ID NO: 75 is the nucleic acid sequence encoding the *B. licheniformis* BLi04199 protein of SEQ ID NO: 76.

SEQ ID NO: 76 is the amino acid sequence of the *B. licheniformis* BLi04199 protein encoded by nucleic acid sequence of SEQ ID NO: 75.

SEQ ID NO: 77 is the nucleic acid sequence encoding the *B. licheniformis* BLi04200 protein of SEQ ID NO: 78.

SEQ ID NO: 78 is the amino acid sequence of the *B. licheniformis* BLi04200 protein encoded by nucleic acid sequence of SEQ ID NO: 77.

SEQ ID NO: 79 is the nucleic acid sequence encoding the *B. licheniformis* LicT protein of SEQ ID NO: 80.

SEQ ID NO: 80 is the amino acid sequence of the *B. licheniformis* LicT protein encoded by nucleic acid sequence of SEQ ID NO: 79.

SEQ ID NO: 81 is the nucleic acid sequence encoding the *B. licheniformis* BglH protein of SEQ ID NO: 82.

SEQ ID NO: 82 is the amino acid sequence of the *B. licheniformis* BglH protein encoded by nucleic acid sequence of SEQ ID NO: 81.

SEQ ID NO: 83 is the nucleic acid sequence encoding the *B. licheniformis* BglP protein of SEQ ID NO: 84.

SEQ ID NO: 84 is the amino acid sequence of the *B. licheniformis* BglP protein encoded by nucleic acid sequence of SEQ ID NO: 83.

SEQ ID NO: 85 is the nucleic acid sequence encoding the *B. licheniformis* ComK protein of SEQ ID NO: 86.

SEQ ID NO: 86: is the amino acid sequence of the *B. licheniformis* ComK protein encoded by nucleic acid sequence of SEQ ID NO: 85.

SEQ ID NO: 87 is the nucleotide sequence of the *B. licheniformis* Bra7 strain 18-bp duplication.

SEQ ID NO: 88 is the amino acid sequence of the *S. pyogenes* Cas9 protein.

SEQ ID NO: 89 is the amino acid sequence of the *Acidominococcus* sp. Cpf1 protein.

SEQ ID NO: 90 is the amino acid sequence of the *N. gregoryi* Ago protein.

SEQ ID NO: 91 is the nucleic acid sequence encoding the *S. pyogenes* Cas9 protein of SEQ ID NO: 88.

SEQ ID NO: 92 is a codon optimized nucleic acid sequence encoding the *S. pyogenes* Cas9 protein of SEQ ID NO: 88.

SEQ ID NO: 93 is the nucleic acid sequence of the *B. subtilis* aprE promoter.

SEQ ID NO: 94 is the nucleic acid sequence of the *B. subtilis* xylA promoter.

SEQ ID NO: 95 is a spac promoter nucleic acid sequence.

SEQ ID NO: 96 is a Hyper-spank promoter nucleic acid sequence.

SEQ ID NO: 97 is the nucleic acid sequence of the *B. subtilis* veg promoter.

SEQ ID NO: 98 is the nucleic acid sequence of the *B. subtilis* nprE promoter.

SEQ ID NO: 99 is the nucleic acid sequence of the T5 phage N25 promoter.

SEQ ID NO: 100 is the nucleic acid sequence of the *B. subtilis* groE promoter.

SEQ ID NO: 101 is the nucleic acid sequence of the *B. subtilis* AraA promoter.

SEQ ID NO: 102 is the nucleic acid sequence of the *B. subtilis* AraA2 promoter.

SEQ ID NO: 103 is the nucleic acid sequence of a lambda phage T0 terminator.

SEQ ID NO: 104 is a nucleic acid sequence of a Cas9 expression cassette.

SEQ ID NO: 105 is the nucleic acid sequence of the *B. licheniformis* (Bra7) 18-bp duplication.

SEQ ID NO: 106 is a nucleic acid sequence of a 17-bp VT.

SEQ ID NO: 107 is a nucleic acid sequence of an 18-bp VT.

SEQ ID NO: 108 is a nucleic acid sequence of a 19-bp VT.

SEQ ID NO: 109 is a nucleic acid sequence of a 20-bp VT.

SEQ ID NO: 110 is a nucleic acid sequence encoding a Cas9 endonuclease recognition domain.

SEQ ID NO: 111 is a nucleic acid sequence encoding a guide-RNA (gRNA) targeting the 18-bp duplication.

SEQ ID NO: 112 is a nucleic acid sequence encoding a gRNA expression cassette.

SEQ ID NO: 113 is a 500-bp nucleic acid sequence which is 5' (upstream) of the 18-bp duplication.

SEQ ID NO: 114 is a 500-bp nucleic acid sequence which is 3' (downstream) of the 18-bp duplication.

SEQ ID NO: 115 is a rghR2 (18-bp duplication) editing template nucleic acid sequence.

SEQ ID NO: 116 is the *B. licheniformis* (Bra7) nucleic acid sequence comprising the rghR2 gene.

SEQ ID NO: 117 is a forward primer sequence directed to the rghR2 gene locus.

SEQ ID NO: 118 is a reverse primer sequence directed to the rghR2 gene locus.

SEQ ID NO: 119 is a nucleic acid sequence comprising the edited rghR2 locus.

SEQ ID NO: 120 is an rghR2 sequencing primer.

SEQ ID NO: 121 is a *B. licheniformis* yvc target site 1 nucleic acid sequence.

SEQ ID NO 122 is a *B. licheniformis* yvc target site 2 nucleic acid sequence.

SEQ ID NO: 123 is a *B. licheniformis* yvc target site 3 nucleic acid sequence.

SEQ ID NO: 124 is a *B. licheniformis* yvc target site 4 nucleic acid sequence.

SEQ ID NO: 125 is a *B. licheniformis* yvc target site 5 nucleic acid sequence.

SEQ ID NO: 126 is a *B. licheniformis* yvc target site 6 nucleic acid sequence.

SEQ ID NO: 127 is a *B. licheniformis* yvc target site 7 nucleic acid sequence.

SEQ ID NO: 128 is a *B. licheniformis* yvc target site 8 nucleic acid sequence.

SEQ ID NO: 129 is a *B. licheniformis* yvc target site 9 nucleic acid sequence.

SEQ ID NO: 130 is a *B. licheniformis* yvc target site 10 nucleic acid sequence.

SEQ ID NO: 131 is a *B. licheniformis* yvc target site 11 nucleic acid sequence.

SEQ ID NO: 132 is a *B. licheniformis* yvc target site 12 nucleic acid sequence.

SEQ ID NO: 133 is a *B. licheniformis* yvc target site 13 nucleic acid sequence.

SEQ ID NO: 134 is a *B. licheniformis* yvc target site 14 nucleic acid sequence.

SEQ ID NO: 135 is a *B. licheniformis* yvc target site 15 nucleic acid sequence.

SEQ ID NO: 136 is a *B. licheniformis* yvc target site 16 nucleic acid sequence.

SEQ ID NO: 137 is a *B. licheniformis* yvc target site 17 nucleic acid sequence.

SEQ ID NO: 138 is a *B. licheniformis* yvc target site 18 nucleic acid sequence.

SEQ ID NO: 139 is a *B. licheniformis* yvc target site 19 nucleic acid sequence.

SEQ ID NO: 140 is a nucleic acid sequence comprising a *Cytophaga* sp. variant #1 α-amylase expression cassette.

SEQ ID NO: 141 is a nucleic acid sequence comprising a *Geobacillus stearothermophilus* variant α-amylase expression cassette.

SEQ ID NO: 142 is a nucleic acid sequence comprising a *Pseudomonas* sp. AM1 variant α-amylase expression cassette.

SEQ ID NO: 143 is a nucleic acid sequence comprising a *Cytophaga* sp. variant #2 α-amylase expression cassette.

SEQ ID NO: 144 is a synthetic nucleic acid sequence comprising allele glcT1 (C199T).

DETAILED DESCRIPTION

The present disclosure is generally related to compositions and methods for obtaining *Bacillus licheniformis* cells/strains having increased protein production capabilities. Certain embodiments of the disclosure are related to genetically modified *Bacillus licheniformis* cells/strains derived from parental *B. licheniformis* cells/strains comprising a variant rghR2 gene. Thus, certain other embodiments of the disclosure are related to modified *B. licheniformis* cells derived from parental *B. licheniformis* cells comprising a chromosomal rghR2 gene (variant) encoding a RghR2 protein of SEQ ID NO: 4, wherein the modified cells comprise a genetic modification of the rghR2 gene which encodes a RghR2 protein of SEQ ID NO: 2. Certain other embodiments of the disclosure are related to modified *B. licheniformis* cells derived from parental *B. licheniformis* cells comprising a rghR2 gene encoding a RghR2 protein comprising 90% sequence identity to SEQ ID NO: 4, wherein the modified cells comprise a genetic modification of the rghR2 gene which encodes a RghR2 protein comprising 90% sequence identity to SEQ ID NO: 2, wherein the modified cells produce an increased amount of a protein of interest (i.e., relative to the unmodified parental cells).

In other embodiments, the disclosure is related to modified *B. licheniformis* cells derived from parental *B. licheniformis* cells comprising a rghR2 gene encoding a RghR2 protein comprising 90% sequence identity to SEQ ID NO: 4, wherein the modified cells comprise a polynucleotide construct introduced therein comprising a 5' promoter region operably linked to a nucleic acid sequence encoding a RghR2 protein comprising 90% sequence identity to SEQ ID NO: 2, wherein the modified cells produce an increased amount of a protein of interest (relative to the unmodified parental cells).

In other embodiments, the disclosure is related to modified *B. licheniformis* cells derived from parental *B. licheniformis* cells comprising a rghR2 gene encoding a RghR2 protein comprising 90% sequence identity to SEQ ID NO: 2, wherein the modified cell comprises a genetic modification which deletes, disrupts, inactivates or down-regulates at least one endogenous *B. licheniformis* gene selected from yvzC, Bli03644, AbrB1 and abh (AbrB2), wherein the modified cells produce an increased amount of a protein of interest (relative to the unmodified parental cells).

In other embodiments, the disclosure is related to modified *B. licheniformis* cells derived from parental *B. licheniformis* cells comprising a rghR2 gene encoding a RghR2 protein comprising 90% sequence identity to SEQ ID NO: 4, wherein the modified cell comprises a genetic modification which deletes, disrupts, inactivates or down-regulates at least one endogenous *B. licheniformis* gene selected from yvzC, Bli03644, AbrB1 and abh (AbrB2), wherein the modified cells produce an increased amount of a protein of interest (relative to the unmodified parental cells).

In certain other embodiments, the disclosure is related to modified *B. licheniformis* cells derived from parental *B. licheniformis* cells comprising a rghR2 gene encoding a RghR2 protein comprising 90% sequence identity to SEQ ID NO: 4, wherein the modified cells comprise a genetic modification which deletes the 18-nucleotide (18-bp) duplication in the rghR2 gene.

In other embodiments, the disclosure is related to modified *B. licheniformis* cells derived from parental *B. licheniformis* cells comprising a rghR2 gene encoding a RghR2 protein comprising 90% sequence identity to SEQ ID NO: 4, wherein the modified cells comprise a genetic modification which deletes, disrupts, inactivates or down-regulates the rghR2 gene.

In other embodiments, the disclosure is related to a modified *B. licheniformis* cell derived from a parental *B. licheniformis* cell, wherein the modified cell comprises a genetic modification which deletes, disrupts, inactivates or down-regulates at least one endogenous *B. licheniformis* gene encoding a YvzC protein (SEQ ID NO: 18), a BLi03644 protein (SEQ ID NO: 20), an AbrB1 protein (SEQ ID NO: 22) and/or an Abh (AbrB2) protein (SEQ ID NO: 24), wherein the modified cell produces an increased amount of a protein of interest (relative to the unmodified parental cell).

In other embodiments, a modified *B. licheniformis* cell derived from a parental *B. licheniformis* cell comprises a restored rghR2 gene of SEQ ID NO: 2 and a genetic modification which deletes, disrupts, inactivates or down-regulates at least one endogenous *B. licheniformis* gene encoding a YvzC protein (SEQ ID NO: 18), a BLi03644 protein (SEQ ID NO: 20), an AbrB1 protein (SEQ ID NO: 22) and/or an Abh (AbrB2) protein (SEQ ID NO: 24), wherein the modified cell produces an increased amount of a protein of interest (relative to the unmodified parental cell).

In certain other embodiments, modified *B. licheniformis* cells derived from parental *B. licheniformis* cells, comprise a rghR2$_{rest}$ gene and a nucleic acid construct (SEQ ID NO: 143) comprising allele glcT1 (C199T), encoding a variant GlcT (transcriptional anti-termination) protein comprising a leucine (L) to phenylalanine (F) substitution at amino acid position 67 (L67F) of the variant GlcT protein.

Other embodiments of the disclosure are related to methods for restoring the activity of inactive RghR2 proteins in parental *B. licheniformis* cells. Certain other embodiments of the disclosure are related to such compositions and methods for increasing the production of proteins of interest in modified *B. licheniformis* cells. In other embodiments, the disclosure is related to isolated *B. licheniformis* (daughter) cells modified and produced by the methods of the disclosure.

I. Definitions

In view of the modified *B. licheniformis* cells of the disclosure and methods thereof described herein, the following terms and phrases are defined. Terms not defined herein should be accorded their ordinary meaning as used in the art.

Unless defined otherwise, all technical and scientific terms used herein have the same meaning as commonly understood by one of ordinary skill in the art to which the present compositions and methods apply. Although any methods and materials similar or equivalent to those described herein can also be used in the practice or testing of the present compositions and methods, representative illustrative methods and materials are now described. All publications and patents cited herein are incorporated by reference in their entirety.

It is further noted that the claims may be drafted to exclude any optional element. As such, this statement is intended to serve as antecedent basis for use of such exclusive terminology as "solely," "only", "excluding", "not including" and the like, in connection with the recitation of claim elements, or use of a "negative" limitation or proviso thereof.

As will be apparent to those of skill in the art upon reading this disclosure, each of the individual embodiments described and illustrated herein has discrete components and features which may be readily separated from or combined with the features of any of the other several embodiments without departing from the scope or spirit of the present compositions and methods described herein. Any recited method can be carried out in the order of events recited or in any other order which is logically possible.

As used herein, a "native *Bacillus licheniformis* chromosomal rghR2 gene" comprises a nucleotide sequence encoding a RghR2 protein of SEQ ID NO: 2 (e.g., see TABLE 1 and FIG. 1).

As used herein, a "variant-18-BP" *B. licheniformis* chromosomal rghR2 gene comprises a nucleotide sequence encoding a variant RghR2 protein of SEQ ID NO: 4 (e.g., see TABLE 1 and FIG. 1).

As used herein, a "variant-18-BP *B. licheniformis* chromosomal rghR2 gene" comprising a nucleotide sequence encoding a variant RghR2 protein of SEQ ID NO: 4 may be abbreviated as "rghR2$_{dup}$" and the variant RghR2 protein thereof (comprising the six amino acid repeat "AAAISR") may be abbreviated as "RghR2$_{dup}$".

A used herein, a "variant *B. licheniformis* chromosomal rghR2 gene" includes any *B. licheniformis* chromosomal rghR2 gene encoding a variant RghR2 protein comprising one or more nucleotide insertions, one or more nucleotide deletions, one or more nucleotide duplications and/or one or more nucleotide substitutions in the helix-turn-helix (HTH) domain of the encoded RghR2 protein, which one or more nucleotide insertions, nucleotide deletions, nucleotide duplications and/or nucleotide substitutions in the HTH domain of the encoded RghR2 protein substantially inactivate the RghR2 protein as a transcriptional regulatory protein.

As defined herein, the "HTH domain" of the native *B. licheniformis* RghR2 protein of SEQ ID NO: 2 is comprised within amino residues 5-58 of SEQ ID NO: 2.

For example, in certain embodiments, one skilled in the art may readily screen/sequence rghR2 genes against the native rghR2 gene sequence of SEQ ID NO: 1, and identify "variant *B. licheniformis* chromosomal rghR2 gene" sequences encoding variant RghR2 proteins comprising mutations (e.g., nucleotide insertions, deletions, substitutions, duplications, and the like) in the HTH domain of the encoded RghR2 protein.

Thus, in certain embodiments, the disclosure is related to parental *B. licheniformis* cells comprising a "variant *B. licheniformis* chromosomal rghR2 gene" sequence (i.e., encoding a variant RghR2 protein comprising a mutation in the HTH domain). In other embodiments, the disclosure is related to a modified *B. licheniformis* cell derived from a parental cell *B. licheniformis* comprising a "variant *B. licheniformis* chromosomal rghR2 gene" sequence (i.e., encoding a variant RghR2 protein comprising a mutation in the HTH domain), wherein the modified cell comprises a restored rghR2 gene encoding a native RghR2 protein of SEQ ID NO: 2.

As used herein, a modified *B. licheniformis* cell derived from a parental *B. licheniformis* cell comprising either (i) a "variant-18-BP *B. licheniformis* chromosomal rghR2 gene" (SEQ ID NO: 3) or (ii) a "variant *B. licheniformis* chromosomal rghR2 gene" (i.e., comprising a mutation in the HTH domain of the encoded RghR2 protein comprised within amino residues 5-58 of SEQ ID NO: 2), wherein the modified *B. licheniformis* cell comprises a restored rghR2 gene encoding a native RghR2 protein of SEQ ID NO: 2, the "restored rghR2 gene in the modified cell" may be abbreviated herein as "rghR2$_{rest}$" and the encoded native protein thereof may be abbreviated as "RghR2$_{rest}$".

TABLE 1

RghR2 NATIVE AND RghR2$_{dup}$ PROTEIN SEQUENCES

| SEQ | RghR2 AMINO ACID SEQUENCE |
|---|---|
| 2 | MAMTRFGERLKELREQRSLSVNQLAMYAGVSA$_{32}$A$_{33}$A$_{34}$I$_{35}$S$_{36}$R$_{37}$IENGHRGVPKPATIRKLAEALKMPYEQLMDIAGYMRADEIREQPRGYVTMQEIAAKHGVEDLWLFKPEKWDCLSREDLLNLEQYFHFLVNEAKKRQS |
| 4 | MAMTRFGERLKELREQRSLSVNQLAMYAGVSA$_{32}$A$_{33}$A$_{34}$I$_{35}$S$_{36}$R$_{37}$A$_{38}$A$_{39}$A$_{40}$I$_{41}$S$_{42}$R$_{43}$IENGHRGVPKPATIRKLAEALKMPYEQLMDIAGYMRADEIREQPRGYVTMQEIAAKHGVEDLWLFKPEKWDCLSREDLLNLEQYFHFLVNEAKKRQS |

More specifically, as presented above in TABLE 1, a "variant-18-BP *B. licheniformis* chromosomal rghR2 gene" of the disclosure (SEQ ID NO: 3) comprises an 18-nucleotide (18-bp) duplication encoding a consecutive repeat of six (6) amino acids which are "Ala-Ala-Ala-Ile-Ser-Arg" (hereinafter "AAAISR"), wherein the primary (1°) amino acid sequence of the encoded variant RghR2 protein is set forth as SEQ ID NO: 4 (see, TABLE 1 and FIG. 1) comprises a linear (consecutive) repeat of these six (6) amino acids as follows: "Ala-Ala-Ala-Ile-Ser-Arg-Ala-Ala-Ala-Ile-Ser-Arg"; hereinafter, "AAAISRAAAISR" (SEQ ID NO: 6). For example, the six amino acid repeat present in RghR2$_{dup}$ protein (SEQ ID NO: 4) is presented in TABLE 1, wherein the repeated amino acid residues of this 140 amino acid protein comprise the bold text amino acids at positions A$_{38}$ to R$_{43}$ of SEQ ID NO: 4.

In contrast, a "native *B. licheniformis* chromosomal rghR2 gene" of the disclosure (SEQ ID NO: 1) does not comprise this 18-nucleotide (18-bp) duplication. Thus, the native rghR2 gene encodes the native RghR2 protein of SEQ ID NO: 2 (which does not comprise the consecutive repeat "AAAISR", as presented in SEQ ID NO: 6). For example, the primary (1°) amino acid sequence of the encoded native RghR2 protein is presented in TABLE 1, wherein the six amino acid repeat of "AAAISR" is not present at positions 38-43 (SEQ ID NO: 2) of this 134 amino acid protein.

As defined herein, a *B. licheniformis* strain Bra7 (or Bra7 strain) is a *B. licheniformis* host cell developed/derived from a wild-type *B. licheniformis* parental strain using classical genetic improvements methods. Although certain embodiments and descriptions of the present disclosure are related to *B. licheniformis* strain Bra7, the compositions and methods of the instant disclosure are not limited to a specific *Bacillus* species, nor are the compositions and methods of the instant disclosure limited to a specific strain of *B. licheniformis* host cells.

As used herein, a "*B. licheniformis* derivative of strain Bra7", specifically refers to a *B. licheniformis* (daughter) cell derived from a parental *B. licheniformis* Bra7 (strain) host cell. More particularly, as used herein, a "*B. licheniformis* derivative of strain Bra7" is a *B. licheniformis* host cell derived from the *B. licheniformis* strain Bra7 parent which comprises a five (5) gene deletion (Δcat, ΔamyL, Δspo, ΔaprL, ΔendoGluC) as described in International PCT Publication No. WO2008/024372.

As used herein, a heterologous *Peanibacillus curdlanolyticus* variant α-amylase (e.g., see, Examples 2 and 4), optionally abbreviated herein as "PcuAmyl-v6", is disclosed in PCT Publication No. WO2014/164834.

As used herein, a *Cytophaga* sp. variant α-amylase referred to herein as "*Cytophaga* sp. α-amylase variant #1" (e.g., see, Example 5) and "*Cytophaga* sp. α-amylase variant #2" (e.g., see, Examples 11 and 12) are disclosed in International PCT Publication Nos. WO2014/164777; WO2012/164800 and WO2014/164834.

As used herein, a "variant *Geobacillus stearothermophilus* amylase" (e.g., see, Example 5) is a variant *G. stearothermophilus* α-amylase disclosed in International PCT Publication No. WO2009/149130.

As used herein, a "variant alkaline α-amylases" (e.g., see, Example 9), referred to herein as alkaline α-amylase "variant 1", alkaline α-amylase "variant 2", alkaline α-amylase "variant 3" and alkaline α-amylase "variant 4", which are variant α-amylase derived from *Bacillus* sp. No. 707 comprising improved alkaline performance/stability thereof, are generally disclosed in International PCT Publication No. WO2008/153805 and US Patent Publication No. US2014/0057324.

As used herein, a "G4 amylase (variant)" of *Pseudomonas* sp. AM1 (e.g., see, Example 8) is disclosed in International PCT Publication No. WO2010/133644.

As used herein, a heterologous DNA/nucleic acid sequence "encoding an enzyme comprising lipase/esterase activity" (e.g., see, Example 10), such DNA/nucleic acid sequence encodes an enzyme commission number "EC 3.1.1.3" enzyme" comprising lipase/esterase activity.

As used herein, a *B. licheniformis* (daughter) cell comprising allele glcT1 (e.g., see, Example 12), allele glcT1 encodes a variant GlcT (transcriptional anti-termination) protein comprising a phenylalanine (F) at amino acid position 67 (F67) of the variant GlcT protein, as described in U.S. Provisional Patent Application Ser. No. U.S. 62/613, 339, filed Jan. 3, 2018.

Thus, in certain embodiments, a "native *B. licheniformis* chromosomal rghR2 gene" comprises a nucleotide sequence encoding a RghR2 protein comprising at least 90% sequence identity to SEQ ID NO: 2. In other embodiments, a "native *B. licheniformis* chromosomal rghR2 gene" comprises a nucleotide sequence encoding a RghR2 protein comprising at least 90% sequence identity to SEQ ID NO: 2, with the proviso that the RghR2 protein comprising 90% sequence identity to SEQ ID NO: 2 is active as a transcriptional regulatory protein in *B. licheniformis* cells. In certain other embodiments, a "native *B. licheniformis* chromosomal rghR2 gene" comprises a nucleotide sequence encoding a RghR2 protein comprising at least 90% sequence identity to SEQ ID NO: 2, with the proviso that the RghR2 protein comprising 90% sequence identity to SEQ ID NO: 2 does not comprise a repeat of amino acids AAAISR as set forth in SEQ ID NO: 6.

In certain embodiments, a rghR2$_{dup}$ gene comprises a nucleotide sequence encoding a RghR2 protein of SEQ ID NO: 4. In certain embodiments, a rghR2$_{dup}$ gene comprises a nucleotide sequence encoding a RghR2 protein comprising at least 90% sequence identity to SEQ ID NO: 4. In certain embodiments, a rghR2$_{dup}$ gene comprises a nucleotide sequence encoding a RghR2 protein comprising at least 90% sequence identity to SEQ ID NO: 4, with the proviso that the RghR2 protein comprising 90% sequence identity to SEQ ID NO: 4 is substantially inactive as a transcriptional regulatory protein in *B. licheniformis* cells. In certain other embodiments, a rghR2$_{dup}$ gene comprises a nucleotide sequence encoding a RghR2 protein comprising at least 90% sequence identity to SEQ ID NO: 4, with the proviso that the RghR2 protein comprising 90% sequence identity to SEQ ID NO: 4 comprises a repeat of amino acids AAAISR as set forth in SEQ ID NO: 6.

In other embodiments, a variant rghR2 gene of the disclosure comprises any *B. licheniformis* rghR2 gene comprising at least one, two, three, four, five, ten, eighteen, twenty, etc. nucleotides inserted, deleted, duplicated and the like in the native rghR2 gene's nucleic acid sequence between nucleotide positions 111 and 112 of SEQ ID NO: 1, thereby converting the native rghR2 gene into a variant rghR2 gene comprising at least one, two, three, four, five, ten, eighteen, twenty, etc. nucleotides inserted into the native rghR2 gene's nucleic acid sequence.

Thus, in other embodiments, a RghR2 protein which is substantially inactive further includes variant RghR2 proteins comprising at least one, two, three, four, five, six, seven, etc. amino acids inserted between amino acid residues 37 and 38 of the RghR2 protein (i.e., with reference to the active RghR2 protein sequence of SEQ ID NO: 2), wherein such amino acid insertions (i.e., between residues 37 and 38) render the RghR2 protein substantially inactive as transcriptional regulatory protein.

Thus, in certain embodiments, a variant RghR2 protein encoded by a variant rghR2 gene is substantially "inactive as a transcriptional regulatory protein" in *B. licheniformis* cells.

As defined herein, an "RghR2$_{dup}$ protein of SEQ ID NO: 4, comprising a 6-amino acid repeat of amino acids AAAISR" is substantially "inactive as transcriptional regulatory protein" in *B. licheniformis* cells.

As defined herein, a "variant rghR2 gene encoding a variant rghR2 protein comprising a mutation in the HTH domain" of the encoded RghR2 of SEQ ID NO: 2 is substantially "inactive as transcriptional regulatory protein" in *B. licheniformis* cells relative to the native RghR2 protein of SEQ ID NO: 2.

In certain embodiments, a rghR2 gene encoding a variant RghR2 protein which is substantially "inactive as a transcriptional regulatory protein" is determined by screening variant RghR2 proteins (relative to native RghR2 protein; SEQ ID NO: 2) in DNA binding assays known to one skilled in the art.

For example, it is contemplated herein that the RghR2 protein, a transcriptional regulatory protein comprising the HTH domain set forth above, must sufficiently bind to DNA to exert its transcriptional regulatory activity thereof. Thus, by comparing DNA binding affinities of the native RghR2 protein relative to one or more variant RghR2 proteins (i.e., comprising a mutated HTH domain), a reduced DNA binding affinity of a variant RghR2 protein vis-à-vis the native RghR2 protein serves as a corollary for such variant RghR2 proteins which are substantially "inactive as transcriptional regulatory proteins". For example, as contemplated herein, a variant RghR2 protein (i.e. comprising a mutated HTH domain) having a significantly reduced DNA binding affinity (or a complete loss of DNA binding) will have a substantial reduction (or complete loss) of transcriptional regulatory protein activity, relative to the native RghR2 protein, which is substantially active as transcriptional regulatory protein.

Figure 8:
FIG. 8 shows codons in the DSM13 rghR2 gene (SEQ ID NO: 1), indicated in bold, encoding residues involved in DNA binding. The 18-bp sequence duplicated in the rghR2 gene of *B. licheniformis* strains Bra7, T5, ATCC-9789 and ATCC-6598 is located in a region predicted to encode a sequence-specific DNA binding site.

Thus, in certain embodiments, a variant rghR2 gene of the disclosure includes any *B. licheniformis* rghR2 gene variant comprising an insertion, duplication, deletion, non-synonymous substitution, and the like, of the nucleotides in these (DNA binding) regions of the rghR2 gene, as presented in FIG. 8. For example, FIG. 8 of the instant disclosure shows certain rghR2 codons (i.e., the bold text nucleotides in FIG. 8) predicted to encode amino acid residues in the RghR2 protein involved in DNA binding. Thus, in certain embodiments, a variant rghR2 gene of the disclosure is a variant rghR2 gene comprising an insertion, duplication, deletion, non-synonymous substitution, and the like of one or more nucleotides in these (DNA binding) regions of the rghR2 gene. More particularly, in certain embodiments, a variant rghR2 gene comprising an insertion, duplication, deletion, non-synonymous substitution, and the like of the nucleotides in the DNA binding regions of the rghR2 gene encodes a substantially inactive RghR2 protein.

The phrase a RghR2 protein which is substantially "inactive as a transcriptional regulatory protein" includes variant RghR2 proteins encoded by variant rghR2 genes comprising an insertion, duplication, deletion, non-synonymous substitution (and the like) of one or more nucleotides in these (DNA binding) regions of the rghR2 gene, wherein the encoded variant proteins are substantially inactive as transcriptional regulatory proteins.

As used herein, the term "equivalent positions" mean the amino acid residue positions after alignment with the RghR2 polypeptide sequence of SEQ ID NO: 4, particularly from amino acid residues 32 to 43 of SEQ ID NO: 4. The twelve (12) contiguous amino acids residues (i.e., equivalent positions) described above for SEQ ID NO: 4 (i.e., residues 32 to 43 of SEQ ID NO: 4) are presented in the amino acid sequence of SEQ ID NO: 6 ("AAAISRAAAISR). Thus, in certain embodiments, a gene or ORF encoding a variant RghR2 protein of the disclosure may be identified by comparison of the equivalent positions of the encoded RghR2 protein's amino acid sequence to the repeat amino acid sequence set forth in SEQ ID NO: 6, wherein the presence of the SEQ ID NO: 6 repeat sequence indicates a variant RghR2 protein of the disclosure.

The terms "modification" and "genetic modification" are used interchangeably and include: (a) the introduction, substitution, or removal of one or more nucleotides in a gene (or an ORF thereof), or the introduction, substitution, or removal of one or more nucleotides in a regulatory element required for the transcription or translation of the gene or ORF thereof, (b) a gene disruption, (c) a gene conversion, (d) a gene deletion, (e) the down-regulation of a gene, (f) specific mutagenesis and/or (g) random mutagenesis of any one or more the genes disclosed herein. For example, as used herein a genetic modification includes, but is not limited to, a modification of one or more genes selected from the group consisting of rghR2, rghR1, abrB1, rpmJ, rpIM, BLi00412, rapK, phrK, BLi00753, yfjT, BLi00828, yhdX, yhzC, terf2, zosA, abbA, speG, yppF, BLi02543, mntR, BLi02768, sspA, BLi03127, BLi03635, mrgA, BLi03644, yvzC, spo0F, ywjG, ywq12, BLi04199, BLi04200, licT, bglH and bglP.

As used herein, "disruption of a gene", "gene disruption", "inactivation of a gene" and "gene inactivation" are used interchangeably and refer broadly to any genetic modification that substantially prevents a host cell from producing a functional gene product (e.g., a protein). Exemplary methods of gene disruptions include complete or partial deletion of any portion of a gene, including a polypeptide-coding sequence, a promoter, an enhancer, or another regulatory element, or mutagenesis of the same, where mutagenesis encompasses substitutions, insertions, deletions, inversions, and any combinations and variations thereof which disrupt/inactivate the target gene(s) and substantially reduce or prevent the production of the functional gene product (i.e., a protein).

As used herein, the terms "down-regulation" of gene expression and "up-regulation" of gene expression include any method that results in lower (down-regulated) or higher (up-regulated) expression of a gene. For example, the down-regulation of a gene can be achieved by RNA-induced gene silencing, genetic modifications of control elements such as the promoter, ribosomal binding site (RBS)/Shine-Dalgarno sequences, untranslated regions (UTRs), codon changes, and the like.

As used herein, the phrases "deleting the 18-nucleotide duplication", or "deleting the 18-bp duplication" or "modifying the cell by deleting the 18-nucleotide duplication" particularly refer to a genetic modification of a parental *Bacillus* cell comprising a variant rghR2 gene comprising an 18-nucleotide duplication (rghR2$_{dup}$), which duplication encodes a repeat of amino acids "AAAISR" (SEQ ID NO: 6) in the variant RghR2 protein (RghR2$_{dup}$; e.g., see SEQ ID NO: 4, wherein amino acids "AAAISR" at positions 32-37 of SEQ ID NO: 4 are consecutively repeated at positions 38-43 of SEQ ID NO: 4).

Thus, in certain embodiments, a modified *Bacillus* cell of the disclosure is derived from a parental *Bacillus* cell comprising a variant chromosomal rghR2 gene (e.g., rghR2$_{dup}$; SEQ ID NO: 3) comprising an 18-nucleotide duplication encoding the "AAAISR" repeated sequence of SEQ ID NO: 6, wherein the modified *Bacillus* cell is modified by "deleting the 18-nucleotide duplication", thereby resulting in a modified *Bacillus* cell comprising a "restored" rghR2 gene sequence (rghR2$_{rest}$; SEQ ID NO: 1) encoding a native rghR2 protein. Methods for deleting the 18-nuclotide duplication in the parental *Bacillus* cell include, but are not limited to, homologous recombination, CRSIPR-Cas9 gene editing, mega-nuclease gene editing, TALEN gene editing, Zinc-Finger Nuclease (ZFN) editing and the like, which are further described below in Section IV. Thus, in certain embodiments, the disclosure is directed to modified *Bacillus* cells comprising a "restored" rghR2 gene".

As used herein, "host cell" refers to a cell that has the capacity to act as a host or expression vehicle for a newly introduced DNA sequence. This, in certain embodiments of the disclosure, the host cells are *Bacillus* sp. or *E. coli* cells.

As defined herein, a "parental cell", a "parental host cell" or a "parental *B. licheniformis* (host) cell", may be used interchangeably and refer to "unmodified" parental *B. licheniformis* cells. For example, a "parental" cell refers to any cell or strain of microorganism in which the genome of the "parental" cell is altered (e.g., via one or more mutations introduced into the parental cell) to generate a modified "daughter" cell.

As defined herein, a "modified cell", a "modified host cell" or a "modified *B. licheniformis* (host) cell", may be used interchangeably and refer to recombinant *B. licheniformis* (host) cells that comprise at least one genetic modification which is not present in the "parental" *B. licheniformis* host cell from which the modified *B. licheniformis* (daughter) cell is derived. For example, in certain embodiments a "parental *B. licheniformis* (host) cell" of the disclosure comprises a chromosomal rghR2 gene of SEQ ID NO: 3 (rghR2$_{dup}$) encoding a variant RghR2 protein of SEQ ID NO: 4, and a "modified" *B. licheniformis* host cell the disclosure (i.e., derived from the parental *B. licheniformis* host cell comprising the chromosomal rghR2 gene of SEQ ID NO: 3) comprises a genetic modification which deletes the 18-nucleotide duplication in SEQ ID NO: 3, thereby resulting in a modified (restored) *B. licheniformis* host cell comprising a native rghR2 gene (rghR2$_{rest}$) encoding a native RghR2 protein of SEQ ID NO: 2.

In certain embodiments, the "unmodified" *B. licheniformis* (parental) cell may be referred to as a "control cell", particularly when being compared with, or relative to, a "modified" *B. licheniformis* (daughter) cell. As used herein, when the expression and/or production of a protein of interest (POI) in an "unmodified" (parental) cell (i.e., a control cell) is being compared to the expression and/or production of the same POI in a "modified" (daughter) cell, it will be understood that the "modified" and "unmodified" cells are grown/cultivated/fermented under the same conditions (e.g., the same conditions such as media, temperature, pH and the like).

As used herein, "the genus *Bacillus*" includes all species within the genus "*Bacillus*" as known to those of skill in the art, including but not limited to *B. subtilis, B. licheniformis, B. lentus, B. brevis, B. stearothermophilus, B. alkalophilus, B. amyloliquefaciens, B. clausii, B. halodurans, B. megaterium, B. coagulans, B. circulans, B. lautus*, and *B. thuringiensis*. It is recognized that the genus *Bacillus* continues to undergo taxonomical reorganization. Thus, it is intended that the genus include species that have been reclassified, including but not limited to such organisms as *B. stearothermophilus*, which is now named "*Geobacillus stearothermophilus*".

As defined herein, the terms "increased expression", "enhanced expression", "increased expression of a POI", "increased production", "increased production of a POI" and the like refer to a "modified" *B. licheniformis* (daughter) cell, wherein the "increase" is always relative (vis-à-vis) to an "unmodified" *B. licheniformis* (parental) cell expressing/producing the same POI.

As used herein, the term "expression" refers to the transcription and stable accumulation of sense (mRNA) or anti-sense RNA, derived from a nucleic acid molecule of the disclosure. Expression may also refer to translation of mRNA into a polypeptide. Thus, the term "expression" includes any step involved in the production of the polypeptide including, but not limited to, transcription, post-transcriptional modification, translation, post-translational modification, secretion and the like.

As defined herein, the combined term "expresses/produces", as used in phrases such as "a modified host cell expresses/produces an increased amount of a protein of interest relative to the (unmodified) parental host cell", the term ("expresses/produces") is meant to include any steps involved in the expression and production of a protein of interest in host cell of the disclosure.

Likewise, as used herein, an "increased amount", when used in phrases such as "a modified host cell 'expresses/produces an increased amount' of one or more proteins of interest relative to the (unmodified) parental host cell", particularly refers to an "increased amount" of any protein of interest (POI) expressed/produced in the modified host cell, which "increased amount" is always relative to the (unmodified) parental *B. licheniformis* cells expressing/producing the same POI, wherein the modified and unmodified cells are grown/cultured/fermented under the same conditions (e.g., the same conditions such as media, temperature, pH and the like). For example, an increased amount of a POI may be an endogenous *B. licheniformis* POI or a heterologous POI expressed in a modified *B. licheniformis* cell of the disclosure.

Thus, as used herein, "increasing" protein production or "increased" protein production is meant an increased amount of protein produced (e.g., a protein of interest). The protein may be produced inside the host cell, or secreted (or transported) into the culture medium. In certain embodiments, the protein of interest is produced (secreted) into the culture medium. Increased protein production may be detected for example, as higher maximal level of protein or enzymatic activity (e.g., such as protease activity, amylase activity, cellulase activity, hemicellulase activity and the like), or total extracellular protein produced as compared to the parental host cell.

As used herein, "nucleic acid" refers to a nucleotide or polynucleotide sequence, and fragments or portions thereof, as well as to DNA, cDNA, and RNA of genomic or synthetic origin, which may be double-stranded or single-stranded, whether representing the sense or antisense strand. It will be understood that as a result of the degeneracy of the genetic code, a multitude of nucleotide sequences may encode a given protein.

It is understood that the polynucleotides (or nucleic acid molecules) described herein include "genes", "vectors" and "plasmids".

Accordingly, the term "gene", refers to a polynucleotide that codes for a particular sequence of amino acids, which comprise all, or part of a protein coding sequence, and may include regulatory (non-transcribed) DNA sequences, such as promoter sequences, which determine for example the conditions under which the gene is expressed. The transcribed region of the gene may include untranslated regions (UTRs), including introns, 5'-untranslated regions (UTRs), and 3'-UTRs, as well as the coding sequence.

As used herein, the term "coding sequence" refers to a nucleotide sequence, which directly specifies the amino acid sequence of its (encoded) protein product. The boundaries of the coding sequence are generally determined by an open reading frame (hereinafter, "ORF"), which usually begins with an ATG start codon. The coding sequence typically includes DNA, cDNA, and recombinant nucleotide sequences.

As defined herein, the term "open reading frame" (hereinafter, "ORF") means a nucleic acid or nucleic acid sequence (whether naturally occurring, non-naturally occurring, or synthetic) comprising an uninterrupted reading frame consisting of (i) an initiation codon, (ii) a series of two (2) or more codons representing amino acids, and (iii) a termination codon, the ORF being read (or translated) in the 5' to 3' direction.

The term "promoter" as used herein refers to a nucleic acid sequence capable of controlling the expression of a coding sequence or functional RNA. In general, a coding sequence is located 3' (downstream) to a promoter sequence. Promoters may be derived in their entirety from a native gene, or be composed of different elements derived from different promoters found in nature, or even comprise synthetic nucleic acid segments. It is understood by those skilled in the art that different promoters may direct the expression of a gene in different cell types, or at different stages of development, or in response to different environmental or physiological conditions. Promoters which cause a gene to be expressed in most cell types at most times are commonly referred to as "constitutive promoters". It is further recognized that since in most cases the exact boundaries of regulatory sequences have not been completely defined, DNA fragments of different lengths may have identical promoter activity.

The term "operably linked" as used herein refers to the association of nucleic acid sequences on a single nucleic acid fragment so that the function of one is affected by the other. For example, a promoter is operably linked with a coding sequence (e.g., an ORF) when it is capable of affecting the expression of that coding sequence (i.e., that the coding sequence is under the transcriptional control of the promoter). Coding sequences can be operably linked to regulatory sequences in sense or antisense orientation.

A nucleic acid is "operably linked" when it is placed into a functional relationship with another nucleic acid sequence. For example, DNA encoding a secretory leader (i.e., a signal peptide), is operably linked to DNA for a polypeptide if it is expressed as a pre-protein that participates in the secretion of the polypeptide; a promoter or enhancer is operably linked to a coding sequence if it affects the transcription of the sequence; or a ribosome binding site is operably linked to a coding sequence if it is positioned so as to facilitate translation. Generally, "operably linked" means that the DNA sequences being linked are contiguous, and, in the case of a secretory leader, contiguous and in reading phase. However, enhancers do not have to be contiguous. Linking is accomplished by ligation at convenient restriction sites. If such sites do not exist, the synthetic oligonucleotide adaptors or linkers are used in accordance with conventional practice.

As used herein, "a functional promoter sequence controlling the expression of a gene of interest (or open reading frame thereof) linked to the gene of interest's protein coding sequence" refers to a promoter sequence which controls the transcription and translation of the coding sequence in *Bacillus*. For example, in certain embodiments, the present disclosure is directed to a polynucleotide comprising a 5' promoter (or 5' promoter region, or tandem 5' promoters and the like), wherein the promoter region is operably linked to a nucleic acid sequence encoding an RghR2 protein of SEQ ID NO: 2. Thus, in certain embodiments, a functional promoter sequence controls the expression of an rghR2 gene encoding a RghR2 protein of SEQ ID NO: 2. In other embodiments, a functional promoter sequence controls the expression of a heterologous gene (or endogenous gene) encoding a protein of interest in a *Bacillus* cell, more particularly in a *B. licheniformis* host cell.

As defined herein, "suitable regulatory sequences" refer to nucleotide sequences located upstream (5' non-coding sequences), within, or downstream (3' non-coding sequences) of a coding sequence, and which influence the transcription, RNA processing or stability, or translation of the associated coding sequence. Regulatory sequences may include promoters, translation leader sequences, RNA processing site, effector binding site and stem-loop structure.

As defined herein, the term "introducing", as used in phrases such as "introducing into a bacterial cell" or "introducing into a *B. licheniformis* cell at least one polynucleotide open reading frame (ORF), or a gene thereof, or a vector thereof, includes methods known in the art for introducing polynucleotides into a cell, including, but not limited to protoplast fusion, natural or artificial transformation (e.g., calcium chloride, electroporation), transduction, transfection, conjugation and the like (e.g., see Ferrari et al., 1989).

As used herein, "transformed" or "transformation" mean a cell has been transformed by use of recombinant DNA techniques. Transformation typically occurs by insertion of one or more nucleotide sequences (e.g., a polynucleotide, an ORF or gene) into a cell. The inserted nucleotide sequence may be a heterologous nucleotide sequence (i.e., a sequence that is not naturally occurring in cell that is to be transformed). For example, in certain embodiments of the disclosure, a parental *B. licheniformis* cell comprising a variant rghR2 gene encoding a variant RghR2 protein of SEQ ID NO: 4 is modified (e.g., transformed) by introducing into the parental cell a polynucleotide construct comprising a promoter operably linked to a nucleic acid sequence encoding a native RghR2 protein of SEQ ID NO: 2, thereby resulting in a modified *B. licheniformis* (daughter) host cell derived from the "unmodified" (parental) cell.

As used herein, "transformation" refers to introducing an exogenous DNA into a host cell so that the DNA is maintained as a chromosomal integrant or a self-replicating extra-chromosomal vector. As used herein, "transforming DNA", "transforming sequence", and "DNA construct" refer to DNA that is used to introduce sequences into a host cell or organism. Transforming DNA is DNA used to introduce sequences into a host cell or organism. The DNA may be generated in vitro by PCR or any other suitable techniques. In some embodiments, the transforming DNA comprises an incoming sequence, while in other embodiments it further comprises an incoming sequence flanked by homology boxes. In yet a further embodiment, the transforming DNA comprises other non-homologous sequences, added to the ends (i.e., stuffer sequences or flanks). The ends can be closed such that the transforming DNA forms a closed circle, such as, for example, insertion into a vector.

As used herein in the context of introducing a nucleic acid sequence into a cell, the term "introduced" refers to any method suitable for transferring the nucleic acid sequence into the cell. Such methods for introduction include but are not limited to protoplast fusion, transfection, transformation, conjugation, and transduction (See e.g., Ferrari et al., 1989).

As used herein "an incoming sequence" refers to a DNA sequence that is introduced into the *Bacillus* chromosome. In some embodiments, the incoming sequence is part of a DNA construct. In other embodiments, the incoming sequence encodes one or more proteins of interest. In some embodiments, the incoming sequence comprises a sequence that may or may not already be present in the genome of the cell to be transformed (i.e., it may be either a homologous or heterologous sequence). In some embodiments, the incoming sequence encodes one or more proteins of interest, a gene, and/or a mutated or modified gene. In alternative embodiments, the incoming sequence encodes a functional wild-type gene or operon, a functional mutant gene or operon, or a nonfunctional gene or operon. In some embodiments, the non-functional sequence may be inserted into a gene to disrupt function of the gene. In another embodiment, the incoming sequence includes a selective marker. In a further embodiment the incoming sequence includes two homology boxes.

As used herein, "homology box" refers to a nucleic acid sequence, which is homologous to a sequence in the *Bacillus* chromosome. More specifically, a homology box is an upstream or downstream region having between about 80 and 100% sequence identity, between about 90 and 100% sequence identity, or between about 95 and 100% sequence identity with the immediate flanking coding region of a gene or part of a gene to be deleted, disrupted, inactivated, down-regulated and the like, according to the invention. These sequences direct where in the *Bacillus* chromosome a DNA construct is integrated and directs what part of the *Bacillus* chromosome is replaced by the incoming sequence. While not meant to limit the present disclosure, a homology box may include about between 1 base pair (bp) to 200 kilobases (kb). Preferably, a homology box includes about between 1 bp and 10.0 kb; between 1 bp and 5.0 kb; between 1 bp and 2.5 kb; between 1 bp and 1.0 kb, and between 0.25 kb and 2.5 kb. A homology box may also include about 10.0 kb, 5.0 kb, 2.5 kb, 2.0 kb, 1.5 kb, 1.0 kb, 0.5 kb, 0.25 kb and 0.1 kb. In some embodiments, the 5' and 3' ends of a selective marker are flanked by a homology box wherein the homology box comprises nucleic acid sequences immediately flanking the coding region of the gene.

In still another embodiment of the disclosure, the deletion, disruption, inactivation or down-regulation of a gene active at an inappropriate time, as determined by DNA array analysis (e.g., transcriptome analysis, as described herein) provides enhanced expression of a protein of interest. As used herein, "transcriptome analysis" refers to the analysis of gene transcription.

As used herein, the term "selectable marker-encoding nucleotide sequence" refers to a nucleotide sequence which is capable of expression in the host cells and where expression of the selectable marker confers to cells containing the expressed gene the ability to grow in the presence of a corresponding selective agent or lack of an essential nutrient.

As used herein, the terms "selectable marker" and "selective marker" refer to a nucleic acid (e.g., a gene) capable of expression in host cell which allows for ease of selection of those hosts containing the vector. Examples of such selectable markers include, but are not limited to, antimicrobials. Thus, the term "selectable marker" refers to genes that provide an indication that a host cell has taken up an incoming DNA of interest or some other reaction has occurred. Typically, selectable markers are genes that confer antimicrobial resistance or a metabolic advantage on the host cell to allow cells containing the exogenous DNA to be distinguished from cells that have not received any exogenous sequence during the transformation.

A "residing selectable marker" is one that is located on the chromosome of the microorganism to be transformed. A residing selectable marker encodes a gene that is different from the selectable marker on the transforming DNA construct. Selective markers are well known to those of skill in the art. As indicated above, the marker can be an antimicrobial resistance marker (e.g., $amp^R$, $phleo^R$, $spec^R$, $kan^R$, $ery^R$, $tet^R$, $cmp^R$ and $neo^R$ (see e.g., Guerot-Fleury, 1995; Palmeros et al., 2000; and Trieu-Cuot et al., 1983). In some embodiments, the present invention provides a chloramphenicol resistance gene (e.g., the gene present on pC194, as well as the resistance gene present in the *Bacillus licheniformis* genome). This resistance gene is particularly useful in the present invention, as well as in embodiments involving chromosomal amplification of chromosomally integrated cassettes and integrative plasmids (See e.g., Albertini and Galizzi, 1985; Stahl and Ferrari, 1984). Other markers useful in accordance with the invention include, but are not limited to auxotrophic markers, such as serine, lysine, tryptophan; and detection markers, such as β-galactosidase.

As defined herein, a host cell "genome", a bacterial (host) cell "genome", or a *B. licheniformis* (host) cell "genome" includes chromosomal and extrachromosomal genes.

As used herein, the terms "plasmid", "vector" and "cassette" refer to extrachromosomal elements, often carrying genes which are typically not part of the central metabolism of the cell, and usually in the form of circular double-stranded DNA molecules. Such elements may be autonomously replicating sequences, genome integrating sequences, phage or nucleotide sequences, linear or circular, of a single-stranded or double-stranded DNA or RNA, derived from any source, in which a number of nucleotide sequences have been joined or recombined into a unique construction which is capable of introducing a promoter fragment and DNA sequence for a selected gene product along with appropriate 3' untranslated sequence into a cell.

A used herein, a "transformation cassette" refers to a specific vector comprising a gene (or ORF thereof), and having elements in addition to the foreign gene that facilitate transformation of a particular host cell.

As used herein, the term "vector" refers to any nucleic acid that can be replicated (propagated) in cells and can carry new genes or DNA segments into cells. Thus, the term refers to a nucleic acid construct designed for transfer between different host cells. Vectors include viruses, bacteriophage, pro-viruses, plasmids, phagemids, transposons, and artificial chromosomes such as YACs (yeast artificial chromosomes), BACs (bacterial artificial chromosomes), PLACs (plant artificial chromosomes), and the like, that are "episomes" (i.e., replicate autonomously or can integrate into a chromosome of a host organism).

An "expression vector" refers to a vector that has the ability to incorporate and express heterologous DNA in a cell. Many prokaryotic and eukaryotic expression vectors are commercially available and know to one skilled in the art. Selection of appropriate expression vectors is within the knowledge of one skilled in the art.

As used herein, the terms "expression cassette" and "expression vector" refer to a nucleic acid construct generated recombinantly or synthetically, with a series of specified nucleic acid elements that permit transcription of a particular nucleic acid in a target cell (i.e., these are vectors or vector elements, as described above). The recombinant expression cassette can be incorporated into a plasmid, chromosome, mitochondrial DNA, plastid DNA, virus, or nucleic acid fragment. Typically, the recombinant expression cassette portion of an expression vector includes, among other sequences, a nucleic acid sequence to be transcribed and a promoter. In some embodiments, DNA constructs also include a series of specified nucleic acid elements that permit transcription of a particular nucleic acid in a target cell. In certain embodiments, a DNA construct of the disclosure comprises a selective marker and an inactivating chromosomal or gene or DNA segment as defined herein.

As used herein, a "targeting vector" is a vector that includes polynucleotide sequences that are homologous to a region in the chromosome of a host cell into which the targeting vector is transformed and that can drive homologous recombination at that region. For example, targeting vectors find use in introducing mutations into the chromosome of a host cell through homologous recombination. In some embodiments, the targeting vector comprises other non-homologous sequences, e.g., added to the ends (i.e., stuffer sequences or flanking sequences). The ends can be closed such that the targeting vector forms a closed circle, such as, for example, insertion into a vector. For example, in certain embodiments, a parental *B. licheniformis* (host) cell comprising a variant rghR2 gene encoding a variant RghR2 protein of SEQ ID NO: 4, is modified (e.g., transformed) by introducing into the parental cell one or more "targeting vectors" which are designed to delete the 18-nucleotde duplication of the endogenous *B. licheniformis* variant rghR2 gene, such that modified host cell comprising the "restored" native rghR2 gene encodes a native RghR2 protein of SEQ ID NO: 2. Selection and/or construction of appropriate vectors (e.g., for the deletion of the 18-nucleotide duplication in the rghR2 gene) is well within the knowledge of those having skill in the art.

As used herein, the term "plasmid" refers to a circular double-stranded (ds) DNA construct used as a cloning vector, and which forms an extrachromosomal self-replicating genetic element in many bacteria and some eukaryotes. In some embodiments, plasmids become incorporated into the genome of the host cell.

As used herein, the term "protein of interest" or "POI" refers to a polypeptide of interest that is desired to be expressed in a modified *B. licheniformis* (daughter) host cell, wherein the POI is preferably expressed at increased levels (i.e., relative to the "unmodified" (parental) cell). Thus, as used herein, a POI may be an enzyme, a substrate-binding protein, a surface-active protein, a structural protein, a receptor protein, and the like. In certain embodiments, a modified cell of the disclosure produces an increased amount of a heterologous protein of interest or an endogenous protein of interest relative to the parental cell. In particular embodiments, an increased amount of a protein of interest produced by a modified cell of the disclosure is at least a 0.5% increase, at least a 1.0% increase, at least a 5.0% increase, or a greater than 5.0% increase, relative to the parental cell.

Similarly, as defined herein, a "gene of interest" or "GOI" refers a nucleic acid sequence (e.g., a polynucleotide, a gene or an ORF) which encodes a POI. A "gene of interest" encoding a "protein of interest" may be a naturally occurring gene, a mutated gene or a synthetic gene.

As used herein, the terms "polypeptide" and "protein" are used interchangeably, and refer to polymers of any length comprising amino acid residues linked by peptide bonds. The conventional one (1) letter or three (3) letter codes for amino acid residues are used herein. The polypeptide may be linear or branched, it may comprise modified amino acids, and it may be interrupted by non-amino acids. The term polypeptide also encompasses an amino acid polymer that has been modified naturally or by intervention; for example, disulfide bond formation, glycosylation, lipidation, acetylation, phosphorylation, or any other manipulation or modification, such as conjugation with a labeling component. Also included within the definition are, for example, polypeptides containing one or more analogs of an amino acid (including, for example, unnatural amino acids, etc.), as well as other modifications known in the art.

In certain embodiments, a gene of the instant disclosure encodes a commercially relevant industrial protein of interest, such as an enzyme (e.g., a acetyl esterases, aminopeptidases, amylases, arabinases, arabinofuranosidases, carbonic anhydrases, carboxypeptidases, catalases, cellulases, chitinases, chymosins, cutinases, deoxyribonucleases, epimerases, esterases, α-galactosidases, β-galactosidases, α-glucanases, glucan lysases, endo-β-glucanases, glucoamylases, glucose oxidases, α-glucosidases, β-glucosidases, glucuronidases, glycosyl hydrolases, hemicellulases, hexose oxidases, hydrolases, invertases, isomerases, laccases, lipases, lyases, mannosidases, oxidases, oxidoreductases, pectate lyases, pectin acetyl esterases, pectin depolymerases, pectin methyl esterases, pectinolytic enzymes, perhydrolases, polyol oxidases, peroxidases, phenoloxidases, phytases, polygalacturonases, proteases, peptidases, rhamno-galacturonases, ribonucleases, transferases, transport proteins, transglutaminases, xylanases, hexose oxidases, and combinations thereof).

As used herein, a "variant" polypeptide refers to a polypeptide that is derived from a parent (or reference) polypeptide by the substitution, addition, or deletion of one or more amino acids, typically by recombinant DNA techniques. Variant polypeptides may differ from a parent polypeptide by a small number of amino acid residues and may be defined by their level of primary amino acid sequence homology/identity with a parent (reference) polypeptide.

Preferably, variant polypeptides have at least 70%, at least 75%, at least 80%, at least 85%, at least 90%, at least 91%, at least 92%, at least 93%, at least 94%, at least 95%, at least 96%, at least 97%, at least 98%, or even at least 99% amino acid sequence identity with a parent (reference) polypeptide sequence. As used herein, a "variant" polynucleotide refers to a polynucleotide encoding a variant polypeptide, wherein the "variant polynucleotide" has a specified degree of sequence homology/identity with a parent polynucleotide, or hybridizes with a parent polynucleotide (or a complement thereof) under stringent hybridization conditions. Preferably, a variant polynucleotide has at least 70%, at least 75%, at least 80%, at least 85%, at least 90%, at least 91%, at least 92%, at least 93%, at least 94%, at least 95%, at least 96%, at least 97%, at least 98%, or even at least 99% nucleotide sequence identity with a parent (reference) polynucleotide sequence.

As used herein, a "mutation" refers to any change or alteration in a nucleic acid sequence. Several types of mutations exist, including point mutations, deletion mutations, silent mutations, frame shift mutations, splicing mutations and the like. Mutations may be performed specifically (e.g., via site directed mutagenesis) or randomly (e.g., via chemical agents, passage through repair minus bacterial strains).

As used herein, in the context of a polypeptide or a sequence thereof, the term "substitution" means the replacement (i.e., substitution) of one amino acid with another amino acid.

As defined herein, an "endogenous gene" refers to a gene in its natural location in the genome of an organism.

As defined herein, a "heterologous" gene, a "non-endogenous" gene, or a "foreign" gene refer to a gene (or ORF) not normally found in the host organism, but that is introduced into the host organism by gene transfer. As used herein, the term "foreign" gene(s) comprise native genes (or ORFs) inserted into a non-native organism and/or chimeric genes inserted into a native or non-native organism.

As defined herein, a "heterologous" nucleic acid construct or a "heterologous" nucleic acid sequence has a portion of the sequence which is not native to the cell in which it is expressed.

As defined herein, a "heterologous control sequence", refers to a gene expression control sequence (e.g., a promoter or enhancer) which does not function in nature to regulate (control) the expression of the gene of interest.

Generally, heterologous nucleic acid sequences are not endogenous (native) to the cell, or a part of the genome in which they are present, and have been added to the cell, by infection, transfection, transformation, microinjection, electroporation, and the like. A "heterologous" nucleic acid construct may contain a control sequence/DNA coding (ORF) sequence combination that is the same as, or different, from a control sequence/DNA coding sequence combination found in the native host cell.

As used herein, the terms "signal sequence" and "signal peptide" refer to a sequence of amino acid residues that may participate in the secretion or direct transport of a mature protein or precursor form of a protein. The signal sequence is typically located N-terminal to the precursor or mature protein sequence. The signal sequence may be endogenous or exogenous. A signal sequence is normally absent from the mature protein. A signal sequence is typically cleaved from the protein by a signal peptidase after the protein is transported.

The term "derived" encompasses the terms "originated" "obtained," "obtainable," and "created," and generally indicates that one specified material or composition finds its origin in another specified material or composition, or has features that can be described with reference to the another specified material or composition.

As used herein, the term "homology" relates to homologous polynucleotides or polypeptides. If two or more polynucleotides or two or more polypeptides are homologous, this means that the homologous polynucleotides or polypeptides have a "degree of identity" of at least 60%, more preferably at least 70%, even more preferably at least 85%, still more preferably at least 90%, more preferably at least 95%, and most preferably at least 98%. Whether two polynucleotide or polypeptide sequences have a sufficiently high degree of identity to be homologous as defined herein, can suitably be investigated by aligning the two sequences using a computer program known in the art, such as "GAP" provided in the GCG program package (Program Manual for the Wisconsin Package, Version 8, August 1994, Genetics Computer Group, 575 Science Drive, Madison, Wisconsin, USA 53711) (Needleman and Wunsch, (1970). Using GAP with the following settings for DNA sequence comparison: GAP creation penalty of 5.0 and GAP extension penalty of 0.3.

As used herein, the term "percent (%) identity" refers to the level of nucleic acid or amino acid sequence identity between the nucleic acid sequences that encode a polypeptide or the polypeptide's amino acid sequences, when aligned using a sequence alignment program.

As used herein, "specific productivity" is total amount of protein produced per cell per time over a given time period.

As defined herein, the terms "purified", "isolated" or "enriched" are meant that a biomolecule (e.g., a polypeptide or polynucleotide) is altered from its natural state by virtue of separating it from some, or all of, the naturally occurring constituents with which it is associated in nature. Such isolation or purification may be accomplished by art-recognized separation techniques such as ion exchange chromatography, affinity chromatography, hydrophobic separation, dialysis, protease treatment, ammonium sulphate precipitation or other protein salt precipitation, centrifugation, size exclusion chromatography, filtration, microfiltration, gel electrophoresis or separation on a gradient to remove whole cells, cell debris, impurities, extraneous proteins, or enzymes undesired in the final composition. It is further possible to then add constituents to a purified or isolated biomolecule composition which provide additional benefits, for example, activating agents, anti-inhibition agents, desirable ions, compounds to control pH or other enzymes or chemicals.

As used herein, the term "ComK polypeptide" is defined as the product of a comK gene; a transcription factor that acts as the final auto-regulatory control switch prior to competence development; involved with activation of the expression of late competence genes involved in DNA-binding and uptake and in recombination (Liu and Zuber, 1998, Hamoen et al., 1998). Exemplary ComK nucleic acid and polypeptide sequences are set forth in SEQ ID NO: 85 and SEQ ID NO: 86, respectively.

As used herein, "homologous genes" refers to a pair of genes from different, but usually related species, which correspond to each other and which are identical or very similar to each other. The term encompasses genes that are separated by speciation (i.e., the development of new species) (e.g., orthologous genes), as well as genes that have been separated by genetic duplication (e.g., paralogous genes).

As used herein, "orthologue" and "orthologous genes" refer to genes in different species that have evolved from a common ancestral gene (i.e., a homologous gene) by speciation. Typically, orthologs retain the same function during the course of evolution. Identification of orthologs finds use in the reliable prediction of gene function in newly sequenced genomes.

As used herein, "paralog" and "paralogous genes" refer to genes that are related by duplication within a genome. While orthologs retain the same function through the course of evolution, paralogs evolve new functions, even though some functions are often related to the original one. Examples of paralogous genes include, but are not limited to genes encoding trypsin, chymotrypsin, elastase, and thrombin, which are all serine proteinases and occur together within the same species.

As used herein, "homology" refers to sequence similarity or identity, with identity being preferred. This homology is determined using standard techniques known in the art (See e.g., Smith and Waterman, 1981; Needleman and Wunsch, 1970; Pearson and Lipman, 1988; programs such as GAP, BESTFIT, FASTA, and TFASTA in the Wisconsin Genetics Software Package (Genetics Computer Group, Madison, WI) and Devereux et. al., 1984).

As used herein, an "analogous sequence" is one wherein the function of the gene is essentially the same as the gene derived from a *Bacillus licheniformis* cell. Additionally, analogous genes include at least 60%, 65%, 70%, 75%, 80%, 85%, 90%, 95%, 97%, 98%, 99% or 100% sequence identity with the sequence of the *Bacillus licheniformis* cell. Analogous sequences are determined by known methods of sequence alignment. A commonly used alignment method is BLAST, although there are other methods that also find use in aligning sequences.

As used herein, the term "hybridization" refers to the process by which a strand of nucleic acid joins with a complementary strand through base pairing, as known in the art. A nucleic acid sequence is considered to be "selectively hybridizable" to a reference nucleic acid sequence if the two sequences specifically hybridize to one another under moderate to high stringency hybridization and wash conditions. Hybridization conditions are based on the melting temperature ($T_m$) of the nucleic acid binding complex or probe. For example, "maximum stringency" typically occurs at about $T_m$ $-5°$ C. (5° below the $T_m$ of the probe); "high stringency" at about 5-10° C. below the $T_m$; "intermediate stringency" at about 10-20° C. below the $T_m$ of the probe; and "low stringency" at about 20-25° C. below the $T_m$. Functionally, maximum stringency conditions may be used to identify sequences having strict identity or near-strict identity with the hybridization probe; while an intermediate or low stringency hybridization can be used to identify or detect polynucleotide sequence homologs. Moderate and high stringency hybridization conditions are well known in the art. An example of high stringency conditions includes hybridization at about 42° C. in 50% formamide, 5×SSC, 5×Denhardt's solution, 0.5% SDS and 100 pg/ml denatured carrier DNA, followed by washing two times in 2×SSC and 0.5% SDS at room temperature (RT) and two additional times in 0.1×SSC and 0.5% SDS at 42° C. An example of moderate stringent conditions including overnight incubation at 37° C. in a solution comprising 20% formamide, 5×SSC (150 mM NaCl, 15 mM trisodium citrate), 50 mM sodium phosphate (pH 7.6), 5×Denhardt's solution, 10% dextran sulfate and 20 mg/ml denaturated sheared salmon sperm DNA, followed by washing the filters in 1×SSC at about 37-50° C. Those of skill in the art know how to adjust the temperature, ionic strength, etc. as necessary to accommodate factors such as probe length and the like.

As used herein, "recombinant" includes reference to a cell or vector, that has been modified by the introduction of a heterologous nucleic acid sequence or that the cell is derived from a cell so modified. Thus, for example, recombinant cells express genes that are not found in identical form within the native (non-recombinant) form of the cell or express native genes that are otherwise abnormally expressed, under expressed or not expressed at all as a result of deliberate human intervention. "Recombination", "recombining" or generating a "recombined" nucleic acid is generally the assembly of two or more nucleic acid fragments wherein the assembly gives rise to a chimeric gene.

As used herein, a "flanking sequence" refers to any sequence that is either upstream or downstream of the sequence being discussed (e.g., for genes A-B-C, gene B is flanked by the A and C gene sequences). In certain embodiments, the incoming sequence is flanked by a homology box on each side. In another embodiment, the incoming sequence and the homology boxes comprise a unit that is flanked by stuffer sequence on each side. In some embodiments, a flanking sequence is present on only a single side (either 3' or 5'), but in preferred embodiments, it is on each side of the sequence being flanked. The sequence of each homology box is homologous to a sequence in the *Bacillus* chromosome. These sequences direct where in the *Bacillus* chromosome the new construct gets integrated and what part of the *Bacillus* chromosome will be replaced by the incoming sequence. In other embodiments, the 5' and 3' ends of a selective marker are flanked by a polynucleotide sequence comprising a section of the inactivating chromosomal segment. In some embodiments, a flanking sequence is present on only a single side (either 3' or 5'), while in other embodiments, it is present on each side of the sequence being flanked.

As used herein, the term "stuffer sequence" refers to any extra DNA that flanks homology boxes (typically vector sequences). However, the term encompasses any non-homologous DNA sequence. Not to be limited by any theory, a stuffer sequence provides a non-critical target for a cell to initiate DNA uptake.

II. *B. Licheniformis* Rghr1/Rghr2 Transcriptional Regulators

The *Bacillus subtilis* yvaN gene was identified as a repressor of rapG, rapH (Hayashi et al., 2006) and rapD (Ogura & Fujita, 2007), and renamed rghR (rapG and rapH Repressor). Downstream of rghR lies a gene yvaO, with an unknown function, but based on sequence homology encodes a HTH-type (helix-turn-helix) transcriptional regulator. The amino acid sequence identity between "RghR" and "YvaO" is approximately 52%. Upstream of the *B. subtilis* rghR are the genes yvzC and yvaM. The yvzC gene also encodes a putative HTH-type transcriptional regulator, while the translation product of yvaM is a putative hydrolase.

More particularly, *Bacillus licheniformis* encodes two homologs of *Bacillus subtilis* RghR/YvaO, which are named "RghR1" and "RghR2". The amino acid sequence identity between the *B. subtilis* (strain 168) "RghR" protein and *B. licheniformis* (strain DSM 13) "RghR1" protein is approximately 59%; and the amino acid sequence identity between *B. subtilis* (strain 168) "RghR" and *B. licheniformis* (strain DSM 13) "RghR2" is approximately 57%.

Upstream of the *B. licheniformis* rghR1 are two genes, yvzC (BLi03645; SEQ ID NO: 17) and BLi03644 (SEQ ID NO: 19) transcriptional regulators. The *B. licheniformis* YvzC is a homolog of *B. subtilis* YvzC. However, Bli03644 belongs to the AbrB family of transcriptional regulators, and is not a homolog of the putative hydrolase YvaM.

More particularly, as presented and discussed in the Examples section below, *B. licheniformis* (strain DSM13=ATTC 14580) contains a gene, designated rghR2 (KEGG Genome T00200 *B. licheniformis* DSM13 Gene ID No. BLi03647), encoding a putative HTH-type transcriptional regulator. The nucleic acid sequence of rghR2 of *B. licheniformis* (DSM13) is presented in SEQ ID NO: 1 and the encoded amino acid sequence of the RghR2 protein of *Bacillus licheniformis* (DSM13) is presented in SEQ ID NO: 2.

For example, Applicant of the present disclosure sequenced (1) the genome of *B. licheniformis* strain Bra7, (2) the genome of a *B. licheniformis* derivative of strain Bra7, (3) the genome of *B. licheniformis* strain ATCC-9789 (atcc.org/Products/All/9789.aspx), and (4) the genome of *B. licheniformis* strain ATCC-6598 (atcc.org/en/Products/All/6598.aspx), which revealed that all of these *B. licheniformis* strains have a duplication (i.e., a repeat) of 18 nucleotides (18-bp) in the rghR2 gene (e.g., see SEQ ID NO:3, wherein nucleotides "GCCGCAGCCATTTCCAGA" are repeated twice in consecutive order, which nucleotide duplication is set forth in SEQ ID NO: 87) and wherein this 18-nucleotide sequence encodes amino acids "AAAISR" (SEQ ID NO: 5) such that the variant RghR2 protein of SEQ ID NO: 4 comprises a repeat of "AAAISR" (i.e., AAAISR-AAAISR; as presented in SEQ ID NO: 6).

Thus, the amino acid sequence of the RghR2 protein of the *B. licheniformis* Bra7 strain (SEQ ID NO: 4) is identical to the sequence of RghR2 of the *B. licheniformis* Bra7 derivative, the *B. licheniformis* strain ATCC-9789 and the *B. licheniformis* strain ATCC-6598, as presented in SEQ ID NO: 4.

An alignment of the *B. licheniformis* Bra7 strain RghR2 protein amino acid sequence (SEQ ID NO: 4) and the *B. licheniformis* DSM13 strain RghR2 protein amino acid sequence (SEQ ID NO: 2) is presented FIG. 1, illustrating the repeat (AAAISR) in SEQ ID NO: 4. The insertion (repeat) of the sequence "AAAISR" is in the helix-turn-helix (HTH) domain and near the sequence-specific DNA-binding site of the RghR2 protein as shown in FIG. 8.

For example, a RghR2 protein of SEQ ID NO: 4 (e.g., encoded by a rghR2$_{dup}$ gene) comprises 140 amino acid residues, a molecular weight of ~16.1 kDa, a theoretical net charge of $^+$4.5 and theoretical isoelectric point ($P_I$) of 9.38 (molecular weight, net charge and $P_I$ calculation based on 1° amino acid sequence), whereas a RghR2 protein of SEQ ID NO: 2 (e.g., encoded by a native or rghR2$_{rest}$ gene) comprises 134 amino acid residues, a molecular weight of ~15.6 kDa, a theoretical net charge of $^+$3.5 and a theoretical isoelectric point (P$_I$) of 8.85 (molecular weight, net charge and P$_I$ calculation based on 1° amino acid sequence). Likewise, assessment of RghR2 protein sequence using Pfam analysis (version 31.0) indicates that the Rgh2 protein comprises a helix-turn-helix (HTH) domain of HTH family_31 (HTH_31; clan-0123), which HTH domain is comprised within amino residues 5-58 of the RghR2 protein of SEQ ID NO: 2. For example, the rghR2 gene of the *B. licheniformis* Bra7 strain, encoding the variant RghR2 protein of SEQ ID NO: 4, comprises a duplication of the six amino acid repeat "AAAISR" (FIG. 1), which six amino acid repeat is located approximately in the middle of the HTH domain (amino acid) sequence.

Figure 4:
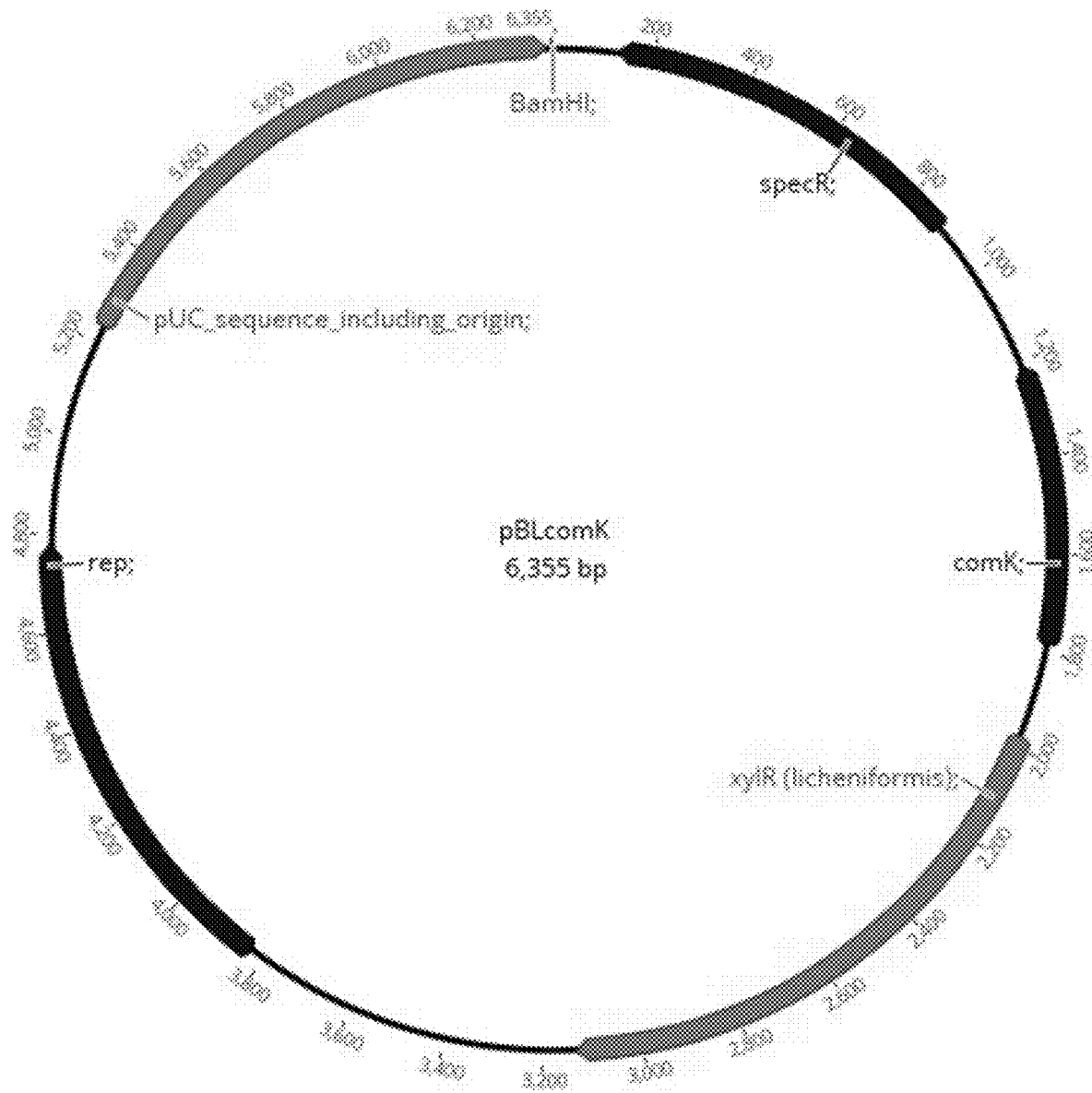
FIG. 4 shows a map of plasmid "pBLComK". This plasmid includes DNA sequences encoding the pBR322 origin of replication, the *Enterococcus faecalis* Spectinomycin resistance (Spec$^r$) gene spc (also called aad9), the *B. subtilis* (natto) plasmid pTA1060 rep gene for replication in Bacilli, the *B. licheniformis* comK gene (controlled by the *B. subtilis* xylA promoter), and the *B. subtilis* xylR gene.

Without wishing to be bound by a particular theory, mechanism or mode of operation, it is contemplated herein that the insertion (repeat) of the sequence "AAAISR" in SEQ ID NO: 4, significantly affects, or even completely abolishes, the function of the RghR2 protein as a transcriptional regulator. For example, as a transcription regulator, RghR2 will directly and indirectly regulate the expression of several other genes (e.g., see Example 3). Thus, inactivation of RghR2 by this 18-bp nucleotide duplication encoding the "AAAISR" amino acid repeat set forth in SEQ ID NO: 6 is contemplated to affect the physiology of the cell and as such, may impact factors like cell growth and heterologous protein production. More particularly, the impact of this 18-bp nucleotide duplication present in SEQ ID NO: 3 was further studied in the Example 2, by removing (e.g., deleting) the 18-bp duplication in the rghR2 gene in the *B. licheniformis* derivative of Bra7 (strain) cells producing various heterologous enzymes. More particularly, as presented in FIG. 4, deletion of the rhgR2 18-bp duplication showed a decrease in biomass when cultured, but at the same time demonstrated an improved amylase production titer (i.e., increased production of a protein of interest). Thus, as presented in FIG. 5, the specific productivity (enzyme production/OD$_{600}$) improved by at least a factor 2 in the rghR2 restored (i.e., Δ18-bp duplication) strain.

III. Transcriptome Analysis of Genes Up-Regulated and Down-Regulated in *B. Licheniformis* Rghr2 Variant and Rghr2 Restored Cells As set forth in Example 3, transcriptome analysis of the *B. licheniformis* derivative of Bra7 strain cells (i.e., comprising rghR2 with the 18-bp duplication; SEQ ID NO: 3) and the rghR2 restored variant of this strain (i.e., via removal of the 18-bp duplication; SEQ ID NO: 1), revealed that the transcription of several genes are regulated by RghR2. For example, the transcription of genes upregulated and downregulated by at least two-fold in the rghR2 restored strain (i.e., relative to the rghR2 inactive strain comprising the 18-bp duplication) are indicated in Example 3, TABLE 2 and TABLE 3, respectively.

Figure 7:
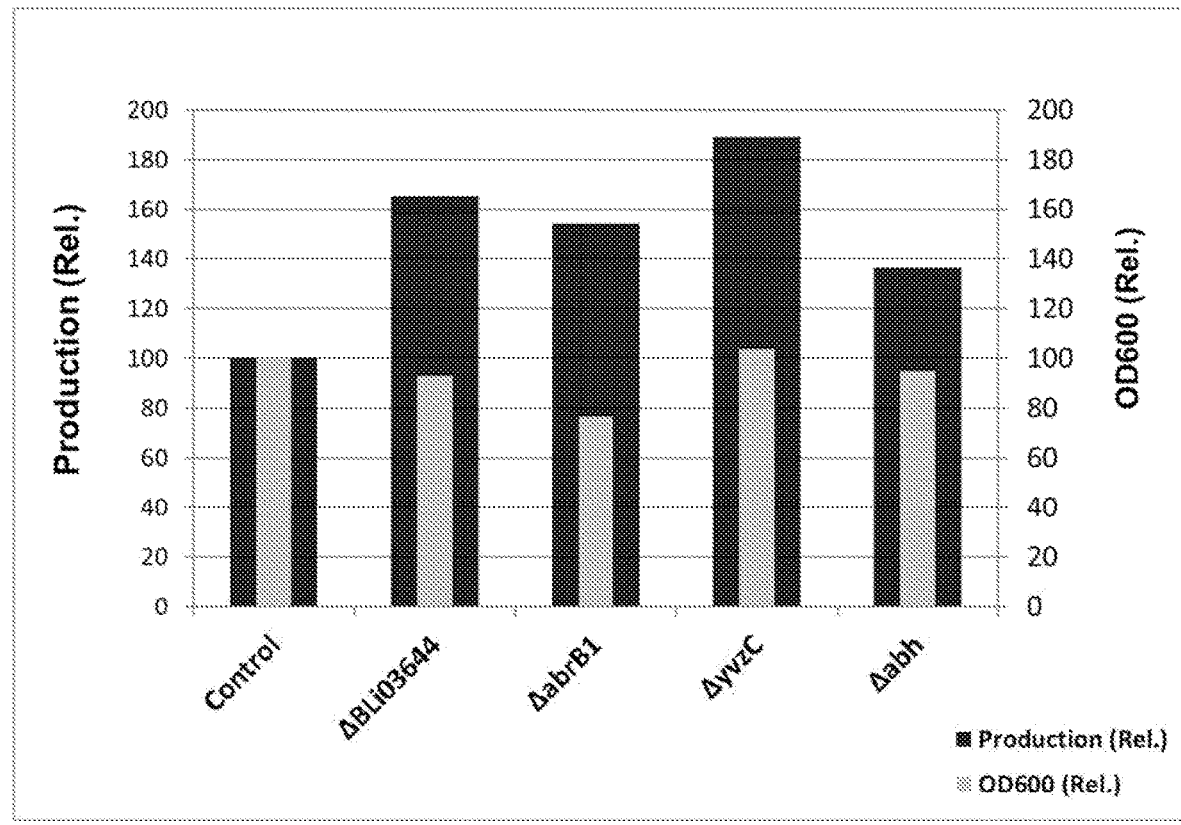
FIG. 7 shows the (protein) production of a *P. curdlanolyticus* α-amylase (black bars) expressed in modified *B. licheniformis* host cells comprising a disrupted BLi03644 gene (ΔBLi03644), a disrupted abrB1 gene (ΔabrB1), a disrupted yvzC gene (ΔyvzC) or a disrupted abh gene (Δabh), relative to the (parental) control host cell. The OD$_{600}$ of these cell cultures are presented as grey bars in FIG. 7.

More particularly, it is contemplated herein that the deletion, disruption, inactivation or down-regulation of one or more the genes in TABLE 3, in either rghR2 restored *B. licheniformis* strains (i.e., comprising the rghR2 gene encoding the RghR2 protein of SEQ ID NO: 2) or rghR2 inactivated *B. licheniformis* strains (i.e., comprising the rghR2 gene encoding the RghR2 protein of SEQ ID NO: 4) will have a positive effect on protein production in these modified host cells, similar to the effect observed by re-activation of rghR2 gene (i.e., via removal/deletion of the 18-bp repeat in the rghR2 gene). Thus, as presented in Example 4, the effect of inactivation (e.g., a deletion, disruption or down-regulation) of a subset of these genes (i.e., Bli03644 (SEQ ID NO: 19); yvzC (SEQ ID NO: 17); abrB1 (SEQ ID NO: 21) and abh (SEQ ID NO: 23)) on heterologous protein production was explored. For example, the Bli03644, abrB1, yvzC and abh genes were inactivated by insertion of antibiotic marker in a *B. licheniformis* Bra7 derivative producing a heterologous α-amylase. Thus, the amylase production was determined in four single knock-out strains (i.e., ΔBLi03644, ΔabrB1, ΔyvzC and Δabh) and compared to the parental strain as control (as described in Example 2). More particularly, as presented in FIG. 7, inactivation of Bli03644, abrB1, yvzC and abh resulted in improved α-amylase production, while cell growth (OD$_{600}$) was less affected (i.e., demonstrating an increased specific productivity, Qp).

IV. Molecular Biology

As set forth above, certain embodiments of the disclosure are related to modified *B. licheniformis* cells derived from parental *B. licheniformis* cells comprising a rghR2 gene encoding a RghR2 protein comprising 90% sequence identity to SEQ ID NO: 4, wherein the modified cells comprise a genetic modification of the rghR2 gene which encodes a RghR2 protein comprising 90% sequence identity to SEQ ID NO: 2. In other embodiments the disclosure is related to modified *B. licheniformis* cells derived from parental *B. licheniformis* cells comprising a rghR2 gene encoding a RghR2 protein of SEQ ID NO: 4, wherein the modified cells comprise a restored rghR2 gene encoding a RghR2 protein of SEQ ID NO: 2. In another embodiment the disclosure is related to modified *B. licheniformis* cells derived from parental *B. licheniformis* cells comprising a rghR2 gene encoding a RghR2 protein comprising 90% sequence identity to SEQ ID NO: 2 and a genetic modification which deletes, disrupts, inactivates or down-regulates at least one endogenous *B. licheniformis* gene selected from the group consisting of abrB1, rpmJ, rpIM, BLi00412, rapK, phrK, BLi00753, yfjT, BLi00828, yhdX, yhzC, terf2, zosA, abbA, speG, yppF, BLi02543, mntR, BLi02768, sspA, BLi03127, BLi03635, mrgA, BLi03644, yvzC, rghR1, spo0F, ywjG, ywq12, BLi04199, BLi04200, licT, bglH and bglP. In another embodiment the disclosure is related to modified *B. licheniformis* cells derived from parental *B. licheniformis* cells comprising a rghR2 gene encoding a RghR2 protein comprising 90% sequence identity to SEQ ID NO: 4 and a genetic modification which deletes, disrupts, inactivates or down-regulates at least one endogenous *B. licheniformis* gene selected from the group consisting of abrB1, rpmJ, rpIM, BLi00412, rapK, phrK, BLi00753, yfjT, BLi00828, yhdX, yhzC, terf2, zosA, abbA, speG, yppF, BLi02543, mntR, BLi02768, sspA, BLi03127, BLi03635, mrgA, BLi03644, yvzC, rghR1, spo0F, ywjG, ywq12, BLi04199, BLi04200, licT, bglH and bglP. Other embodiments are related to genetic modifications which alter the coding sequence of an RghR2 protein's HTH domain.

Thus, certain embodiments of the disclosure provide compositions and methods for genetically modifying (altering) a parental *B. licheniformis* cell of the disclosure to generate modified (rghR2$_{rest}$) cells, and more particularly, modified *B. licheniformis* (rghR2$_{rest}$) cells which produce an increased amount of an endogenous or heterologous protein of interest (i.e., relative to the (unmodified) parental *B. licheniformis* cells).

Thus, certain embodiments of the disclosure are directed to methods for genetically modifying *Bacillus* cells, wherein the modification comprises, but is not limited to, (a) the introduction, substitution, or removal of one or more nucleotides in a gene (or an ORF thereof), or the introduction, substitution, or removal of one or more nucleotides in a regulatory element required for the transcription or translation of the gene or ORF thereof, (b) a gene disruption, (c) a gene conversion, (d) a gene deletion, (e) a gene down-regulation, (f) site specific mutagenesis and/or (g) random mutagenesis. For example, as used herein a genetic modification includes, but is not limited to, a modification of one or more genes selected from the group consisting of rghR1, rghR2, abrB1, rpmJ, rpIM, BLi00412, rapK, phrK, BLi00753, yfjT, BLi00828, yhdX, yhzC, terf2, zosA, abbA, speG, yppF, BLi02543, mntR, BLi02768, sspA, BLi03127, BLi03635, mrgA, BLi103644, yvzC, spo0F, ywjG, ywq12, BLi04199, BLi04200, licT, bglH and bglP.

In certain embodiments, a modified *Bacillus* cell of the disclosure is constructed by reducing or eliminating the expression of a gene set forth above, using methods well known in the art, for example, insertions, disruptions, replacements, or deletions. The portion of the gene to be modified or inactivated may be, for example, the coding region or a regulatory element required for expression of the coding region.

An example of such a regulatory or control sequence may be a promoter sequence or a functional part thereof, (i.e., a part which is sufficient for affecting expression of the nucleic acid sequence). Other control sequences for modification include, but are not limited to, a leader sequence, a propeptide sequence, a signal sequence, a transcription terminator, a transcriptional activator and the like.

In certain other embodiments a modified *Bacillus* cell is constructed by gene deletion to eliminate or reduce the expression of at least one of the aforementioned genes of the disclosure. Gene deletion techniques enable the partial or complete removal of the gene(s), thereby eliminating their expression, or expressing a non-functional (or reduced activity) protein product. In such methods, the deletion of the gene(s) may be accomplished by homologous recombination using a plasmid that has been constructed to contiguously contain the 5' and 3' regions flanking the gene. The contiguous 5' and 3' regions may be introduced into a *Bacillus* cell, for example, on a temperature-sensitive plasmid, such as pE194, in association with a second selectable marker at a permissive temperature to allow the plasmid to become established in the cell. The cell is then shifted to a non-permissive temperature to select for cells that have the plasmid integrated into the chromosome at one of the homologous flanking regions. Selection for integration of the plasmid is effected by selection for the second selectable marker. After integration, a recombination event at the second homologous flanking region is stimulated by shifting the cells to the permissive temperature for several generations without selection. The cells are plated to obtain single colonies and the colonies are examined for loss of both selectable markers (see, e.g., Perego, 1993). Thus, a person of skill in the art (e.g., by reference to the rghR1, rghR2, abrB1, rpmJ, rpIM, BLi00412, rapK, phrK, BLi00753, yfjT, BLi00828, yhdX, yhzC, terf2, zosA, abbA, speG, yppF, BLi02543, mntR, BLi02768, sspA, BLi03127, BLi03635, mrgA, BLi03644, yvzC, spo0F, ywjG, ywq12, BLi04199, BLi04200, licT, bglH and bglP gene (nucleic acid) sequences and the encoded protein sequences thereof), may readily identify nucleotide regions in the gene's coding sequence and/or the gene's non-coding sequence suitable for complete or partial deletion.

In other embodiments, a modified *Bacillus* cell of the disclosure is constructed by introducing, substituting, or removing one or more nucleotides in the gene or a regulatory element required for the transcription or translation thereof.

For example, nucleotides may be inserted or removed so as to result in the introduction of a stop codon, the removal of the start codon, or a frame-shift of the open reading frame. Such a modification may be accomplished by site-directed mutagenesis or PCR generated mutagenesis in accordance with methods known in the art (e.g., see, Botstein and Shortle, 1985; Lo et al., 1985; Higuchi et al., 1988; Shimada, 1996; Ho et al., 1989; Horton et al., 1989 and Sarkar and Sommer, 1990). Thus, in certain embodiments, a gene of the disclosure is inactivated by complete or partial deletion.

In another embodiment, a modified *Bacillus* cell is constructed by the process of gene conversion (e.g., see Iglesias and Trautner, 1983). For example, in the gene conversion method, a nucleic acid sequence corresponding to the gene (s) is mutagenized in vitro to produce a defective nucleic acid sequence, which is then transformed into the parental *Bacillus* cell to produce a defective gene. By homologous recombination, the defective nucleic acid sequence replaces the endogenous gene. It may be desirable that the defective gene or gene fragment also encodes a marker which may be used for selection of transformants containing the defective gene. For example, the defective gene may be introduced on a non-replicating or temperature-sensitive plasmid in association with a selectable marker. Selection for integration of the plasmid is effected by selection for the marker under conditions not permitting plasmid replication. Selection for a second recombination event leading to gene replacement is effected by examination of colonies for loss of the selectable marker and acquisition of the mutated gene (Perego, 1993). Alternatively, the defective nucleic acid sequence may contain an insertion, substitution, or deletion of one or more nucleotides of the gene, as described below.

In other embodiments, a modified *Bacillus* cell is constructed by established anti-sense techniques using a nucleotide sequence complementary to the nucleic acid sequence of the gene (Parish and Stoker, 1997). More specifically, expression of the gene by a *Bacillus* cell may be reduced (down-regulated) or eliminated by introducing a nucleotide sequence complementary to the nucleic acid sequence of the gene, which may be transcribed in the cell and is capable of hybridizing to the mRNA produced in the cell. Under conditions allowing the complementary anti-sense nucleotide sequence to hybridize to the mRNA, the amount of protein translated is thus reduced or eliminated. Such anti-sense methods include, but are not limited to RNA interference (RNAi), small interfering RNA (siRNA), microRNA (miRNA), antisense oligonucleotides, and the like, all of which are well known to the skilled artisan.

In other embodiments, a modified *Bacillus* cell is produced/constructed via CRISPR-Cas9 editing. For example, a gene encoding rghR1, rghR2, abrB1, rpmJ, rpIM, BLi00412, rapK, phrK, BLi00753, yfjT, BLi00828, yhdX, yhzC, terf2, zosA, abbA, speG, yppF, BLi02543, mntR, BLi02768, sspA, BLi03127, BLi03635, mrgA, BLi03644, yvzC, spo0F, ywjG, ywq12, BLi04199, BLi04200, licT, bglH and/or bglP can be disrupted (or deleted or down-regulated) by means of nucleic acid guided endonucleases, that find their target DNA by binding either a guide RNA (e.g., Cas9) and Cpf1 or a guide DNA (e.g., NgAgo), which recruits the endonuclease to the target sequence on the DNA, wherein the endonuclease can generate a single or double stranded break in the DNA. This targeted DNA break becomes a substrate for DNA repair, and can recombine with a provided editing template to disrupt or delete the gene. For example, the gene encoding the nucleic acid guided endonuclease (for this purpose Cas9 from *S. pyogenes*) or a codon optimized gene encoding the Cas9 nuclease is operably linked to a promoter active in the *Bacillus* cell and a terminator active in *Bacillus* cell, thereby creating a *Bacillus* Cas9 expression cassette. Likewise, one or more target sites unique to the gene of interest are readily identified by a person skilled in the art. For example, to build a DNA construct encoding a gRNA-directed to a target site within the gene of interest, the variable targeting domain (VT) will comprise nucleotides of the target site which are 5' of the (PAM) protospacer adjacent motif (TGG), which nucleotides are fused to DNA encoding the Cas9 endonuclease recognition domain for *S. pyogenes* Cas9 (CER). The combination of the DNA encoding a VT domain and the DNA encoding the CER domain thereby generate a DNA encoding a gRNA. Thus, a *Bacillus* expression cassette for the gRNA is created by operably linking the DNA encoding the gRNA to a promoter active in *Bacillus* cells and a terminator active in *Bacillus* cells.

In certain embodiments, the DNA break induced by the endonuclease is repaired/replaced with an incoming sequence. For example, to precisely repair the DNA break generated by the Cas9 expression cassette and the gRNA expression cassette described above, a nucleotide editing template is provided, such that the DNA repair machinery of the cell can utilize the editing template. For example, about 500 bp 5' of targeted gene can be fused to about 500 bp 3' of the targeted gene to generate an editing template, which template is used by the *Bacillus* host's machinery to repair the DNA break generated by the RGEN.

The Cas9 expression cassette, the gRNA expression cassette and the editing template can be co-delivered to filamentous fungal cells using many different methods (e.g., protoplast fusion, electroporation, natural competence, or induced competence). The transformed cells are screened by PCR amplifying the target gene locus, by amplifying the locus with a forward and reverse primer. These primers can amplify the wild-type locus or the modified locus that has been edited by the RGEN. These fragments are then sequenced using a sequencing primer to identify edited colonies (e.g., see Examples 6 and 7 below).

In yet other embodiments, a modified *Bacillus* cell is constructed by random or specific mutagenesis using methods well known in the art, including, but not limited to, chemical mutagenesis (see, e.g., Hopwood, 1970) and transposition (see, e.g., Youngman et al., 1983). Modification of the gene may be performed by subjecting the parental cell to mutagenesis and screening for mutant cells in which expression of the gene has been reduced or eliminated. The mutagenesis, which may be specific or random, may be performed, for example, by use of a suitable physical or chemical mutagenizing agent, use of a suitable oligonucleotide, or subjecting the DNA sequence to PCR generated mutagenesis. Furthermore, the mutagenesis may be performed by use of any combination of these mutagenizing methods.

Examples of a physical or chemical mutagenizing agent suitable for the present purpose include ultraviolet (UV) irradiation, hydroxylamine, N-methyl-N'-nitro-N-nitrosoguanidine (MNNG), N-methyl-N'-nitrosoguanidine (NTG), O-methyl hydroxylamine, nitrous acid, ethyl methane sulphonate (EMS), sodium bisulphite, formic acid, and nucleotide analogues. When such agents are used, the mutagenesis is typically performed by incubating the parental cell to be mutagenized in the presence of the mutagenizing agent of choice under suitable conditions, and selecting for mutant cells exhibiting reduced or no expression of the gene.

In certain other embodiments, a modified *Bacillus* cell comprises a deletion of an endogenous gene selected from rghR1, rghR2, abrB1, rpmJ, rpIM, BLi00412, rapK, phrK, BLi00753, yfjT, BLi00828, yhdX, yhzC, terf2, zosA, abbA, speG, yppF, BLi02543, mntR, BLi02768, sspA, BLi03127, BLi03635, mrgA, BLi03644, yvzC, spo0F, ywjG, ywq12, BLi04199, BLi04200, licT, bglH and bglP. Thus, in certain of these embodiments, the modified *Bacillus* cell is constructed as described above.

In other embodiments, a modified *Bacillus* cell comprises a disruption of an endogenous gene selected from rghR1, rghR2, abrB1, rpmJ, rpIM, BLi00412, rapK, phrK, BLi00753, yfjT, BLi00828, yhdX, yhzC, terf2, zosA, abbA, speG, yppF, BLi02543, mntR, BLi02768, sspA, BLi03127, BLi03635, mrgA, BLi03644, yvzC, spo0F, ywjG, ywq12, BLi04199, BLi04200, licT, bglH and bglP. In certain embodiments, a polynucleotide disruption cassette of the disclosure comprises a marker gene.

In other embodiments, a modified *Bacillus* cell comprises a down-regulated endogenous gene selected from rghR1, rghR2, abrB1, rpmJ, rpIM, BLi00412, rapK, phrK, BLi00753, yfjT, BLi00828, yhdX, yhzC, terf2, zosA, abbA, speG, yppF, BLi02543, mntR, BLi02768, sspA, BLi03127, BLi03635, mrgA, BLi03644, yvzC, spo0F, ywjG, ywq12, BLi04199, BLi04200, licT, bglH and bglP. For example, in certain embodiments, down-regulating one or more genes set forth above comprises deleting or disrupting the gene's upstream or downstream regulatory elements.

International PCT Publication No. WO2003/083125 discloses methods for modifying *Bacillus* cells, such as the creation of *Bacillus* deletion strains and DNA constructs using PCR fusion to bypass *E. coli*. PCT Publication No. WO2002/14490 discloses methods for modifying *Bacillus* cells including (1) the construction and transformation of an integrative plasmid (pComK), (2) random mutagenesis of coding sequences, signal sequences and pro-peptide sequences, (3) homologous recombination, (4) increasing transformation efficiency by adding non-homologous flanks to the transformation DNA, (5) optimizing double crossover integrations, (6) site directed mutagenesis and (7) marker-less deletion.

Those of skill in the art are well aware of suitable methods for introducing polynucleotide sequences into bacterial cells (e.g., *E. coli* and *Bacillus* spp.) (e.g., Ferrari et al., 1989; Saunders et al., 1984; Hoch et al., 1967; Mann et al., 1986; Holubova, 1985; Chang et al., 1979; Vorobjeva et al., 1980; Smith et al., 1986; Fisher et. al., 1981 and McDonald, 1984). Indeed, such methods as transformation including protoplast transformation and congression, transduction, and protoplast fusion are known and suited for use in the present disclosure. Methods of transformation are particularly preferred to introduce a DNA construct of the present disclosure into a host cell.

In addition to commonly used methods, in some embodiments, host cells are directly transformed (i.e., an intermediate cell is not used to amplify, or otherwise process, the DNA construct prior to introduction into the host cell). Introduction of the DNA construct into the host cell includes those physical and chemical methods known in the art to introduce DNA into a host cell, without insertion into a plasmid or vector. Such methods include, but are not limited to, calcium chloride precipitation, electroporation, naked DNA, liposomes and the like. In additional embodiments, DNA constructs are co-transformed with a plasmid without being inserted into the plasmid. In further embodiments, a selective marker is deleted or substantially excised from the modified *Bacillus* strain by methods known in the art (e.g., Stahl et al., 1984 and Palmeros et al., 2000). In some embodiments, resolution of the vector from a host chromosome leaves the flanking regions in the chromosome, while removing the indigenous chromosomal region.

Promoters and promoter sequence regions for use in the expression of genes, open reading frames (ORFs) thereof and/or variant sequences thereof in *Bacillus* cells are generally known on one of skill in the art. Promoter sequences of the disclosure of the disclosure are generally chosen so that they are functional in the *Bacillus* cells (e.g., *B. licheniformis* cells, *B. subtilis* cells and the like). Certain exemplary *Bacillus* promoter sequences are presented in TABLE 6. Likewise, promoters useful for driving gene expression in *Bacillus* cells include, but are not limited to, the *B. subtilis* alkaline protease (aprE) promoter (Stahl et al., 1984), the α-amylase promoter of *B. subtilis* (Yang et al., 1983), the α-amylase promoter of *B. amyloliquefaciens* (Tarkinen et al., 1983), the neutral protease (nprE) promoter from *B. subtilis* (Yang et al., 1984), a mutant aprE promoter (PCT Publication No. WO2001/51643) or any other promoter from *B. licheniformis* or other related Bacilli. In certain other embodiments, the promoter is a ribosomal protein promoter or a ribosomal RNA promoter (e.g., the rrnI promoter) disclosed in U.S. Patent Publication No. 2014/0329309. Methods for screening and creating promoter libraries with a range of activities (promoter strength) in *Bacillus* cells is describe in PCT Publication No. WO2003/089604.

V. Culturing Modified Cells for Production of a Protein of Interest

In other embodiments, the present disclosure provides methods for increasing the protein productivity of a modified *Bacillus* cell, as compared (i.e., relative) to an unmodified (parental) cell. In certain embodiments, the instant disclosure is directed to methods of producing a protein of interest (POI) comprising fermenting/cultivating a modified bacterial cell, wherein the modified cell secrets the POI into the culture medium. Fermentation methods well known in the art can be applied to ferment the modified and unmodified *Bacillus* cells of the disclosure.

In some embodiments, the cells are cultured under batch or continuous fermentation conditions. A classical batch fermentation is a closed system, where the composition of the medium is set at the beginning of the fermentation and is not altered during the fermentation. At the beginning of the fermentation, the medium is inoculated with the desired organism(s). In this method, fermentation is permitted to occur without the addition of any components to the system. Typically, a batch fermentation qualifies as a "batch" with respect to the addition of the carbon source, and attempts are often made to control factors such as pH and oxygen concentration. The metabolite and biomass compositions of the batch system change constantly up to the time the fermentation is stopped. Within typical batch cultures, cells can progress through a static lag phase to a high growth log phase, and finally to a stationary phase, where growth rate is diminished or halted. If untreated, cells in the stationary phase eventually die. In general, cells in log phase are responsible for the bulk of production of product.

A suitable variation on the standard batch system is the "fed-batch fermentation" system. In this variation of a typical batch system, the substrate is added in increments as the fermentation progresses. Fed-batch systems are useful when catabolite repression likely inhibits the metabolism of the cells and where it is desirable to have limited amounts of substrate in the medium. Measurement of the actual substrate concentration in fed-batch systems is difficult and is therefore estimated on the basis of the changes of measurable factors, such as pH, dissolved oxygen and the partial pressure of waste gases, such as $CO_2$. Batch and fed-batch fermentations are common and known in the art.

Continuous fermentation is an open system where a defined fermentation medium is added continuously to a bioreactor, and an equal amount of conditioned medium is removed simultaneously for processing. Continuous fermentation generally maintains the cultures at a constant high density, where cells are primarily in log phase growth. Continuous fermentation allows for the modulation of one or more factors that affect cell growth and/or product concentration. For example, in one embodiment, a limiting nutrient, such as the carbon source or nitrogen source, is maintained at a fixed rate and all other parameters are allowed to moderate. In other systems, a number of factors affecting growth can be altered continuously while the cell concentration, measured by media turbidity, is kept constant. Continuous systems strive to maintain steady state growth conditions. Thus, cell loss due to medium being drawn off should be balanced against the cell growth rate in the fermentation. Methods of modulating nutrients and growth factors for continuous fermentation processes, as well as techniques for maximizing the rate of product formation, are well known in the art of industrial microbiology.

Thus, in certain embodiments, a POI produced by a transformed (modified) host cell may be recovered from the culture medium by conventional procedures including separating the host cells from the medium by centrifugation or filtration, or if necessary, disrupting the cells and removing the supernatant from the cellular fraction and debris. Typically, after clarification, the proteinaceous components of the supernatant or filtrate are precipitated by means of a salt, e.g., ammonium sulfate. The precipitated proteins are then solubilized and may be purified by a variety of chromatographic procedures, e.g., ion exchange chromatography, gel filtration.

VI. Proteins of Interest Produced by Modified (Host) Cells

A protein of interest (POI) of the instant disclosure can be any endogenous or heterologous protein, and it may be a variant of such a POI. The protein can contain one or more disulfide bridges or is a protein whose functional form is a monomer or a multimer, i.e., the protein has a quaternary structure and is composed of a plurality of identical (homologous) or non-identical (heterologous) subunits, wherein the POI or a variant POI thereof is preferably one with properties of interest.

For example, as set forth in the Examples below, the modified (rghR2$_{rest}$) *Bacillus* cells of the disclosure produce increased amounts of heterologous POIs (e.g., heterologous amylases set forth in Examples 2 and 5), while showing a decrease in biomass when cultured. Thus, in certain embodiments, a modified cell of the disclosure expresses an endogenous POI, a heterologous POI or a combination of one or more thereof. For example, in certain embodiments, a modified *Bacillus* cell of the disclosure produces at least about 0.1% more, at least about 0.5% more, at least about 1% more, at least about 5% more, at least about 6% more, at least about 7% more, at least about 8% more, at least about 9% more, or at least about 10% or more of a POI, relative to its unmodified (parental) cell.

In certain embodiments, a modified *Bacillus* cell of the disclosure exhibits an increased specific productivity (Qp) of a POI relative the (unmodified) parental *Bacillus* cell. For example, the detection of specific productivity (Qp) is a suitable method for evaluating protein production. The specific productivity (Qp) can be determined using the following equation:

"Qp=gP/gDCW·hr"

wherein, "gP" is grams of protein produced in the tank; "gDCW" is grams of dry cell weight (DCW) in the tank and "hr" is fermentation time in hours from the time of inoculation, which includes the time of production as well as growth time.

Thus, in certain other embodiments, a modified *Bacillus* cell of the disclosure comprises a specific productivity (Qp) increase of at least about 0.1%, at least about 1%, at least about 5%, at least about 6%, at least about 7%, at least about 8%, at least about 9%, or at least about 10% or more, relative to the unmodified (parental) cell.

In certain embodiments, a POI or a variant POI thereof is selected from the group consisting of acetyl esterases, aminopeptidases, amylases, arabinases, arabinofuranosidases, carbonic anhydrases, carboxypeptidases, catalases, cellulases, chitinases, chymosins, cutinases, deoxyribonucleases, epimerases, esterases, α-galactosidases, β-galactosidases, α-glucanases, glucan lysases, endo-β-glucanases, glucoamylases, glucose oxidases, α-glucosidases, β-glucosidases, glucuronidases, glycosyl hydrolases, hemicellulases, hexose oxidases, hydrolases, invertases, isomerases, laccases, ligases, lipases, lyases, mannosidases, oxidases, oxidoreductases, pectate lyases, pectin acetyl esterases, pectin depolymerases, pectin methyl esterases, pectinolytic enzymes, perhydrolases, polyol oxidases, peroxidases, phenoloxidases, phytases, polygalacturonases, proteases, peptidases, rhamno-galacturonases, ribonucleases, transferases, transport proteins, transglutaminases, xylanases, hexose oxidases, and combinations thereof.

Thus, in certain embodiments, a POI or a variant POI thereof is an enzyme selected from Enzyme Commission (EC) Number EC 1, EC 2, EC 3, EC 4, EC 5 or EC 6.

For example, in certain embodiments a POI is an oxidoreductase enzyme, including, but not limited to, an EC 1 (oxidoreductase) enzyme selected from EC 1.10.3.2 (e.g., a laccase), EC 1.10.3.3 (e.g., L-ascorbate oxidase), EC 1.1.1.1 (e.g., alcohol dehydrogenase), EC 1.11.1.10 (e.g., chloride peroxidase), EC 1.11.1.17 (e.g., peroxidase), EC 1.1.1.27 (e.g., L-lactate dehydrogenase), EC 1.1.1.47 (e.g., glucose 1-dehydrogenase), EC 1.1.3.X (e.g., glucose oxidase), EC 1.1.3.10 (e.g., pyranose oxidase), EC 1.13.11.X (e.g., dioxygenase), EC 1.13.11.12 (e.g., lineolate 13S-lipozygenase), EC 1.1.3.13 (e.g., alcohol oxidase), EC 1.14.14.1 (e.g., monooxygenase), EC 1.14.18.1 (e.g., monophenol monooxigenase) EC 1.15.1.1 (e.g., superoxide dismutase), EC 1.1.5.9 (formerly EC 1.1.99.10, e.g., glucose dehydrogenase), EC 1.1.99.18 (e.g., cellobiose dehydrogenase), EC 1.1.99.29 (e.g., pyranose dehydrogenase), EC 1.2.1.X (e.g., fatty acid reductase), EC 1.2.1.10 (e.g., acetaldehyde dehydrogenase), EC 1.5.3.X (e.g., fructosyl amine reductase), EC 1.8.1.X (e.g., disulfide reductase) and EC 1.8.3.2 (e.g., thiol oxidase).

In certain embodiments a POI is a transferase enzyme, including, but not limited to, an EC 2 (transferase) enzyme selected from EC 2.3.2.13 (e.g., transglutaminase), EC 2.4.1.X (e.g., hexosyltransferase), EC 2.4.1.40 (e.g., alternasucrase), EC 2.4.1.18 (e.g., 1,4 alpha-glucan branching enzyme), EC 2.4.1.19 (e.g., cyclomaltodextrin glucanotransferase), EC 2.4.1.2 (e.g., dextrin dextranase), EC 2.4.1.20 (e.g., cellobiose phosphorylase), EC 2.4.1.25 (e.g., 4-alpha-glucanotransferase), EC 2.4.1.333 (e.g., 1,2-beta-oligoglucan phosphor transferase), EC 2.4.1.4 (e.g., amylosucrase), EC 2.4.1.5 (e.g., dextransucrase), EC 2.4.1.69 (e.g., galactoside 2-alpha-L-fucosyl transferase), EC 2.4.1.9 (e.g., inulosucrase), EC 2.7.1.17 (e.g., xylulokinase), EC 2.7.7.89 (formerly EC 3.1.4.15, e.g., [glutamine synthetase]-adenylyl-L-tyrosine phosphorylase), EC 2.7.9.4 (e.g., alpha glucan kinase) and EC 2.7.9.5 (e.g., phosphoglucan kinase).

In other embodiments a POI is a hydrolase enzyme, including, but not limited to, an EC 3 (hydrolase) enzyme selected from EC 3.1.X.X (e.g., an esterase), EC 3.1.1.1 (e.g., pectinase), EC 3.1.1.14 (e.g., chlorophyllase), EC 3.1.1.20 (e.g., tannase), EC 3.1.1.23 (e.g., glycerol-ester acylhydrolase), EC 3.1.1.26 (e.g., galactolipase), EC 3.1.1.32 (e.g., phospholipase A1), EC 3.1.1.4 (e.g., phospholipase A2), EC 3.1.1.6 (e.g., acetylesterase), EC 3.1.1.72 (e.g., acetylxylan esterase), EC 3.1.1.73 (e.g., feruloyl esterase), EC 3.1.1.74 (e.g., cutinase), EC 3.1.1.86 (e.g., rhamnogalacturonan acetylesterase), EC 3.1.1.87 (e.g., fumosin B1 esterase), EC 3.1.26.5 (e.g., ribonuclease P), EC 3.1.3.X (e.g., phosphoric monoester hydrolase), EC 3.1.30.1 (e.g., *Aspergillus* nuclease S1) EC 3.1.30.2 (e.g., *Serratia marcescens* nuclease), EC 3.1.3.1 (e.g., alkaline phosphatase), EC 3.1.3.2 (e.g., acid phosphatase), EC 3.1.3.8 (e.g., 3-phytase), EC 3.1.4.1 (e.g., phosphodiesterase I), EC 3.1.4.11 (e.g., phosphoinositide phospholipase C), EC 3.1.4.3 (e.g., phospholipase C), EC 3.1.4.4 (e.g., phospholipase D), EC 3.1.6.1 (e.g., arylsufatase), EC 3.1.8.2 (e.g., diisopropyl-fluorophosphatase), EC 3.2.1.10 (e.g., oligo-1,6-glucosidase), EC 3.2.1.101 (e.g., mannan endo-1,6-alpha-mannosidase), EC 3.2.1.11 (e.g., alpha-1,6-glucan-6-glucanohydrolase), EC 3.2.1.131 (e.g., xylan alpha-1,2-glucuronosidase), EC 3.2.1.132 (e.g., chitosan N-acetylglucosaminohydrolase), EC 3.2.1.139 (e.g., alpha-glucuronidase), EC 3.2.1.14 (e.g., chitinase), EC 3.2.1.151 (e.g., xyloglucan-specific endo-beta-1,4-glucanase), EC 3.2.1.155 (e.g., xyloglucan-specific exo-beta-1,4-glucanase), EC 3.2.1.164 (e.g., galactan endo-1,6-beta-galactosidase), EC 3.2.1.17 (e.g., lysozyme), EC 3.2.1.171 (e.g., rhamnogalacturonan hydrolase), EC 3.2.1.174 (e.g., rhamnogalacturonan rhamnohydrolase), EC 3.2.1.2 (e.g., beta-amylase), EC 3.2.1.20 (e.g., alpha-glucosidase), EC 3.2.1.22 (e.g., alpha-galactosidase), EC 3.2.1.25 (e.g., beta-mannosidase), EC 3.2.1.26 (e.g., beta-fructofuranosidase), EC 3.2.1.37 (e.g., xylan 1,4-beta-xylosidase), EC 3.2.1.39 (e.g., glucan endo-1,3-beta-D-glucosidase), EC 3.2.1.40 (e.g., alpha-L-rhamnosidase), EC 3.2.1.51 (e.g., alpha-L-fucosidase), EC 3.2.1.52 (e.g., beta-N-Acetylhexosaminidase), EC 3.2.1.55 (e.g., alpha-N-arabinofuranosidase), EC 3.2.1.58 (e.g., glucan 1,3-beta-glucosidase), EC 3.2.1.59 (e.g., glucan endo-1,3-alpha-glucosidase), EC 3.2.1.67 (e.g., galacturan 1,4-alpha-galacturonidase), EC 3.2.1.68 (e.g., isoamylase), EC 3.2.1.7 (e.g., 1-beta-D-fructan fructanohydrolase), EC 3.2.1.74 (e.g., glucan 1,4-β-glucosidase), EC 3.2.1.75 (e.g., glucan endo-1,6-beta-glucosidase), EC 3.2.1.77 (e.g., mannan 1,2-(1,3)-alpha-mannosidase), EC 3.2.1.80 (e.g., fructan beta-fructosidase), EC 3.2.1.82 (e.g., exo-poly-alpha-galacturonosidase), EC 3.2.1.83 (e.g., kappa-carrageenase), EC 3.2.1.89 (e.g., arabinogalactan endo-1,4-beta-galactosidase), EC 3.2.1.91 (e.g., cellulose 1,4-beta-cellobiosidase), EC 3.2.1.96 (e.g., mannosyl-glycoprotein endo-beta-N-acetyl-glucosaminidase), EC 3.2.1.99 (e.g., arabinan endo-1,5-alpha-L-arabinanase), EC 3.4.X.X (e.g., peptidase), EC 3.4.11.X (e.g., aminopeptidase), EC 3.4.11.1 (e.g., leucyl aminopeptidase), EC 3.4.11.18 (e.g., methionyl aminopeptidase), EC 3.4.13.9 (e.g., Xaa-Pro dipeptidase), EC 3.4.14.5 (e.g., dipeptidyl-peptidase IV), EC 3.4.16.X (e.g., serine-type carboxypeptidase), EC 3.4.16.5 (e.g., carboxypeptidase C), EC 3.4.19.3 (e.g., pyroglutamyl-peptidase I), EC 3.4.21.X (e.g., serine endopeptidase), EC 3.4.21.1 (e.g., chymotrypsin), EC 3.4.21.19 (e.g., glutamyl endopeptidase), EC 3.4.21.26 (e.g., prolyl oligopeptidase), EC 3.4.21.4 (e.g., trypsin), EC 3.4.21.5 (e.g., thrombin), EC 3.4.21.63 (e.g., oryzin), EC 3.4.21.65 (e.g., thermomycolin), EC 3.4.21.80 (e.g., streptogrisin A), EC 3.4.22.X (e.g., cysteine endopeptidase), EC 3.4.22.14 (e.g., actinidain), EC 3.4.22.2 (e.g., papain), EC 3.4.22.3 (e.g., ficain), EC 3.4.22.32 (e.g., stem bromelain), EC 3.4.22.33 (e.g., fruit bromelain), EC 3.4.22.6 (e.g., chymopapain), EC 3.4.23.1 (e.g., pepsin A), EC 3.4.23.2 (e.g., pepsin B), EC 3.4.23.22 (e.g., endothiapepsin), EC 3.4.23.23 (e.g., mucorpepsin), EC 3.4.23.3 (e.g., gastricsin), EC 3.4.24.X (e.g., metalloendopeptidase), EC 3.4.24.39 (e.g., deuterolysin), EC 3.4.24.40 (e.g., serralysin), EC 3.5.1.1 (e.g., asparaginase), EC 3.5.1.11 (e.g., penicillin amidase), EC 3.5.1.14 (e.g., N-acyl-aliphatic-L-amino acid amidohydrolase), EC 3.5.1.2 (e.g., L-glutamine amidohydrolase), EC 3.5.1.28 (e.g., N-acetylmuramoyl-L-alanine amidase), EC 3.5.1.4 (e.g., amidase), EC 3.5.1.44 (e.g., protein-L-glutamine amidohydrolase), EC 3.5.1.5 (e.g., urease), EC 3.5.1.52 (e.g., peptide-N(4)-(N-acetyl-beta-glucosaminyl)asparagine amidase), EC 3.5.1.81 (e.g., N-Acyl-D-amino-acid deacylase), EC 3.5.4.6 (e.g., AMP deaminase) and EC 3.5.5.1 (e.g., nitrilase).

In other embodiments a POI is a lyase enzyme, including, but not limited to, an EC 4 (lyase) enzyme selected from EC 4.1.2.10 (e.g., mandelonitrile lyase), EC 4.1.3.3 (e.g., N-acetylneuraminate lyase), EC 4.2.1.1 (e.g., carbonate dehydratase), EC 4.2.2.-(e.g., rhamnogalacturonan lyase), EC 4.2.2.10 (e.g., pectin lyase), EC 4.2.2.22 (e.g., pectate trisaccharide-lyase), EC 4.2.2.23 (e.g., rhamnogalacturonan endolyase) and EC 4.2.2.3 (e.g., mannuronate-specific alginate lyase).

In certain other embodiments a POI is an isomerase enzyme, including, but not limited to, an EC 5 (isomerase) enzyme selected from EC 5.1.3.3 (e.g., aldose 1-epimerase), EC 5.1.3.30 (e.g., D-psicose 3-epimerase), EC 5.4.99.11 (e.g., isomaltulose synthase) and EC 5.4.99.15 (e.g., (1→4)-α-D-glucan 1-α-D-glucosylmutase).

In yet other embodiments, a POI is a ligase enzyme, including, but not limited to, an EC 6 (ligase) enzyme selected from EC 6.2.1.12 (e.g., 4-coumarate:coenzyme A ligase) and EC 6.3.2.28 (e.g., L-amino-acid alpha-ligase)9

Thus, in certain embodiments, industrial protease producing *Bacillus* host cells provide particularly preferred expression hosts. Likewise, in certain other embodiments, industrial amylase producing *Bacillus* host cells provide particularly preferred expression hosts.

For example, there are two general types of proteases which are typically secreted by *Bacillus* spp., namely neutral (or "metalloproteases") and alkaline (or "serine") proteases. For example, *Bacillus* subtilisin proteins (enzymes) are exemplary serine proteases for use in the present disclosure. A wide variety of *Bacillus* subtilisins have been identified and sequenced, for example, subtilisin 168, subtilisin BPN', subtilisin Carlsberg, subtilisin DY, subtilisin 147 and subtilisin 309 (e.g., WO 1989/06279 and Stahl et al., 1984). In some embodiments of the present disclosure, the modified *Bacillus* cells produce mutant (i.e., variant) proteases. Numerous references provide examples of variant proteases, such as PCT Publication Nos. WO1999/20770; WO1999/20726; WO1999/20769; WO1989/06279; U.S. RE34,606; U.S. Pat. Nos. 4,914,031; 4,980,288; 5,208,158; 5,310,675; 5,336,611; 5,399,283; 5,441,882; 5,482,849; 5,631,217; 5,665,587; 5,700,676; 5,741,694; 5,858,757; 5,880,080; 6,197,567 and 6,218,165. Thus, in certain embodiments, a modified *Bacillus* cells of the disclosure comprises an expression construct encoding a protease.

In certain other embodiments, a modified *Bacillus* cells of the disclosure comprises an expression construct encoding an amylase. A wide variety of amylase enzymes and variants thereof are known to one skilled in the art. For example, International PCT Publication NO. WO2006/037484 and WO 2006/037483 describe variant α-amylases having improved solvent stability, Publication No. WO1994/18314 discloses oxidatively stable α-amylase variants, Publication No. WO1999/19467, WO2000/29560 and WO2000/60059 disclose Termamyl-like α-amylase variants, Publication No. WO2008/112459 discloses α-amylase variants derived from *Bacillus* sp. number 707, Publication No. WO1999/43794 discloses maltogenic α-amylase variants, Publication No. WO1990/11352 discloses hyper-thermostable α-amylase variants, Publication No. WO2006/089107 discloses α-amylase variants having granular starch hydrolyzing activity.

In other embodiments, a POI or variant POI expressed and produced in a modified cell of the disclosure is a peptide, a peptide hormone, a growth factor, a clotting factor, a chemokine, a cytokine, a lymphokine, an antibody, a receptor, an adhesion molecule, a microbial antigen (e.g., HBV surface antigen, HPV E7, etc.), variants thereof, fragments thereof and the like. Other types of proteins (or variants thereof) of interest may be those that are capable of providing nutritional value to a food or to a crop. Non-limiting examples include plant proteins that can inhibit the formation of anti-nutritive factors and plant proteins that have a more desirable amino acid composition (e.g., a higher lysine content than a non-transgenic plant).

There are various assays known to those of ordinary skill in the art for detecting and measuring activity of intracellularly and extracellularly expressed proteins. In particular, for proteases, there are assays based on the release of acid-soluble peptides from casein or hemoglobin measured as absorbance at 280 nm or colorimetrically, using the Folin method (e.g., Bergmeyer et al., 1984). Other assays involve the solubilization of chromogenic substrates (See e.g., Ward, 1983). Other exemplary assays include succinyl-Ala-Ala-Pro-Phe-para-nitroanilide assay (SAAPFpNA) and the 2,4, 6-trinitrobenzene sulfonate sodium salt assay (TNBS assay). Numerous additional references known to those in the art provide suitable methods (See e.g., Wells et al., 1983; Christianson et al., 1994 and Hsia et al., 1999).

International PCT Publication No. WO2014/164777 discloses Ceralpha α-amylase activity assays useful for amylase activities described herein.

Means for determining the levels of secretion of a protein of interest in a host cell and detecting expressed proteins include the use of immunoassays with either polyclonal or monoclonal antibodies specific for the protein. Examples include enzyme-linked immunosorbent assay (ELISA), radioimmunoassay (RIA), fluorescence immunoassay (FIA), and fluorescent activated cell sorting (FACS).

EXAMPLES

Certain aspects of the present invention may be further understood in light of the following examples, which should not be construed as limiting. Modifications to materials and methods will be apparent to those skilled in the art.

Example 1

Duplication of 18-Bp Sequence in the rghR2 Gene of *Bacillus Licheniformis* Strains

*Bacillus licheniformis* strain DSM13 (ATTC 14580) contains a gene, designated rghR2 (BLi03647), encoding a putative HTH-type transcriptional regulator. The rghR2 nucleic acid sequence of *B. licheniformis* DSM13 is depicted in SEQ ID NO: 1 and the encoded amino acid sequence of the RghR2 protein of *Bacillus licheniformis* DSM13 is depicted in SEQ ID NO: 2.

Sequencing of the genomes of (a) *B. licheniformis* strain Bra7, (b) a *B. licheniformis* Bra7 derivative, (c) *B. licheniformis* strain ATCC-9789 (atcc.org/Products/All/9789.aspx) and (d) *B. licheniformis* strain ATCC-6598 (atcc.org/en/Products/All/6598.aspx) revealed that all of these *B. licheniformis* strains have a duplication of 18 nucleotides in the rghR2 gene, wherein the 18 nucleotide duplication is presented in SEQ ID NO: 3: GCCGCAGCCATTTCCAGA.

Thus, the nucleotide sequence of (a) the *B. licheniformis* Bra7 strain rghR2 gene (SEQ ID NO: 3) is identical to the nucleotide sequence of the rghR2 gene of (b) *B. licheniformis* Bra7 derivative, (c) ATCC-9789, and (d) ATCC-6598, as presented in SEQ ID NO: 3. Likewise, the amino acid sequence of the RghR2 protein of *B. licheniformis* Bra7 strain (SEQ ID NO: 5) is identical to the amino acid sequence of RghR2 of *Bacillus licheniformis* Bra7 derivative, ATCC-9789 and ATCC-6598, as presented in SEQ ID NO: 4.

An alignment of the *B. licheniformis* Bra7 strain RghR2 amino acid sequence (SEQ ID NO: 4) and the *B. licheniformis* DSM13 strain RghR2 amino acid sequence (SEQ ID NO: 2), illustrating the repeat amino acids (AAAISR) is shown in FIG. 1. The insertion of the sequence "AAAISR" is in the helix-turn-helix (HTH) domain and near the sequence-specific DNA-binding site as shown in FIG. 8. One may expect that the insertion has a significant effect on, or even completely abolishes, the "function" of the RghR2 transcription regulator (i.e., a substantially inactive transcriptional regulatory protein). For example, as a transcription regulator, RghR2 will directly and indirectly regulate the expression of several other genes. It is contemplated herein that the inactivation of RghR2 (e.g., by the 18-bp duplication set forth in SEQ ID NO: 5 encoding the "AAAISR" amino acid repeat set forth in SEQ ID NO: 6) affects cell physiology and consequently, may impact factors like growth and heterologous protein production thereof. Thus, the impact on growth and heterologous protein production were further studied by removing the 18-bp duplication in the rghR2 gene in *B. licheniformis* Bra7 derivative cells producing various heterologous enzymes.

Example 2

Figure 3:
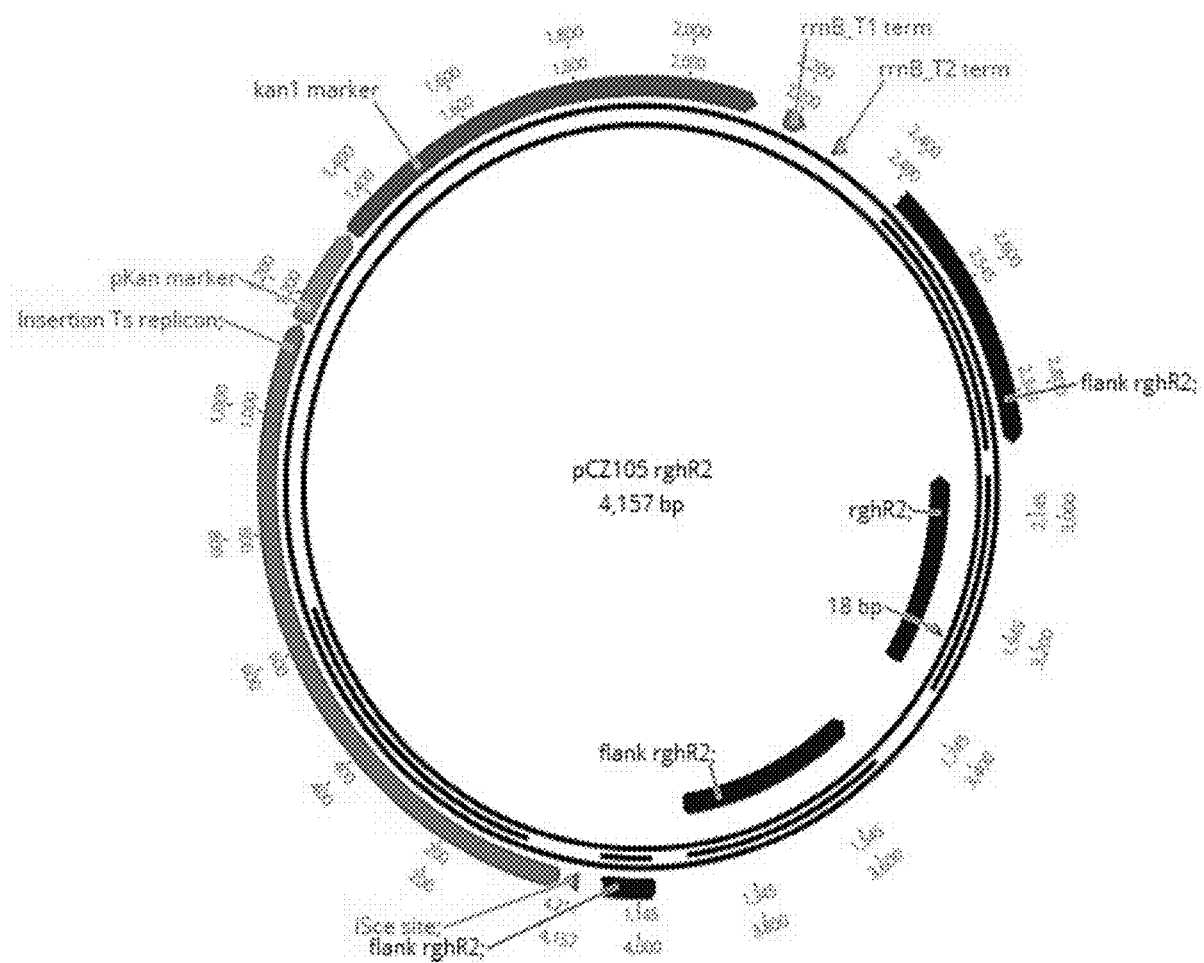
FIG. 3 shows the engineered "pCZ105 rghR2" plasmid. This plasmid comprises a pE194 temperature sensitive replicon (Ts replicon), a kanamycin coding sequence (Kan), a kanamycin promoter (pKan marker), a ribosomal terminator sequence (Term rrnB), an I-Sce site, an eighteen base-pair (18-bp) deleted rghR2 gene and rghR2 flanking regions.

Removal of the 18-Bp Duplication in rghR2 and its Effect on Cell Growth and Heterologous Enzyme Production To remove the 18-bp duplication in the rghR2 gene in *B. licheniformis* Bra7 derivative strain (and strains related or derived from this host strain), two PCR amplifications were performed on the genomic DNA of Bra7. One PCR amplification was performed using primers 378 and 379 (TABLE 2) and a second PCR amplification was performed on genomic DNA of Bra7 using primers 380 and 381 (TABLE 2). Both fragments were gel purified and used in a fusion PCR using primer 378 and 381 to yield a rghR2 fragment with the 18-bp duplication deleted. This fragment was digested using HindIII and NotI and after gel purification ligated into a HindIII and NotI digested and gel purified temperature sensitive integration plasmid pCZ105 (FIG. 2) yielding the plasmid "pZC105_rghR2" (FIG. 3).

TABLE 2

PCR Primers

| Primer # | Nucleotide Sequence | SEQ ID NO |
|---|---|---|
| 369 | GAGACTAGTGAGCTCGCATCACACGC | 7 |
| 378 | GACTGCGGCCGCACCATGATTACTCCCCTTTCTAATCT | 8 |
| 379 | TCTGGAAATGGCTGCGGCGCTCACACCGGCATACATGG | 9 |
| 380 | GCCGCAGCCATTTCCAGAATCGAAAACGGCCACCGCGG | 10 |
| 381 | GACTAAGCTTCGCCGTCTTGATGCTTGT | 11 |
| 384 | GTACGGCATTTTCAGAGCCTC | 12 |
| 752 | TGAATCATCTTTCCGATCACAAGTTG | 13 |
| 753 | AAGGAGGGGATGACAAATGGAAG | 14 |

Plasmid pZC105_rghR2 was rolling circle amplified (GE Healthcare Europe GmbH, Eindhoven, The Netherlands) and transformed in a *B. licheniformis* (Bra7 derivative) strain that lacks the native *B. licheniformis* amylase (AmyL) gene, but carries an expression cassette encoding a heterologous *Peanibacillus curdlanolyticus* variant α-amylase. Thus, the expression cassette comprises a gene encoding a *P. curdlanolyticus* variant α-amylase behind a strong promoter and is integrated in the *B. licheniformis* genome. The sequence of the heterologous *P. curdlanolyticus* variant α-amylase, is disclosed in PCT Publication No. WO2014/164834 (i.e., SEQ ID NO: 35), specifically incorporated herein by reference in its entirety.

Cells were made competent using plasmid pBLComK (FIG. 4) as previously described in PCT International Application No. PCT/US2016/059078, filed Oct. 27, 2016. Cells were plated onto Luria agar containing 30 mg/l kanamycin and cultured over night at 37° C. Formed colonies were re-streaked onto fresh Luria agar and cultured over-night at 37° C. Single colonies were picked and cultured in Luria broth at 42° C. over-night while shaking to promote integration in the genome. Subsequently, cells were plated onto Luria agar containing 30 mg/l kanamycin and cultured over night at 37° C. After verification of integration in the genome by PCR using primer 369 and 384, the correct clones were cultured in Luria broth over-night at 37° C. followed by plating onto Luria agar. Single colonies were re-streaked onto LB agar plates and LB agar plates containing 30 mg/l kanamycin and cultured over night at 37° C. to verify the removal of the vector part from the genome by a double crossover event. Colonies unable to grow in the presence of kanamycin were subjected to PCR using primer 752 and 753 (TABLE 2) and the obtained fragment was sequenced. This confirmed removal of the 18-bp duplication in the rghR2 gene.

One of the verified clones, clone 197, was used for further studies. Clone 197, expressing *P. curdlanolyticus* α-amylase in a rghR2 restored host (i.e., rghR2$_{rest}$, removal off 18-bp duplication) and the parental control strain (i.e., comprising rghR2 with the 18-bp duplication) expressing *P. curdlanolyticus* α-amylase, were inoculated in tryptone soy broth (TSB) medium and cultured over night at 37° C. while shaking. Main cultures were inoculated from this pre-culture at an OD$_{660}$ of 0.1 in an amylase production medium using glucose slow release microtiter plates (srMTP; PS Biotech GmbH, Herzogenrath, Germany). Plates were cultured for 72 hours while shaking at 37° C.

After 72 hours, the $OD_{600}$ was measured (FIG. 5) and 100 ul of cells was diluted 1:1 with 50% propylene glycol (Sigma Aldrich, Zwijndrecht, The Netherlands) and incubated for 1 hour at 40° C. while shaking. After incubation, the amylase activity was measured using the Ceralpha reagent (Megazyme, Wicklow, Ireland) as described in the instructions of Megazyme, and as disclosed in PCT International Application No. PCT/US2016/059078.

Figure 5:
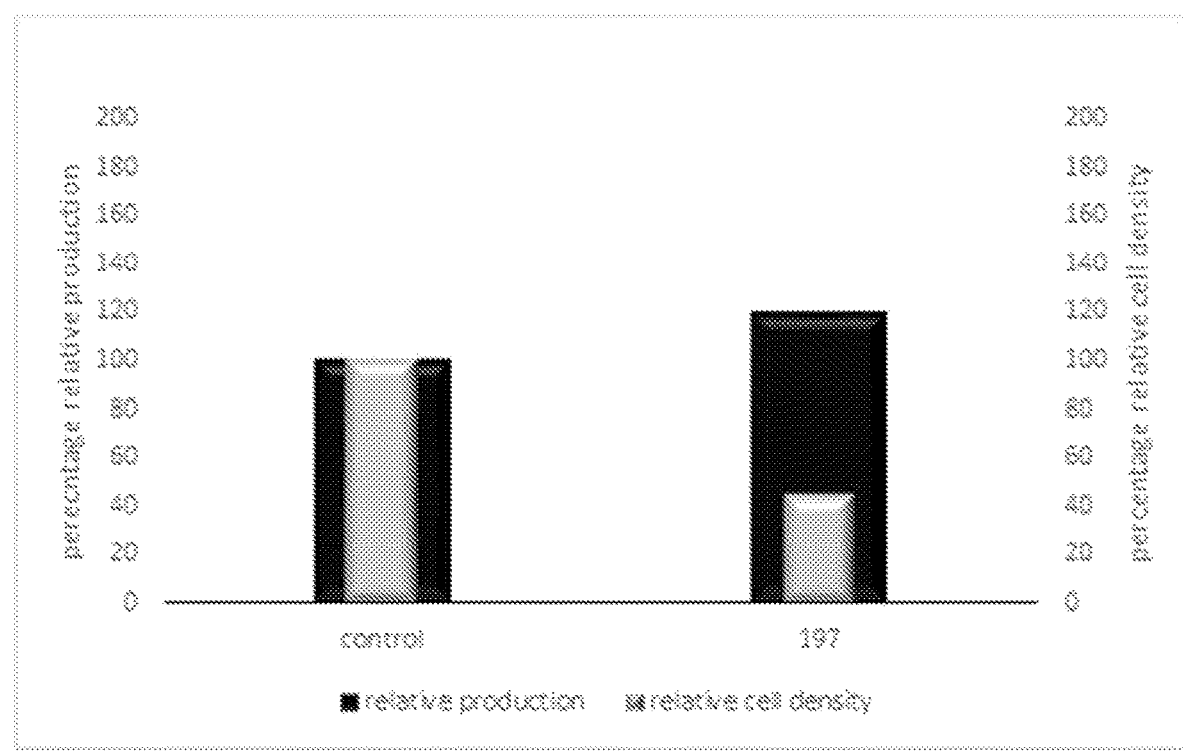
FIG. 5 shows a bar graph representing results of a slow release microtiter plate experiment (see, Example 2) of control (parental) *B. licheniformis* host cells (i.e., *B. licheniformis* cells comprising the 18-bp rghR2 duplication; rghR2$_{dup}$) and *B. licheniformis* clone 197 (i.e., *B. licheniformis* daughter cells comprising a restored rghR2 gene (rghR2$_{rest}$). More particularly, as presented in FIG. 5, the light grey bars represent the relative optical density (cell density) to the control, and the black bars represent the relative production titers of a heterologous *Peanibacillus curdlanolyticus* variant α-amylase relative to the control.
Figure 6:
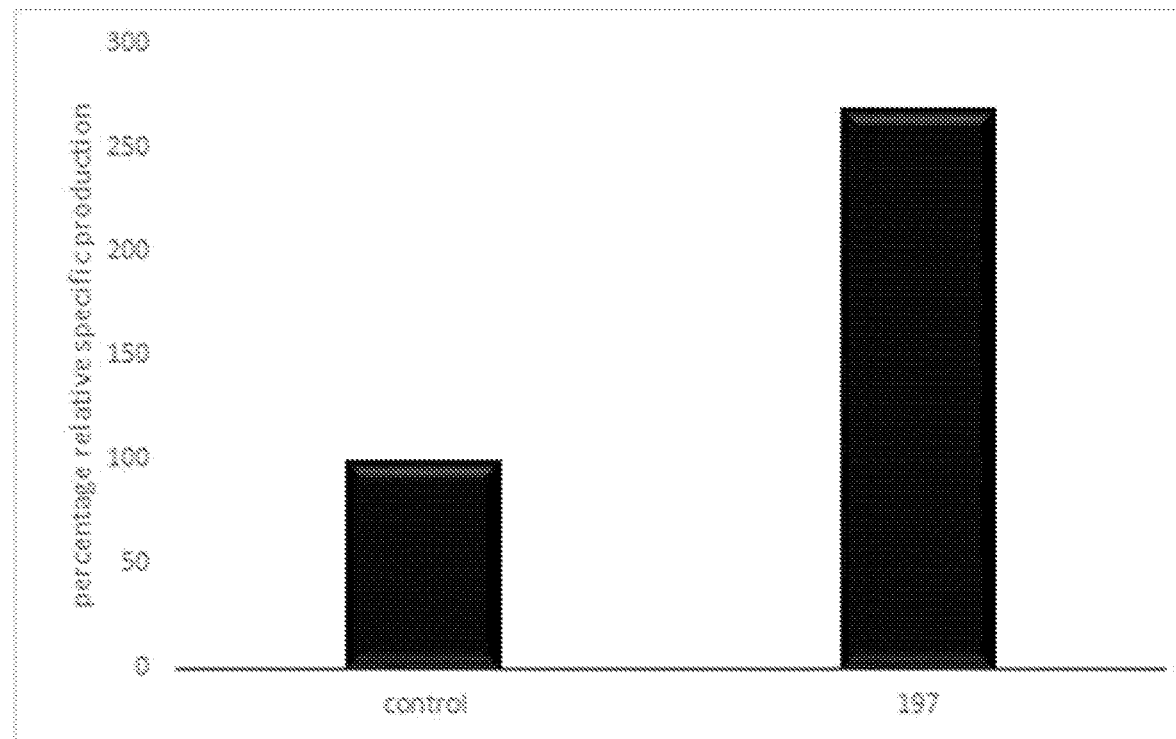
FIG. 6 shows the specific relative protein production (i.e., *P. curdlanolyticus* α-amylase) of the *B. licheniformis* rghR2$_{rest}$ strain (i.e., daughter cell, clone 197) compared to the control (parental; rghR2$_{dup}$) strain.

As presented in FIG. 5, deletion of the rhgR2 18-bp duplication showed a decrease in biomass when cultured, but at the same time demonstrated an improved amylase production titer. For example, FIG. 6 shows that the specific productivity (enzyme production/$OD_{600}$) of the heterologous α-amylase improved by at least a factor 2 in the rghR2 restored strain.

Example 3

RghR2 Regulated Genes

Transcriptome analysis of a Bra7 production strain (i.e., comprising rghR2 with the 18-bp duplication) and the rghR2 restored (rghR2$_{rest}$) variant of this strain (i.e., removal of the 18-bp duplication), revealed that transcription of several genes are regulated by RghR2 (TABLE 3). Transcription of genes downregulated by at least two-fold in the rghR2 restored strain (i.e., relative to the rghR2 inactive strain comprising the 18-bp duplication) are indicated in TABLE 4. One can expect that (further) down-regulation of these genes, or deletion of these genes, in both rghR2 restored strains and rghR2 inactivated strains (e.g., via the 18-bp insertion) has a positive effect on protein production. This would be a similar effect as seen by re-activation of rghR2 by removal of the 18-bp repeat. Therefore, the effect of inactivation of a subset of these genes (Bli03644, yvzC, abrB1, abh) on heterologous protein production was explored as described below in Example 4.

TABLE 3

GENES UPREGULATED BY A FACTOR 2 OR MORE IN A rghR2 RESTORED STRAIN

| ID | Gene_Name | Product |
|---|---|---|
| BLi00340 | blaSE | glutamyl endopeptidase blasé (mpr) |
| BLi00343 | BLi00343 | hypothetical protein |
| BLi00373 | ycgM, putB | proline dehydrogenase YcgM |
| BLi00374 | rocA | 1-pyrroline-5-carboxylate dehydrogenase |
| BLi00401 | lchAA | lichenysin synthase LchAA |
| BLi00403 | lchAC | lichenysin synthase LchAC |
| BLi00404 | lchAD | lichenysin synthase LchAD |
| BLi01250 | catE | catechol-2,3-dioxygenase subunit CatE |
| BLi00947 | BLi00947 | hypothetical protein |
| BLi00950 | BLi00950 | hypothetical protein |
| BLi00976 | yhcM | protein YhcM |
| BLi00977 | BLi00977 | hypothetical protein |
| BLi01109 | apr | subtilisin Carlsberg |
| BLi01295 | abnA1 | arabinan endo-1,5-alpha-L-arabinosidase AbnA |
| BLi01337 | xkdK | phage tail sheath protein XkdK |
| BLi01364 | ggt | gamma-glutamyltranspeptidase |
| BLi02599 | isp | intracellular serine protease Isp |
| BLi01748 | bprI | bacillopeptidase F |
| BLi02215 | BLi02215 | hypothetical protein |
| BLi02255 | yvgO | stress response protein YvgO |
| BLi02264 | cwlS | D-gamma-glutamyl-meso-diaminopimelic acid endopeptidase CwlS |
| BLi02271 | yoaJ | extracellular endoglucanase |
| BLi02544 | BLi02544 | hypothetical protein |
| BLi05030 | BLi05030 | hypothetical protein |
| BLi02827 | sacC | levanase SacC |

TABLE 3-continued

GENES UPREGULATED BY A FACTOR 2 OR MORE IN A rghR2 RESTORED STRAIN

| ID | Gene_Name | Product |
|---|---|---|
| BLi02828 | levG | fructose-specific phosphotransferase system EIID component LevG |
| BLi02830 | levE | trigger enzyme fructose-specific phosphotransferase enzyme IIB component LevE |
| BLi02831 | levD | PTS system fructose-specific transporter subunits IIA |
| BLi05031 | BLi05031 | hypothetical protein |
| BLi03176 | ytvB | transmembrane protein YtvB |
| BLi03197 | pckA | phosphoenolpyruvate carboxykinase |
| BLi03566 | yvmC | cyclodipeptide synthase YvmC |
| BLi03567 | cypX | cytochrome P450 cyclo-l-leucyl-l-leucyl dipeptide oxidase CypX |
| BLi03981 | BLi03981 | hypothetical protein |
| BLi03989 | pobA | 4-hydroxybenzoate 3-monooxygenase |
| BLi03991 | BLi03991 | oxidoreductase |
| BLi03992 | BLi03992 | 4-oxalocrotonate tautomerase |
| BLi03999 | yuaB | hypothetical protein |
| BLi04032 | BLi04032 | ABC transporter ATP binding/permease protein |
| BLi04124 | lanP | peptidase LanP |
| BLi04125 | lanT | lichenicidin processing transporter LanT |
| BLi04126 | lanM1 | lichenicidin modifying enzyme LanM |
| BLi05042 | lanA1 | lichenicidin prepeptide LanA |
| BLi04127 | lanA2 | lichenicidin prepeptide LanA |
| BLi04128 | lanM2 | lichenicidin modifying enzyme LanM |

Gene IDs from KEGG GENOME T00200 (*Bacillus licheniformis* DSM 13 = ATCC 14580)

TABLE 4

GENES DOWNREGULATED BY A FACTOR 2 OR MORE IN A rghR2 RESTORED STRAIN

| ID | Gene_Name | Product |
|---|---|---|
| BLi00050 | abrB1 | transition state transcriptional regulator AbrB |
| BLi00158 | rpmJ | 50S ribosomal protein L36 |
| BLi00167 | rplM | 50S ribosomal protein L13 |
| Bli00412 | BLi00412 | ABC transporter ATP-binding protein |
| BLi00751 | rapK | response regulator aspartate phosphatase RapK |
| BLi05046 | phrK | response regulator aspartate phosphatase RapK regulator PhrK |
| BLi00753 | BLi00753 | SAM methytransferase |
| BLi00826 | yfjT | protein YfjT |
| BLi00828 | BLi00828 | glycerol dehydrogenase |
| BLi01035 | yhdX | protein YhdX |
| BLi01118 | yhzC | protein YhzC |
| — | terf2 | Telomeric repeat-binding factor 2 |
| BLi01593 | zosA | zinc-transporting ATPase ZosA |
| BLi01626 | abbA | AbrB inhibitor AbbA |
| BLi02012 | speG | spermidine N(1)-acetyltransferase SpeG |
| BLi02362 | yppF | protein YppF |
| BLi02543 | BLi02543 | hypothetical protein |
| BLi02623 | mntR | manganese transport transcriptional regulator |
| BLi02768 | BLi02768 | hypothetical protein |
| BLi03099 | sspA | small acid-soluble spore protein SspA |
| BLi03127 | BLi03127 | hypothetical protein |
| BLi03635 | BLi03635 | phage protein |
| BLi00972 | metQ | methionine ABC transporter substrate-binding protein MetQ |

TABLE 4-continued

GENES DOWNREGULATED BY A FACTOR 2 OR MORE
IN A rghR2 RESTORED STRAIN

| ID | Gene_Name | Product |
| --- | --- | --- |
| BLi03478 | BLi03478 | D-alanyl-D-alanine carboxypeptidase |
| BLi03480 | mrgA | metalloregulation DNA-binding stress protein MrgA |
| BLi03644 | BLi03644 | transcriptional regulator |
| BLi03645 | yvzC | HTH-type transcriptional regulator YvzC |
| BLi03646 | rghR1 | HTH-type transcriptional regulator RghR |
| BLi03961 | spo0F | phosphotransferase Spo0F |
| BLi03962 | ywjG | hypothetical protein |
| BLi04055 | ywqI2 | hypothetical protein |
| BLi04199 | BLi04199 | family 1 glycoside hydrolase |
| BLi04200 | BLi04200 | PTS system beta-glucoside-specific transporter subunit IIABC |
| BLi04201 | licT | transcriptional antiterminator LicT |
| BLi04214 | bglH | phospho-beta-glucosidase BglH |
| BLi04215 | bglP | trigger enzyme beta-glucoside-specific phosphotransferase system EIIBCA component |

Gene IDs from KEGG GENOME T00200 (*Bacillus licheniformis* DSM 13 = ATCC 14580)

Example 4

Inactivation of RghR2 Regulated Genes and Their Effect on Heterologous Protein Production The Bli03644, abrB1, yvzC and abh genes were inactivated by insertion of antibiotic marker in a Bra7 strain producing a heterologous α-amylase (i.e., the heterologous *P. curdlanolyticus* α-amylase disclosed in PCT Publication No. WO2014/164834), wherein the heterologous α-amylase production was determined in the four single knock-out strains (ΔBLi03644, ΔabrB1, ΔyvzC and Δabh) and compared to the parental (control) strain as described in Example 2. For example, as presented in FIG. 7, inactivation of Bli03644, abrB1, yvzC and abh resulted in improved heterologous α-amylase production, while cell growth ($OD_{600}$) was less affected.

Example 5

Enhanced Production of Amylases in Modified Cells Comprising rghR2$_{rest}$

In the present example, both *B. licheniformis* cells comprising rghR2 gene having the 18-bp duplication (SEQ ID NO: 3) and *B. licheniformis* cells comprising the rghR2 gene lacking the 18-bp duplication (rghR2$_{rest}$; SEQ ID NO: 1) comprise a single copy of either: (a) a heterologous *Cytophaga* sp. variant #1 α-amylase expression cassette integrated in the *B. licheniformis* genome (SEQ ID NO: 140) or (b) a variant *Geobacillus stearothermophilus* α-amylase expression cassette (SEQ ID NO: 141) integrated into the *B. licheniformis* genome, which were inoculated from a frozen vial (1 mL, 20% glycerol) in 10 mL seed medium (15 g/L Yeast extract, 5.5 g/L Dextrose, 3 g/L Potassium phosphate, 1 g/L Magnesium sulfate). Cultures were grown at 38° C. in a vented 100 mL flask at 310 RPM until the $OD_{600}$ was approximately 2. From each culture 0.25 mL was transferred to 25 mL of production medium (30 g/L 2-(N-morpholino) ethanesulfonic acid (MES), 6.7 g/L Yeast Nitrogen Base with ammonium sulfate without amino acids, 1.7 g/L Yeast Nitrogen Base without ammonium sulfate or amino acids, 0.7 g/L Soytone, pH 6.8 with Ammonium hydroxide) in a 100 mL vented flask and two 14 mm glucose feed beads were added and the flask incubated at 38° C., 310 RPM for 84 hours with periodic replacement of evaporated water losses.

After 84 hours, a sample was taken from each flask and centrifuged. One tenth (0.1) mL of the supernatant was mixed with 0.9 mL of Bradford reagent. Color was measured as absorbance of 595 nm wavelength and compared to a standard curve to determine protein concentration. The pellet was resuspended in propylene glycol, warmed for 30 minutes and also assayed with Bradford as above. The amylase titer was determined by the aggregate of the two measurements are presented in TABLE 5.

TABLE 5

AMYLASE TITER FROM rghR2 RESTORED STRAINS

| Heterologous Amylase | rghR2 allele | Amylase titer (g/L ± range) | Fold difference compared to rghR2 18-bp duplication (SEQ ID NO: 3) |
| --- | --- | --- | --- |
| *Cytophaga* sp. α-amylase (V1) | rghR2 18-bp dup (SEQ ID NO: 3) | 2.0 ± 0.1 | 1.0 |
| *Cytophaga* sp. α-amylase (V1) | rghR2$_{rest}$ (SEQ ID NO: 1) | 2.2 ± 0.2 | 1.1 |
| *G. stearothermophilus* α-amylase | rghR2 18-bp dup (SEQ ID NO: 3) | 3.9 ± 0.2 | 1.0 |
| *G. stearothermophilus* α-amylase | rghR2$_{rest}$ (SEQ ID NO: 1) | 4.3 ± 0.1 | 1.1 |

Thus, as presented above in TABLE 5, both *B. licheniformis* strains comprising the rghR2$_{rest}$ allele show improvement in amylase titer of at least 10%, indicating that removing the natively existing 18-bp duplication in rghR2 gene is beneficial for production of multiple heterologous amylase molecules.

Example 6

CRISPR-Cas9 Editing and Deletion of the 18-Nucleotide Duplication in the RghR2 Gene In the present example, a gene encoding a nucleic acid guided endonuclease (e.g., Cas9 from *S. pyogenes* (SEQ ID NO: 91)) or a codon optimized gene thereof (e.g., Cas9 nuclease of SEQ ID NO: 92) is operably linked to a promoter active in *B. licheniformis* (e.g., see, TABLE 6 below) and a terminator active in *B. licheniformis* (e.g., SEQ ID NO: 103), thereby creating a *B. licheniformis* Cas9 expression cassette (SEQ ID NO: 104).

TABLE 6

LIST OF EXAMPLARY PROMOTERS
ACTIVE IN *B. LICHENIFORMIS*

| Promoter Name | SEQ ID NO |
|---|---|
| aprEp | 93 |
| xylAp | 94 |
| spac | 95 |
| Hyper spank | 96 |
| Vegp | 97 |
| nprEp | 98 |
| N25 promoter | 99 |
| groE promoter | 100 |
| AraAp | 101 |
| AraA2p | 102 |

A target site unique to the 18-bp duplication allele of rghR2 (SEQ ID NO: 105), such that the rghR2 gene lacking the 18-bp duplication does not contain the target site, can be identified.

Likewise, to build a DNA construct encoding a guide RNA (gRNA) targeting the unique target site within the 18-bp duplication (SEQ ID NO: 105), the variable targeting domain (VT), comprising the target site nucleotides of SEQ ID NO: 106, SEQ ID NO: 107, SEQ ID NO: 108, or SEQ ID NO: 109 (which nucleotides are upstream (5') of the proto-spacer adjacent motif (PAM) nucleotides "TGG", are fused to DNA encoding the Cas9 endonuclease recognition domain for *S. pyogenes* Cas9 (CER, SEQ ID NO: 110).

The combination (fusion) of the DNA encoding the VT domain and the DNA encoding the CER domain generate a DNA encoding a gRNA (for example the DNA encoding the gRNA targeting the target site from the 18-bp duplication within rghR2 (SEQ ID NO:105) to generate SEQ ID NO: 111.

A *B. licheniformis* expression cassette for the gRNA is created by operably linking the DNA encoding the gRNA (SEQ ID NO: 111) to a promoter active in *B. licheniformis* (e.g., TABLE 6) and a terminator active in *B. licheniformis* (e.g., SEQ ID NO: 103) which creates a gRNA expression cassette (spac-gRNA-t0 SEQ ID NO: 112). In order to precisely repair the DNA break generated by the Cas9 expression cassette (SEQ ID NO: 104) and the gRNA expression cassette (SEQ ID NO: 112), an editing template to be used by the DNA repair machinery of the cell must be provided. For example, the 500 bp upstream (5') of the 18-bp duplication (SEQ ID NO: 113) is fused to the 500 bp downstream (3') of the 18-bp duplication (SEQ ID NO: 114) to generate an editing template (SEQ ID NO: 115) that can be used by the *B. licheniformis* host machinery to repair the DNA break generated by the RGEN.

The Cas9 expression cassette (SEQ ID NO: 104), the gRNA expression cassette (SEQ ID NO: 112) and the editing template (SEQ ID NO: 115) are co-delivered to *B. licheniformis* cells using many different methods (e.g., protoplast fusion, electroporation, natural competence, or induced competence). Transformed cells are screened by PCR amplifying the rghR2 locus (SEQ ID NO:116) by amplifying the locus with a forward primer (SEQ ID NO: 117) and reverse primer (SEQ ID NO: 118). These primers amplify the wild-type locus (SEQ ID NO: 116) or the restored locus that had been edited by the RGEN (SEQ ID NO: 119). These fragments are then sequenced using a sequencing primers (SEQ ID NO: 120) to identify edited colonies.

Thus, as described in this Example, any of the genes in the rghR2 regulon can be edited in a similar manner to inactivate, enhance, down-regulated or delete the gene.

Example 7

CRISPR-Cas9 Editing and Gene Down-Regulation

The instant Example describes the modulation (e.g., down-regulation) of a gene of interest via CRSIPR-Cas9 editing. An exemplary method to modulate gene expression level is the use of nuclease-defective variants (e.g., Cas9 D10A/N863A or D10A/H840A) of nucleotide-guided endonucleases to enhance or antagonize transcription of target gene(s). These Cas9 variants are inactive for all nuclease domains present in the protein sequence. These Cas9 variants therefore retain the RNA-guided DNA binding activity, but are unable to cleave either strand of DNA when bound to the cognate target site.

For example, the nuclease-defective Cas9 protein can be expressed as a *B. licheniformis* expression cassette (constructed as described in Example 6), and when combined with a *B. licheniformis* gRNA expression cassette, the Cas9 protein is directed to a specific target sequence within the cell. The binding of the Cas9 (variant) protein to specific target sites can block the binding or movement of transcription machinery on the DNA of the cell, thereby decreasing the amount of a gene product produced.

Additionally, the binding activity could enhance transcription by locally melting the DNA in the region allowing the transcription machinery to bind or elongate the gene more readily which would increase the amount of gene product produced. Thus, any gene in the rghR2 regulon (or any other gene in the *B. licheniformis* cell) can be targeted for modulation (up- or down-regulated) of gene expression using this method.

For example, to target the yvcZ gene with a nuclease defective Cas9 protein, there are 19 unique target sites within the yvcZ ORF that can be targeted (SEQ ID NO: 121 to 139). These target sequences can be made into gRNA expression cassettes, as described in Example 6.

Co-delivery of a nuclease-defective Cas9 expression cassette (e.g., constructed as described above in Example 6) with a gRNA expression cassette for the target gene allows for gene dosage changes (modulation) by silencing or activating transcription within the gene. By delivering multiple gRNA expression cassettes simultaneously, the targeting and modulation of multiple genes at the same is possible. The gene modulation (up-regulation or down-regulation) are readily monitored in cells containing the nuclease-defective Cas9 expression cassette and the gRNA expression cassette(s), by using methods such known to the skilled artisan, such as RNAseq.

Example 8

Enhanced Production of a Heterologous G4 Amylase in Modified Cells Comprising Rghr2$_{rest}$ In the present example, *B. licheniformis* cells comprising a rghR2 gene having the 18-bp duplication (SEQ ID NO: 3) and *B. licheniformis* cells comprising the rghR2 gene lacking the 18-bp duplication (rghR2$_{rest}$; SEQ ID NO: 1), both comprise a single copy of an expression cassette (SEQ ID NO: 142) encoding a heterologous G4 amylase (variant) of *Pseudomonas* sp. AM1 (e.g., see PCT Publication No. WO2010/133644, specifically incorporated herein by reference in its entirety). Both strains were cultivated as described in Example 2 and samples taken after 48 hours were assayed with Ceralpha reagent as described. The fold difference in specific productivity (G4 amylase production/OD$_{600}$) in the rghR2$_{rest}$ strain relative to the strain comprising the 18-bp duplication in rghR2 is presented in TABLE 7.

TABLE 7

SPECIFIC PRODUCTIVITY OF G4 AMYLASE FROM rghR2$_{rest}$ CELLS

| Heterologous Amylase | rghR2 allele in *B. licheniformis* host | Fold difference in Qp compared to rghR2 w/ 18-bp duplication (SEQ ID NO: 3) |
|---|---|---|
| *Pseudomonas* sp. α-amylase | rghR2$_{rest}$ (SEQ ID NO: 1) | 1.25 |

Thus, as presented above in TABLE 7, the specific productivity (Qp) of the heterologous G4 amylase is significantly improved in the *B. licheniformis* rghR2$_{rest}$ cells vis-à-vis the *B. licheniformis* cells comprising the 18-bp duplication in the rghR2 gene.

Example 9

Enhanced Production of Alkaline Amylases in Modified Cells Comprising rghR2$_{rest}$ In the present example, *B. licheniformis* cells comprising rghR2 gene having the 18-bp duplication (SEQ ID NO: 3) and *B. licheniformis* cells comprising the rghR2$_{rest}$ (SEQ ID NO: 1) comprise either a single copy of: (1) an expression cassette for alkaline α-amylase variant 1 integrated in the *B. licheniformis* genome, (2) an expression cassette of alkaline α-amylase variant 2 integrated in the *B. licheniformis* genome, (3) an expression cassette for alkaline α-amylase variant 3 integrated into the *B. licheniformis* genome or (4) an expression cassette for alkaline α-amylase variant 4 integrated into the *B. licheniformis* genome. Strains were fermented in a fed-batch system and at the end of the fermentations, samples were taken and assayed for alpha-amylase activity using the Ceralpha reagent of Megazyme as described in Example 2. The fold difference in amylase production in strains without the 18-bp duplication in rghR2 compared to strains with the 18-bp duplication in rghR2 is presented in TABLE 8.

TABLE 8

ALKALINE AMYLASE PRODUCTION FROM rghR2$_{rest}$ STRAINS IN FED BATCH CULTURES

| Amylase | rghR2 allele | Fold difference compared to rghR2 w/ 18-bp duplication (SEQ ID NO: 3) |
|---|---|---|
| Variant 1 | rghR2$_{rest}$ (SEQ ID NO: 1) | 1.8 |
| Variant 2 | rghR2$_{rest}$ (SEQ ID NO: 1) | 2.3 |
| Variant 3 | rghR2$_{rest}$ (SEQ ID NO: 1) | 1.6 |
| Variant 4 | rghR2$_{rest}$ (SEQ ID NO: 1) | 1.9 |

Thus, as presented above in TABLE 8, the production of alkaline amylases in fed batch cultures is improved in the *B. licheniformis* rghR2$_{rest}$ cells vis-à-vis the *B. licheniformis* cells comprising the 18-bp duplication in the rghR2 gene.

Example 10

Enhanced Lipase Production in *Bacillus* Cells Comprising rghR2$_{rest}$

Figure 9:
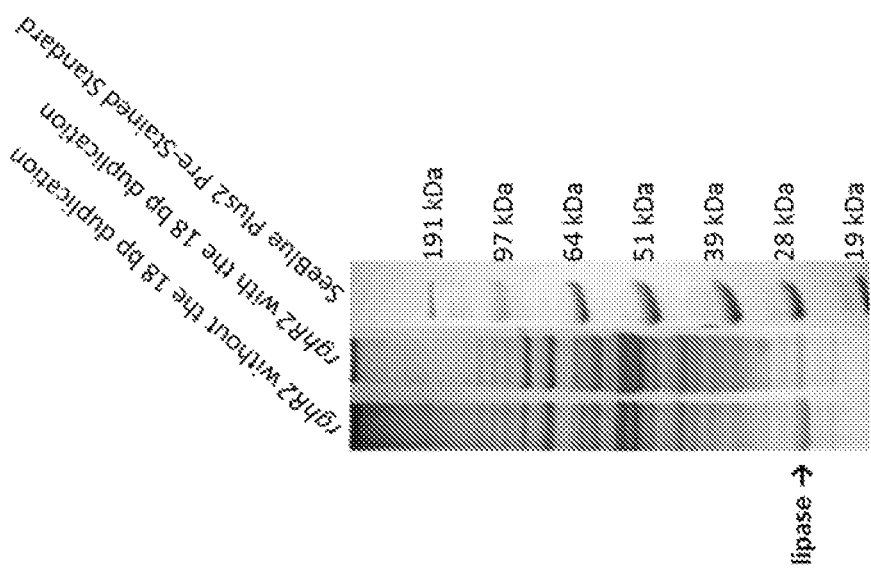
FIG. 9 shows the production of a heterologous EC 3.1.1.3 enzyme comprising lipase/esterase activity. As presented in the FIG. 9 SDS-PAGE, production of the heterologous EC 3.1.1.3 enzyme comprising lipase/esterase activity is improved in the *B. licheniformis* rghR2$_{rest}$ cells vis-à-vis the *B. licheniformis* cells comprising the rghR2 gene having the 18-bp duplication (rghR2$_{dup}$).

In the present example, *B. licheniformis* cells comprising the rghR2 gene having the 18-bp duplication (SEQ ID NO: 3) and *B. licheniformis* cells comprising the rghR2$_{rest}$ gene (SEQ ID NO: 1) both comprise a single copy of an expression cassette encoding a heterologous EC 3.1.1.3 enzyme comprising lipase/esterase activity. Thus, both strains were cultivated as described in Example 2 and equal amounts of sample taken after 48 hours were subjected to SDS-PAGE (Invitrogen 4-12% NuPAGE Bis-Tris gel of ThermoFischer) according to the instructions of the supplier. The stained SDS-PAGE protein gel (FIG. 9) shows an increased level of the EC 3.1.1.3 enzyme (~28 kDa) produced by the *B. licheniformis* rghR2$_{rest}$ strain (see, FIG. 9, lane 1). Thus, as presented in FIG. 9, the production of heterologous lipase/esterase enzymes is improved in the *B. licheniformis* rghR2$_{rest}$ cells relative to the *B. licheniformis* cells comprising the rghR2 gene having the 18-bp duplication.

Example 11

Enhanced Production of Alpha Amylase in rghR2$_{rest}$ Strains in Fed Batch Culture In the present example, *B. licheniformis* cells comprising rghR2 having the 18-bp duplication (SEQ ID NO: 3) and *B. licheniformis* cells comprising the rghR2$_{rest}$ gene (SEQ ID NO: 1), both comprise a single copy of an expression cassette (SEQ ID NO: 143) encoding a heterologous *Cytophaga* sp. variant #2 α-amylase described in PCT Publication No. WO2014/164834. Both strains were grown under standard fed-batch fermentation conditions. Amylase activity was monitored throughout the fermentation using Ceralpha reagent of Megazyme as described in Example 2. The fold difference in the specific productivity of the *B. licheniformis* rghR2$_{rest}$ cells relative to the *B. licheniformis* cells comprising the 18-bp duplication in the rghR2 gene is presented below in TABLE 9.

TABLE 9

HETEROLOGOUS AMYLASE PRODUCTION FROM
rghR2$_{rest}$ STRAINS IN FED BATCH CULTURES

| Heterologous Amylase | rghR2 allele | Fold difference in Qp compared to rghR2 w/ 18-bp duplication (SEQ ID NO 3) |
|---|---|---|
| Cytophaga sp. variant #2 | rghR2$_{rest}$ (SEQ ID NO: 1) | 1.10 |

Thus, as presented in the TABLE 9, the specific productivity for the B. licheniformis cells producing the heterologous Cytophaga sp. variant #2 α-amylase is improved by 10% in the cells comprising the rghR2$_{rest}$ gene relative to cells comprising the rghR2 gene having the 18-bp duplication.

Example 12

Enhanced Amylase Production in Modified B. Licheniformis Cells Comprising Alleles rghR2$_{rest}$ and glcT1

In the present example, a heterologous α-amylase expression cassette was introduced into parental and modified B. licheniformis cells BF62 and BF169. More particularly, the parental B. licheniformis host, transformed with the heterologous α-amylase expression cassette, was named "BF134". Likewise, the B. licheniformis (daughter) cell "BF62", comprising a rghR2$_{rest}$ gene, transformed with the heterologous α-amylase expression cassette, was named "BF165" and the B. licheniformis (daughter) cell "BF169", comprising allele glcT1 and a rghr2$_{rest}$ gene, was named "BF260", as set forth below in TABLE 10.

The B. licheniformis allele glcT1 encodes a variant GlcT (transcriptional anti-termination) protein comprising a phenylalanine (F) at amino acid position 67 (F67) of the variant GlcT protein, as described in U.S. Provisional Patent Application Ser. No. U.S. 62/613,339, filed Jan. 3, 2018, which is incorporated herein by reference in its entirety.

TABLE 10

B. LICHENIFORMIS PARENT/DAUGHTER
CELL MODIFICATIONS

| Strain Name | Genetic Modification | Strain Name Transformed w/ Cassette |
|---|---|---|
| B. licheniformis (parent) | n/a | BF134 |
| BF62 (daughter) cell | rghr2$_{rest}$ | BF165 |
| BF169 (daughter) cell | glcT1 + rghR2$_{rest}$ | BF260 |

Thus, the parental and modified B. licheniformis BF62 and BF169 cells (TABLE 10), comprising a plasmid carrying a xylose-inducible comK expression cassette, were grown overnight at 37° C. and 250 RPM in fifteen (15) ml of L broth (1% (w/v) Tryptone, 0.5% Yeast extract (w/v), 1% NaCl (w/v)), containing one hundred (100) µg/ml spectinomycin dihydrochloride in a 125 ml baffled flask. The overnight culture was diluted to 0.7 (OD$_{600}$ units) in 25 ml fresh L broth containing one hundred (100) µg/ml spectinomycin dihydrochloride in a two hundred fifty (250) ml baffle flask. Cells were grown for one (1) hour at 37° C. (250 RPM). D-xylose was added to 0.1% (w/v) from a 50% (w/v) stock. Cells were grown for an additional four (4) hours at 37° C. (250 RPM) and pelleted at 1700×g for seven (7) minutes.

The cells were resuspended in one fourth (¼) volume of original culture using the spent medium. One hundred (100) µl of concentrated cells were mixed with approximately one (1) µg of an expression cassette comprising (in the 5' to 3' direction) the same 5' catH homology arm, catH gene and spoVGrrnIp hybrid promoter, operably linked to a wild-type B. subtilis aprE 5'-UTR (WT-5'-UTR), wherein the WT-5'-UTR was operably linked to DNA encoding the lat signal sequence, followed by DNA (ORF) encoding a variant G. stearothermophilus α-amylase. The 3' end of the DNA (ORF) encoding the variant G. stearothermophilus α-amylase, was operably linked to the lat terminator, which was operably linked to the 3' catH homology arm. Transformation reactions were incubated at 37° C., 1000 RPM for approximately ninety (90) minutes.

Transformation mixes were plated on petri plates filled with L-broth containing ten (10) µg/ml chloramphenicol solidified with 1.5% (w/v) agar. Plates were incubated at 37° C. for two (2) days. Colonies were streak purified on petri plates filled with L-broth containing 1% (w/v) insoluble corn starch solidified with 1.5% (w/v) agar. Plates were incubated at 37° C. for twenty-four (24) hours until colonies had formed. Starch hydrolysis was indicated by clearing of the insoluble starch surrounding the colony, forming a halo, and was used to select transformants expressing the variant G. stearothermophilus α-amylase protein. Colony PCR was used to amplify the catH locus from halo producing colonies using standard techniques, and the forward and reverse primer pairs. Sequence verified B. licheniformis (daughter) cells comprising the expression cassette were stored and named as shown in the 3$^{rd}$ column of TABLE 10.

Thus, B. licheniformis strains named BF165 (i.e., rghr2$_{rest}$) and BF260 (i.e., rghr2$_{rest}$+glcT1), comprising the α-amylase expression cassette, were assessed for α-amylase production under small scale conditions. The strains were streak purified on L agar plates containing 1% (w·v$^{-1}$) insoluble starch and grown for approximately twenty-four (24) hours at 37° C. A single halo positive colony was inoculated into 15 ml of Tryptic Soy Broth (1.7% (w·v$^{-1}$) Tryptone, 0.3% (w·v$^{-1}$) soytone, 0.25% (w·v$^{-1}$) glucose, 0.5% (w·v$^{-1}$) sodium chloride, 0.25% (w·v$^{-1}$) Dipotassium phosphate) and grown at 37° C. (250 RPM) for 6 hours. Subsequently, 0.025 ml of this seed culture was inoculated into 25 ml of flask growth medium (4% (w·v$^{-1}$) MES, 0.1% (w·v$^{-1}$) Monopotassium phosphate, 0.05% (w·v$^{-1}$) sodium chloride, 0.03% (w·v$^{-1}$) soytone, containing trace metals, pH 6.8 with Ammonium hydroxide). A single high glucose release feed bead (Kuhner) was added (feed rate 57 mg/L·hr). The cultures were grown at 42° C. (250 RPM) for 90 hours. The total secreted protein production was determined using the method of Bradford with a BSA standard. The relative α-amylase production averaged from repeat measurements of at least two independent flasks for each strain is shown in TABLE 11 below.

TABLE 11

SMALL SCALE PRODUCTION OF α-AMYLASE

| B. licheniformis cell | Modification | Relative expression ± SEM |
|---|---|---|
| BF165 | rghR2$_{rest}$ | 1.00 ± 0.02 |
| BF260 | rghR2$_{rest}$ + glcT1 | 1.09 ± 0.04 |

Thus, as presented in TABLE 11, the Bacillus BF260 cells (comprising a rghR2$_{rest}$ and allele glcT1) demonstrate an approximately 9% increase in relative α-amylase production when compared (vis-à-vis) to Bacillus host cells BF165

(comprising rghR2$_{rest}$ and a wild-type glcT gene). Thus, in certain embodiments modified *B. licheniformis* cells of the disclosure comprising a restored rghR2 gene (rghR2.1), further comprises a nucleic acid construct comprising allele glcT1 (SEQ ID NO: 144), encoding a variant GlcT protein comprising a Leucine (L) to Phenylalanine (F) substitution at amino acid position 67 of the variant GlcT protein.

REFERENCES

Albertini and Galizzi, *Bacteriol.*, 162:1203-1211, 1985.
Bergmeyer et al., "*Methods of Enzymatic Analysis*" vol. 5, *Peptidases, Proteinases and their Inhibitors*, Verlag Chemie, Weinheim, 1984.
Botstein and Shortle, *Science* 229: 4719, 1985.
Brode et al., "Subtilisin BPN' variants: increased hydrolytic activity on surface-bound substrates via decreased surface activity", *Biochemistry*, 35(10):3162-3169, 1996.
Caspers et al., "Improvement of Sec-dependent secretion of a heterologous model protein in *Bacillus subtilis* by saturation mutagenesis of the N-domain of the AmyE signal peptide", *Appl. Microbiol. Biotechnol.*, 86(6): 1877-1885, 2010.
Chang et al., *Mol. Gen. Genet.*, 168:11-115, 1979.
Christianson et al., *Anal. Biochem.*, 223:119-129, 1994.
Devereux et a/., *Nucl. Acid Res.*, 12: 387-395, 1984.
Earl et al., "Ecology and genomics of *Bacillus subtilis*", *Trends in Microbiology*, 16(6):269-275, 2008.
Ferrari et al., "*Genetics*," in Harwood et al. (ed), *Bacillus*, Plenum Publishing Corp., 1989.
Fisher et. al., *Arch. Microbiol.*, 139:213-217, 1981.
Guerot-Fleury, *Gene*, 167:335-337, 1995.
Hamoen et al., "Controlling competence in *Bacillus subtilis*: shared used of regulators", *Microbiology*, 149:9-17, 2003.
Hamoen et al., *Genes Dev.* 12:1539-1550, 1998.
Hampton et al., *Seroloaical Methods, A Laboratory Manual*, APS Press, St. Paul, MN 1990.
Hardwood and Cutting (eds.) *Molecular Biological Methods for Bacillus*, John Wiley & Sons, 1990.
Hayashi et al., *Mol. Microbiol.*, 59(6): 1714-1729, 2006
Higuchi et al., *Nucleic Acids Research* 16: 7351, 1988.
Ho et al., *Gene* 77: 61, 1989.
Hoch et al., *J. Bacteriol.*, 93:1925-1937, 1967.
Holubova, *Folia Microbiol.*, 30:97, 1985.
Hopwood, *The Isolation of Mutants in Methods in Microbiology* (J. R. Norris and D. W. Ribbons, eds.) pp 363-433, Academic Press, New York, 1970.
Horton et al., *Gene* 77: 61, 1989.
Hsia et al., *Anal Biochem.*, 242:221-227, 1999.
Iglesias and Trautner, *Molecular General Genetics* 189: 73-76, 1983.
Jensen et al., "Cell-associated degradation affects the yield of secreted engineered and heterologous proteins in the *Bacillus subtilis* expression system" *Microbiology*, 146 (Pt 10:2583-2594, 2000.
Liu and Zuber, 1998,
Lo et al., *Proceedings of the National Academy of Sciences USA* 81: 2285, 1985.
Maddox et al., *J. Exp. Med.*, 158:1211, 1983.
Mann et al., *Current Microbiol.*, 13:131-135, 1986.
McDonald, *J. Gen. Microbiol.*, 130:203, 1984.
Needleman and Wunsch, *J. Mol. Biol.*, 48: 443, 1970.
Ogura & Fujita, *FEMS Microbiol Lett.*, 268(1): 73-80. 2007.
Olempska-Beer et al., "Food-processing enzymes from recombinant microorganisms—a review'" *Regul. Toxicol. Pharmacol.*, 45(2):144-158, 2006.
Palmeros et al., *Gene* 247:255-264, 2000.
Parish and Stoker, *FEMS Microbiology Letters* 154: 151-157, 1997.
Pearson and Lipman, *Proc. Natl. Acad. Sci. USA* 85: 2444, 1988.
Perego, 1993, In A. L. Sonneshein, J. A. Hoch, and R. Losick, editors, *Bacillus subtilis and Other Gram-Positive Bacteria*, Chapter 42, American Society of Microbiology, Washington, D.C.
Raul et al., "Production and partial purification of alpha amylase from *Bacillus subtilis* (MTCC 121) using solid state fermentation", *Biochemistry Research International*, 2014.
Sarkar and Sommer, *BioTechniques* 8: 404, 1990.
Saunders et al., *J. Bacteriol.*, 157: 718-726, 1984.
Shimada, *Meth. Mol. Biol.* 57: 157; 1996
Smith and Waterman, *Adv. Appl. Math.*, 2: 482, 1981.
Smith et al., *Appl. Env. Microbiol.*, 51:634 1986.
Stahl and Ferrari, *J. Bacteria*, 158:411-418, 1984.
Stahl et al, *J. Bacteriol.*, 158:411-418, 1984.
Tarkinen, et al, J. Biol. Chem. 258: 1007-1013, 1983.
Trieu-Cuot et al., *Gene*, 23:331-341, 1983.
Van Dijl and Hecker, "*Bacillus subtilis*: from soil bacterium to super-secreting cell factory", *Microbial Cell Factories*, 12(3). 2013.
Vorobjeva et al., *FEMS Microbiol. Lett.*, 7:261-263, 1980.
Ward, "*Proteinases*," in Fogarty (ed)., *Microbial Enzymes and Biotechnology. Applied Science*, London, pp 251-317, 1983.
Wells et al., *Nucleic Acids Res.* 11:7911-7925, 1983.
Westers et al., "*Bacillus subtilis* as cell factory for pharmaceutical proteins: a biotechnological approach to optimize the host organism", *Biochimica et Biophysica Acta.*, 1694:299-310, 2004.
Yang et al, *J. Bacteriol.*, 160: 15-21, 1984.
Yang et al., *Nucleic Acids Res.* 11: 237-249, 1983.
Youngman et al., *Proc. Natl. Acad. Sci. USA* 80: 2305-2309, 1983.

The invention claimed is:

1. A modified *Bacillus licheniformis* cell derived from a parental *B. licheniformis* cell, wherein the modified cell comprises a genetic modification which disrupts, deletes, inactivates, or down-regulates:
   (i) a rghR2 gene encoding a RghR2 protein comprising at least 90% sequence identity to SEQ ID NO: 4,
   (ii) a rghR1 gene encoding a RghR1 protein comprising at least 90% sequence identity to SEQ ID NO: 16,
   (iii) a Bli03644 gene encoding a Bli03644 protein comprising at least 90% sequence identity to SEO ID NO: 20,
   (iv) a rghR2 gene encoding a RghR2 protein comprising at least 90% sequence identity to SEQ ID NO: 4; and a rghR1 gene encoding a RghR1 protein comprising at least 90% sequence identity to SEQ ID NO: 16,
   (v) a rghR2 gene encoding a RghR2 protein comprising at least 90% sequence identity to SEQ ID NO: 4, a rghR1 gene encoding a RghR1 protein comprising at least 90% sequence identity to SEQ ID NO: 16, and a yvzC gene encoding a yvzC protein comprising at least 90% sequence identity to SEQ ID NO: 18, or
   (vi) a rghR2 gene encoding a RghR2 protein comprising at least 90% sequence identity to SEO ID NO: 4, a rghR1 gene encoding a RghR1 protein comprising at least 90% sequence identity to SEO ID NO: 16, a yvzC gene encoding a yvzC protein comprising at least 90% sequence identity to SEO ID NO: 18 and a Bli03644 gene encoding a Bli03644 protein comprising at least 90% sequence identity to SEQ ID NO: 20,
   wherein the modified cell produces an increased amount of a protein of interest relative to the parental cell.

2. The modified cell of claim 1, comprising an expression construct encoding the protein of interest.

3. The modified cell of claim 1, wherein the increased amount of the protein of interest is at least 1.0% increased relative to the parental cell.

4. The modified cell of claim 1, wherein the protein of interest is an amylase protein.

\* \* \* \* \*

SEQUENCE LISTING

```
Sequence total quantity: 144
SEQ ID NO: 1            moltype = DNA  length = 405
FEATURE                 Location/Qualifiers
source                  1..405
                        mol_type = other DNA
                        organism = Bacillus licheniformis
SEQUENCE: 1
atggcgatga caaggttcgg cgagcggctc aaagagctga gggaacaaag aagcctgtcg   60
gttaatcagc ttgccatgta tgccggtgtg agcgccgcag ccatttccag aatcgaaaac  120
ggccaccgcg gcgttcccaa gcccgcgacg atcagaaaat tggccgaggc tctgaaaatg  180
```

```
ccgtacgagc agctcatgga tattgccggt tatatgagag ctgacgagat tcgcgaacag    240
ccgcgcggct atgtcacgat gcaggagatc gcgccaagc acggcgtcga agacctgtgg    300
ctgtttaaac ccgagaaatg ggactgtttg tcccgcgaag acctgctcaa cctcgaacag    360
tattttcatt ttttggttaa tgaagcgaag aagcgccaat cataa                   405

SEQ ID NO: 2              moltype = AA   length = 134
FEATURE                   Location/Qualifiers
source                    1..134
                          mol_type = protein
                          organism = Bacillus licheniformis
SEQUENCE: 2
MAMTRFGERL KELREQRSLS VNQLAMYAGV SAAAISRIEN GHRGVPKPAT IRKLAEALKM    60
PYEQLMDIAG YMRADEIREQ PRGYVTMQEI AAKHGVEDLW LFKPEKWDCL SREDLLNLEQ   120
YFHFLVNEAK KRQS                                                    134

SEQ ID NO: 3              moltype = DNA   length = 423
FEATURE                   Location/Qualifiers
source                    1..423
                          mol_type = other DNA
                          organism = Bacillus licheniformis
SEQUENCE: 3
atggcgatga caaggttcgg cgagcggctc aaagagctga gggaacaaag aagcctgtcg    60
gttaatcagc ttgccatgta tgccggtgtg agcgccgcag ccatttccag agccgcagcc   120
atttccagaa tcgaaaacgg ccaccgcggc gttcccaagc ccgcgacgat cagaaaattg   180
gccgaggctc tgaaaatgcc gtacgagcag ctcatggata ttgccggtta tatgagagct   240
gacgagattc gcaacagcc gcgcggctat gtcacgatg aggagatcgc ggccaagcac   300
ggcgtcgaag acctgtggct gtttaaaccc gagaaatggg actgtttgtc ccgcgaagac   360
ctgctcaacc tcgaacagta ttttcatttt ttggttaatg aagcgaagaa gcgccaatca   420
taa                                                                423

SEQ ID NO: 4              moltype = AA   length = 140
FEATURE                   Location/Qualifiers
source                    1..140
                          mol_type = protein
                          organism = Bacillus licheniformis
SEQUENCE: 4
MAMTRFGERL KELREQRSLS VNQLAMYAGV SAAAISRAAA ISRIENGHRG VPKPATIRKL    60
AEALKMPYEQ LMDIAGYMRA DEIREQPRGY VTMQEIAAKH GVEDLWLFKP EKWDCLSRED   120
LLNLEQYFHF LVNEAKKRQS                                              140

SEQ ID NO: 5              moltype = AA   length = 6
FEATURE                   Location/Qualifiers
source                    1..6
                          mol_type = protein
                          organism = Bacillus licheniformis
SEQUENCE: 5
AAAISR                                                               6

SEQ ID NO: 6              moltype = AA   length = 12
FEATURE                   Location/Qualifiers
source                    1..12
                          mol_type = protein
                          organism = Bacillus licheniformis
SEQUENCE: 6
AAAISRAAAI SR                                                       12

SEQ ID NO: 7              moltype = DNA   length = 26
FEATURE                   Location/Qualifiers
misc_feature              1..26
                          note = primer
source                    1..26
                          mol_type = other DNA
                          organism = synthetic construct
SEQUENCE: 7
gagactagtg agctcgcatc acacgc                                        26

SEQ ID NO: 8              moltype = DNA   length = 38
FEATURE                   Location/Qualifiers
misc_feature              1..38
                          note = primer
source                    1..38
                          mol_type = other DNA
                          organism = synthetic construct
SEQUENCE: 8
gactgcggcc gcaccatgat tactcccctt tctaatct                           38

SEQ ID NO: 9              moltype = DNA   length = 38
FEATURE                   Location/Qualifiers
misc_feature              1..38
```

```
                                note = primer
source                          1..38
                                mol_type = other DNA
                                organism = synthetic construct
SEQUENCE: 9
tctggaaatg gctgcggcgc tcacaccggc atacatgg                              38

SEQ ID NO: 10                   moltype = DNA   length = 38
FEATURE                         Location/Qualifiers
misc_feature                    1..38
                                note = primer
source                          1..38
                                mol_type = other DNA
                                organism = synthetic construct
SEQUENCE: 10
gccgcagcca tttccagaat cgaaaacggc caccgcgg                              38

SEQ ID NO: 11                   moltype = DNA   length = 28
FEATURE                         Location/Qualifiers
misc_feature                    1..28
                                note = primer
source                          1..28
                                mol_type = other DNA
                                organism = synthetic construct
SEQUENCE: 11
gactaagctt cgccgtcttg atgcttgt                                         28

SEQ ID NO: 12                   moltype = DNA   length = 21
FEATURE                         Location/Qualifiers
misc_feature                    1..21
                                note = primer
source                          1..21
                                mol_type = other DNA
                                organism = synthetic construct
SEQUENCE: 12
gtacggcatt ttcagagcct c                                                21

SEQ ID NO: 13                   moltype = DNA   length = 26
FEATURE                         Location/Qualifiers
misc_feature                    1..26
                                note = primer
source                          1..26
                                mol_type = other DNA
                                organism = synthetic construct
SEQUENCE: 13
tgaatcatct ttccgatcac aagttg                                           26

SEQ ID NO: 14                   moltype = DNA   length = 23
FEATURE                         Location/Qualifiers
misc_feature                    1..23
                                note = primer
source                          1..23
                                mol_type = other DNA
                                organism = synthetic construct
SEQUENCE: 14
aaggagggga tgacaaatgg aag                                              23

SEQ ID NO: 15                   moltype = DNA   length = 402
FEATURE                         Location/Qualifiers
source                          1..402
                                mol_type = other DNA
                                organism = Bacillus licheniformis
SEQUENCE: 15
atgacgaact ttggacacca tttacgacaa ttaagggaac ggaaaaaact gaccgtcaat      60
caactggcga tgtattccgg cgtcagttcg gcaggcattt cgcgaatcga aaacggaaag     120
cgcggcgtgc cgaagccggc gacgatcaga aaactgcgg acgctttgaa agtcccgtat     180
gaggaactga tggcatctgc aggctatatc agcgcgtcta cagtccagga agcaagagc     240
agctatgatt ccatttacga catcgtgtca cagtacgatt tagaggacct ttctctgttt     300
gacagcgaaa agtggaaggt gctttcaaaa aaagacatcg aaaacctgga caaatatttc     360
gactttctcg tgcaggaagc aagcagccga aacaaaaact ga                        402

SEQ ID NO: 16                   moltype = AA    length = 60
FEATURE                         Location/Qualifiers
source                          1..60
                                mol_type = protein
                                organism = Bacillus licheniformis
SEQUENCE: 16
MTNFGHHLRQ LRERKKLTVN QLAMYSGVSS AGISRIENGK RGVPKPATIR KLADALKVPY      60
```

| SEQ ID NO: 17 | moltype = DNA length = 231 |
|---|---|
| FEATURE | Location/Qualifiers |
| source | 1..231 |
| | mol_type = other DNA |
| | organism = Bacillus licheniformis |

SEQUENCE: 17
```
atggtaaaaa agattcatat caaaagagat tttgttctcc agtacatgat tgaacacaat      60
ctctccttaa atcagcttgc cattgaaatc ggcgtatccc cggcgacact cagcagagtt     120
ttaaatggcg aaaggaggcc cggacaactt gtgatcggaa agatgattca gtatttcaac     180
aaaaaatttg aagatctctt ttattataaa gatgttgaca aaagtcaata a              231
```

| SEQ ID NO: 18 | moltype = AA length = 75 |
|---|---|
| FEATURE | Location/Qualifiers |
| source | 1..75 |
| | mol_type = protein |
| | organism = Bacillus licheniformis |

SEQUENCE: 18
```
MVKKIHIKRD FVLQYMIEHN LSLNQLAIEI GVSPATLSRV LNGERRPGQL VIGKMIQYFN      60
KKFEDLFYYK DVDKS                                                      75
```

| SEQ ID NO: 19 | moltype = DNA length = 285 |
|---|---|
| FEATURE | Location/Qualifiers |
| source | 1..285 |
| | mol_type = other DNA |
| | organism = Bacillus licheniformis |

SEQUENCE: 19
```
gtgaaaaata ccgggattgt ccggagaatc gatgagctcg gcagagtcgt tctcccggtc      60
gaaatgcgca gggtgctgaa tatcaatgaa aggacccgc tcgaaatata ccgacggc       120
gaaaacatca ttttgacaaa atacgccgca aacatggcat gtttgatgac cggcgacatc    180
accacgaaaa ataaaacgta tgcgggcggc aaaatcgtac tcagcccgcg cggagcggaa    240
atgctcctgg aagatatgat ggcggcactg tcagaaaaga ataa                      285
```

| SEQ ID NO: 20 | moltype = AA length = 93 |
|---|---|
| FEATURE | Location/Qualifiers |
| source | 1..93 |
| | mol_type = protein |
| | organism = Bacillus licheniformis |

SEQUENCE: 20
```
MKNTGIVRRI DELGRVVLPV EMRRVLNINE KDPLEIYTDG ENIILTKYAA NMACLMTGDI      60
TTKNKTYAGG KIVLSPRGAE MLLEDMMAAL SEK                                  93
```

| SEQ ID NO: 21 | moltype = DNA length = 285 |
|---|---|
| FEATURE | Location/Qualifiers |
| source | 1..285 |
| | mol_type = other DNA |
| | organism = Bacillus licheniformis |

SEQUENCE: 21
```
atgaaatcta caggtattgt acgtaaagtt gatgaactag gacgcgtggt gattccaatc      60
gaacttcgcc gtacgcttgg aatcgcagaa aaagacgctc ttgaaatcta tgtagatgac    120
gaaaaaatca tcttgaaaaa atataaacca aacatgactt gccaagttac aggtgaggtt    180
tctgatgaca accttaaact tgcaggcggt aaattggttc ttagccctga aggcgctgag    240
caaatcatta cgaaattca agcacaactt caatctcaaa aataa                      285
```

| SEQ ID NO: 22 | moltype = AA length = 94 |
|---|---|
| FEATURE | Location/Qualifiers |
| source | 1..94 |
| | mol_type = protein |
| | organism = Bacillus licheniformis |

SEQUENCE: 22
```
MKSTGIVRKV DELGRVVIPI ELRRTLGIAE KDALEIYVDD EKIILKKYKP NMTCQVTGEV      60
SDDNLKLAGG KLVLSPEGAE QIINEIQAQL QSQK                                 94
```

| SEQ ID NO: 23 | moltype = DNA length = 288 |
|---|---|
| FEATURE | Location/Qualifiers |
| source | 1..288 |
| | mol_type = other DNA |
| | organism = Bacillus licheniformis |

SEQUENCE: 23
```
ttgaaagcaa taggagttgt gagaaaagta gacgaactcg gcaggatcgt gatgccgatt      60
gaattgagaa gagcttttgga tatctcgatc aaggacagca tcgaattctt tgtcgaccaa    120
gataaaatcg tcctgaaaaa atataaaccg cacggtgtgt gtctgatgac cggtgaaatc    180
acttctgaaa ccgcgagta tggaaacggg aaaattacgc tcagtcctga aggggccgaa    240
ttgcttttgg aagaaatcaa agctgcctta acgagtga aagcataa                    288
```

| SEQ ID NO: 24 | moltype = AA length = 95 |
|---|---|
| FEATURE | Location/Qualifiers |
| source | 1..95 |
| | mol_type = protein |
| | organism = Bacillus licheniformis |

```
SEQUENCE: 24
MKAIGVVRKV DELGRIVMPI ELRRALDISI KDSIEFFVDQ DKIVLKKYKP HGVCLMTGEI    60
TSENREYGNG KITLSPEGAE LLLEEIKAAL NGVKA                              95

SEQ ID NO: 25           moltype = DNA  length = 114
FEATURE                 Location/Qualifiers
source                  1..114
                        mol_type = other DNA
                        organism = Bacillus licheniformis
SEQUENCE: 25
atgaaagtga gaccatcagt taaaccgatc tgtgaaaaat gcaaggtcat tcgcagaaaa    60
ggaaaagtaa tggtgatctg tgaaaatcca aagcataaac aaaaacaagg ataa         114

SEQ ID NO: 26           moltype = AA  length = 37
FEATURE                 Location/Qualifiers
source                  1..37
                        mol_type = protein
                        organism = Bacillus licheniformis
SEQUENCE: 26
MKVRPSVKPI CEKCKVIRRK GKVMVICENP KHKQKQG                             37

SEQ ID NO: 27           moltype = DNA  length = 431
FEATURE                 Location/Qualifiers
source                  1..431
                        mol_type = other DNA
                        organism = Bacillus licheniformis
SEQUENCE: 27
atgcgtacaa cacctatggc taacgcaagt aatattgaac gcaagtggtt agttgttgat    60
gctgctggca agacgctagg acgtctttct actgaagttg catctatcct tcgcggaaaa   120
cataaaccaa cttacacacc acacgttgac actggagtac atgtgatcat catcaacgct   180
gaaaaaatcg agttaactgg taaaagatta acggacaaaa tctactaccg tcacactcaa   240
catccaggcg gtttaaaatc aagaactgct cttgaaatgc gtacaaacta ccctgagaaa   300
atgcttgaac ttgcgatcaa aggcatgctt ccaaaaggtt ctctaggtcg tcaaatgttc   360
aaaaaattga atgtataccg tggttctgag catccacacc aagcacaaaa acctgaagtt   420
tacgaacttc g                                                        431

SEQ ID NO: 28           moltype = AA  length = 143
FEATURE                 Location/Qualifiers
source                  1..143
                        mol_type = protein
                        organism = Bacillus licheniformis
SEQUENCE: 28
MRTTPMANAS NIERKWLVVD AAGKTLGRLS TEVASILRGK HKPTYTPHVD TGDHVIIINA    60
EKIELTGKKL TDKIYYRHTQ HPGGLKSRTA LEMRTNYPEK MLELAIKGML PKGSLGRQMF   120
KKLNVYRGSE HPHQAQKPEV YEL                                           143

SEQ ID NO: 29           moltype = DNA  length = 915
FEATURE                 Location/Qualifiers
source                  1..915
                        mol_type = other DNA
                        organism = Bacillus licheniformis
SEQUENCE: 29
atgggtacaa tagggataaa ctttaaaaac attcaacatc aatatcgtac caaggatgtg    60
ctaaggggga tgagtttcca tgccgatccc tcctccatca cgttcttggc aggcgagaat   120
ggagccggaa agacaacttt gataaaggtt gctctcgggct taatcagtcc gaaggcagga   180
aatgcgctgt tcgacgggca aagcgtcggg gaaatccggg agaagatcag ctgcgtgttt   240
gatgagcctc ctgtttatcc taatgaaagt ggtcttgaca tctaaagttt ttatcaggt    300
atacacagcc ttgatcgaaa gtggagtcag gaggtttgtg ccatgctcaa attggatgag   360
ggactttaa aacaaaaagc aaaagcgcta tcactgggca aaagacaccg tttagctgta   420
gcggccgcgt tattgcgcaa acctaaatat ttgtttcttg atgagccgtc aatcggcctc   480
gacccaccgt catggcagct ggtccaaatc gcttttaaac agatgactgc caggggatgt   540
gcaattttga ttacggggca aaattatgac gcgattgaaa atctcgctga caatatagcg   600
atttttgcaa gtgaaaaaat tatcttctcc ggtcctattg taaaacttgt tcaagcattt   660
cccgtatatg ttcgaattgt aactgatgac catcgggaaa tagctgtgca gtttccagaa   720
gctgaacctg attcttccgg aatataccgc atcgtttgcg aatcaggtga acaggcccgc   780
gccgtgattg atcaggtgag gagaagcacc ctgaattttc aagagctatc gactgaaaaa   840
gcgtcaatgg gaaaatggt gacagatatt tacaaggatg gatttcagtc ggaaaagaga   900
gggttaacgt atgaa                                                    915

SEQ ID NO: 30           moltype = AA  length = 304
FEATURE                 Location/Qualifiers
source                  1..304
                        mol_type = protein
                        organism = Bacillus licheniformis
SEQUENCE: 30
MGTIGINFKN IQHQYRTKDV LRGVSFHADP SSITFLAGEN GAGKTTLIKV ALGLISPKAG    60
NALFDGQSVG EIREKISCVF DEPPVYPNES GLDNLKFLSG IHSLDRKWSQ EVCAMLKLDE   120
GLLKQKAKAL SLGQRHRLAV AAALLRKPKY LFLDEPSIGL DPPSWQLVQI ALKQMTARGC   180
AILITGQNYD AIENLADNIA ILQSGKIIFS GPIVKLVQAF PVYVRIVTDD HREIAVQFPE   240
```

```
AEPDSSGIYR IVCESGEQAR AVIDQVRRST LNFQELSTEK ASMGKMVTDI YKDGFQSEKR    300
GLTY                                                                304

SEQ ID NO: 31           moltype = DNA  length = 1096
FEATURE                 Location/Qualifiers
source                  1..1096
                        mol_type = other DNA
                        organism = Bacillus licheniformis
SEQUENCE: 31
atgagcaagg tcgcttcaga ggtggttgcg ggggtgttga cgaattcca tttggccatt    60
aaaaagcacg atactgagca ggcaaagcat cttttttgatg aggcgaagtc gatgttttcc  120
gagatggaag aggatcagaa tgtgctggct tatttttcgc ttcttgagga gcggtaccgg   180
atgatgcttt atgatgcgag gggagagcgg ctgccgcggg agtcttattt taatgattcg   240
cagatcgagc gcatcgagca gacggatcat atgattgatt actatttcta ctttttcgag   300
gcgatgcatg aagcgtacaa caagaatgtt gagcgggcga tcagtctgta caaggttgcc   360
gagaaaaaac tggcgaaggt gcccgatcag attgaagcgg ccgagtttta ttttaaagtg   420
tcctggctgt atatgtctct tcggcaaaat gcggtttctc tcaattatgc gagagacgcg   480
atgaatattt acaaaatgca tgacgggtac gaaaaaaagc tggcgatttc ccaagttgtg   540
atggggacaa attacatgca gatgcagcgc tttaagatgg cggagaagta ctttgaagaa   600
tcgattgaaa tttccaaaaa gattgacgat tcattttag aagcgatgct tcatcacaat    660
atcagcattc tgtattccaa ttccggccgg tctcaggaat gcattctcgc cgtccagcat   720
gctttgagca acgccgtaatg gtgcaagtca agctactata tcaactcgct ttacatgctg   780
accagagagt ttttcaaaat cggcgaaaca gaagcggccc tgttctatca taaaaaagga   840
caggaggaat aaagaaaaa cgggaataag cattatgaaa agaaaataaa tattatttat    900
gagctgtatt gccatgaaaa cgtaaaaagc atcaaagacg acatccattc cttgacgag    960
atgaatgatt tagacggtgt ctgcgatctt tctttgctca tctcaagcta ttttgagaaa   1020
aaaggagatg acaagaaagc gctggaattt gttaaaatat tcatgaaagc cgaaaacaaa   1080
atgagatcat taggga                                                  1096

SEQ ID NO: 32           moltype = AA  length = 364
FEATURE                 Location/Qualifiers
source                  1..364
                        mol_type = protein
                        organism = Bacillus licheniformis
SEQUENCE: 32
MSKVASEVVA GVLNEFHLAI KKHDTEQAKH LFDEAKSMFS EMEEDQNVLA YFSLLEERYR    60
MMLYDARGER LPRESYFNDS QIECIEQTDH MIDYYFYFFE AMHEAYNKNV ERAISLYKVA   120
EKKLAKVPDQ IEAAEFYFKV SWLYMSLRQN AVSLNYARDA MNIYKMHDGY EKKLAISQVV   180
MGTNYMQMQR FKDAEKYFEE SIEISKKIDD SFLEAMLHHN ISILYSNSGR SQECILAVQH   240
ALSNAEWCKS SYYINSLYML TREFFKIGET EAALFYHKKG QEELKKNGNK HYEKKINIIY   300
ELYCHENVKS IKDDIHSLDE MNDLDGVCDL SLLISSYFEK KGDDKKALEF VKIFMKAENK   360
MRSL                                                                364

SEQ ID NO: 33           moltype = DNA  length = 121
FEATURE                 Location/Qualifiers
source                  1..121
                        mol_type = other DNA
                        organism = Bacillus licheniformis
SEQUENCE: 33
atgaaaaaat taattctttg cttgtcgtta actgctatgg tcttaggcgg agctgcttta    60
tcccaaagcc acaatcaggc gtcaggcggc gttcaaacag cggagctgcc ggttggggt    120
t                                                                   121

SEQ ID NO: 34           moltype = AA  length = 40
FEATURE                 Location/Qualifiers
source                  1..40
                        mol_type = protein
                        organism = Bacillus licheniformis
SEQUENCE: 34
MKKLILCLSL TAMVLGGAAL SQSHNQASGG VQTAELPVGG                          40

SEQ ID NO: 35           moltype = DNA  length = 747
FEATURE                 Location/Qualifiers
source                  1..747
                        mol_type = other DNA
                        organism = Bacillus licheniformis
SEQUENCE: 35
atgaatgaca aaacattttt atcatttta aaacacgcag ataagccttt cagcggctgg     60
gatttttctt tcattgaaga cacaggacga atgaaaagcg acctgctttc atggtcatac   120
ggaagcatgg ctctgtctct tatccaggat tccgaatcaa tgttggatat ggggacaggc   180
ggcggcgagt tttatccaa ttggggccg tttccttcgt cagcatacg tactgaatgt     240
tatttgccta atgtgccagt cgccaaggaa cgattgacgc ctttaggggt tcaggtcgtt   300
caaattgatg atgatgaaga tcttccattt gaatccggcc aattcgacct gatcatcaat   360
aaacacgaa catattcagt tcaagaggtg aggagaatcc tttcaaaagg aggacggttt   420
ctcactcagc aagtcggcgg gcttgattgc gaagaaataa atgaaaaact tggcgtgccg   480
ctaaatgaag aatttaagga ttgggactta gaaacagcgt taaagagat ggaaaagcat    540
gattttaaga tttttaaaag cagagaagag tgtccgactc aaaggtttta tgatattggg   600
gctctggtct attatttgaa agccattccc tggcaggcgc tcggttttga agtgaatcaa   660
tataaggatg aattgtacga gattcataaa atgatcgaag aaaagggcta ttttgacgtc   720
```

```
acacagtacc ggtttatgat tttagcg                                          747

SEQ ID NO: 36           moltype = AA  length = 248
FEATURE                 Location/Qualifiers
source                  1..248
                        mol_type = protein
                        organism = Bacillus licheniformis
SEQUENCE: 36
MNDKTFLSFL KHADKPFSGW DFSFIEDTGR MKSDLLSWSY GSMALSLIQD SESMLDMGTG       60
GGEFLSKLGP FPSSAYATEC YLPNVPVAKE RLTPLGVQVV QIDDDEDLPF ESGQFDLIIN      120
KHESYSVQEV RRILSKGGRF LTQQVGGLDC EEINEKLGVP LNEEFKDWDL ETALKEMEKH      180
DFKILKSREE CPTQRFYDIG ALVYYLKAIP WQALGFEVNQ YKDELYEIHK MIEEKGYFDV      240
TQYRFMIL                                                              248

SEQ ID NO: 37           moltype = DNA  length = 183
FEATURE                 Location/Qualifiers
source                  1..183
                        mol_type = other DNA
                        organism = Bacillus licheniformis
SEQUENCE: 37
atgggtaacg cagtacatga caaagaacag caagtcaatt atttgaaaaa cagattggat       60
atgtttatgt cagtcatcga ttctttagac ccggaatcga ccgaccttga agatattgac      120
agactgatca gcatgctcga cgatttggaa gccaaatacg agcgctttaa aaaagactgg      180
aaa                                                                   183

SEQ ID NO: 38           moltype = AA  length = 61
FEATURE                 Location/Qualifiers
source                  1..61
                        mol_type = protein
                        organism = Bacillus licheniformis
SEQUENCE: 38
MGNAVHDKEQ QVNYLKNRLD MFMSVIDSLD PESTDLEDID RLISMLDDLE AKYERFKKDW       60
K                                                                      61

SEQ ID NO: 39           moltype = DNA  length = 1086
FEATURE                 Location/Qualifiers
source                  1..1086
                        mol_type = other DNA
                        organism = Bacillus licheniformis
SEQUENCE: 39
atgtcaaaat cagtaaaatc agtcacatca cctaaaaaat ttattacagg aaaacgactg       60
ctggagaact tgaacgacta cattgaagat tttggcgaca acgcatatat catttgcgat      120
gaattcattt tggaacgcgc tcaaaaagaa gcggggaatt cgattcagaa agccggcaat      180
caagccgttt ttgaaaaatt caattacgaa tgcacacagg aagaaatcga tcgcaaccgg      240
gagcttgcac gcaatgcagg cgctaatatc atcgttggga tcggaggcgg taaaacgctt      300
gataccgcaa aagccaccgc ttattacgag aagctgccgg ttgtgatttt cccgacaatt      360
gcttctacgg atgctccatg tacggccctt gccgtcattt ataaacacga cggatcgttt      420
gaccgctatc tgttttttgcc gacgaaccca gatgtcgttc ttgcggactc tgagattttg      480
gcatccgcgc cgccgcgctt tttcgcagcc ggtatcggtg acgccttggc gacgtatttt      540
gaagcgcgtg cctgctttaa agcaaacggc gataacctcg tgctgatgaa gccttcaaca      600
actggattgg gacttgcccg tctttgctat gatacgctgt tggaaaacgg tgtgaaagcg      660
atgcaggcgg ttaagcacgg cgtttccaca cgagcggtcg aagatacaat cgaggcgacc      720
atctatttaa gcggcgtcgg tgccgaatca ggcggtcttg ccgccgcaca cgcgatccac      780
aacggaatga cagccgttcc ttctctgcac agggctcagc acggcgaaaa agtcacgttc      840
ggcttttgg cgcagcttgt tcttgaaaac gcgccgggcg aagaattgga gaccgttatt      900
gactttatca aaggcgtcgg tcttccgttg acattaaaag acctcggagt cgacgaattt      960
gtcgaagaag aatggcgcca agtcgctcaa agcgcttgcg cggaaggcga cacaatgggc     1020
aacatgccgt tcccagtcac ccctgacgac gtctacaatg cgatcgtcgc cgccaacgcg     1080
attgca                                                                1086

SEQ ID NO: 40           moltype = AA  length = 361
FEATURE                 Location/Qualifiers
source                  1..361
                        mol_type = protein
                        organism = Bacillus licheniformis
SEQUENCE: 40
MSKSVKSVTS PKKFITGKRL LENLNDYIED FGDNAYIICD EFILERAQKE AGNSIQKAGN       60
QAVFEKFNYE CTQEEIDRNR ELARNAGANI IVGIGGGKTL DTAKATAYYE KLPVVIFPTI      120
ASTDAPCTAL AVIYKHDGSF DRYLFLPTNP DVVLADSEIL ASAPPRFFAA GIGDALATYF      180
EARACFKANG DNLVLMKPST TGLGLARLCY DTLLENGVKA MQAVKHGVST RAVEDTIEAT      240
IYLSGVGAES GGLAAAHAIH NGMTAVPSLH RAQHGEKVTF GLLAQLVLEN APAEELETVI      300
DFIKGVGLPL TLKDLGVDEF VEEEWRQVAQ SACAEGDTMG NMPFPVTPDD VYNAIVAANA      360
I                                                                     361

SEQ ID NO: 41           moltype = DNA  length = 110
FEATURE                 Location/Qualifiers
source                  1..110
                        mol_type = other DNA
                        organism = Bacillus licheniformis
```

SEQUENCE: 41
atgatgggta aagggagaat taaagtggaa gaacggatta agatcgaaac cgatgctgaa    60
atgtttaaag cgactctcct tgatcaaaca cagtctcaga agaagaaata              110

SEQ ID NO: 42           moltype = AA   length = 36
FEATURE                 Location/Qualifiers
source                  1..36
                        mol_type = protein
                        organism = Bacillus licheniformis
SEQUENCE: 42
MMGKGRIKVE ERIKIETDAE MFKATLLDQT QSQKKK                              36

SEQ ID NO: 43           moltype = DNA   length = 231
FEATURE                 Location/Qualifiers
source                  1..231
                        mol_type = other DNA
                        organism = Bacillus licheniformis
SEQUENCE: 43
atgaaagaga aaaaatcgta cgctgagctc atgaagtccc gcaataccca aaaggtgaaa    60
gaacttgatg taaccatcac ggatatctac attcaaatgg tccttgatga atcgcttttt   120
aaacggcgtt tgcacacgct gagcaagaag attaatgaag cattagacaa aggagataag   180
caatctttcc ttgagctttc aagagaatat acagcgctga aaaagcacgc a            231

SEQ ID NO: 44           moltype = AA   length = 77
FEATURE                 Location/Qualifiers
source                  1..77
                        mol_type = protein
                        organism = Bacillus licheniformis
SEQUENCE: 44
MKEKKSYAEL MKSRNTQKVK ELDVTITDIY IQMVLDESLF KRRLHTLSKK INEALDKGDK    60
QSFLELSREY TALKKHA                                                  77

SEQ ID NO: 45           moltype = DNA   length = 627
FEATURE                 Location/Qualifiers
source                  1..627
                        mol_type = other DNA
                        organism = Bacillus licheniformis
SEQUENCE: 45
gtgggaaaag aaaaaacaaa aaagccaatt tataagaaat ggtggttttg gttaatcatc    60
gttatcatca tcggggcagc agcatcaaat ggtggaaatt cagagcaagc ttcatcaaca   120
aataaagaaa aatccaccga gagtaaaacg actgaaacaa aacaagatac gaagaaagaa   180
gaaaaaaagg aagaaccgaa aaaagaggaa acaaaccccta aatcggtga cgatgttaaa   240
gtcggtgata tgaattataa aatcactggg aagaaaacag cagatcaggt gggaccgtct   300
gcattgcctc aaaaagctag cgataaatac cttgttattg atgtcacatt gaaaaataac   360
ggcaatgaaa agtaacagt agacgcttct ttcttcaagc ttaaacgtgg agaaaaaacc   420
tatgaagctg attctgctgc aagcatgtca gcgaaccaaa gcgaggacgg caatattgac   480
aataactttt tccttcaaaa cttgaatcct gattctaaaa tcagtggaaa agtagtattt   540
gatgtagctc cggaagttgc taacgcaaaa gacctacaat tacaagtgca gactggtgca   600
tggggaacgg aaaccggaat catcgat                                       627

SEQ ID NO: 46           moltype = AA   length = 209
FEATURE                 Location/Qualifiers
source                  1..209
                        mol_type = protein
                        organism = Bacillus licheniformis
SEQUENCE: 46
VGKEKTKKPI YKKWWFWLII VIIIGAAASN GGNSEQASST NKEKSTESKT TKQDTKKE      60
EKKEEPKKEE TNPKIGDDVK VGDMNYKITG KKTADQVGPS ALPQKASDKY LVIDVTLKNN   120
GNEKVTVDAS FFKLKRGEKT YEADSAASMS ANQSEDGNID NNFFLQNLNP DSKISGKVVF   180
DVAPEVANAK DLQLQVQTGA WGTETGIID                                     209

SEQ ID NO: 47           moltype = DNA   length = 1877
FEATURE                 Location/Qualifiers
source                  1..1877
                        mol_type = other DNA
                        organism = Bacillus licheniformis
SEQUENCE: 47
atgcaattag agatcgggaa gcaatcgcag caaaaccgtc acacgttgca atttgaaaat    60
tggaggcagc acggggaatt gatagctgcg cttttgtcgg gtttgttgat tcttgcaggc   120
tggctgttgt ccggcaatga acattgtcc gttgttctgt ttattttagc tttttgtatc   180
ggcggctttg ctaaagcgaa agaagtata caagaaacgc tgtcggaaaa acgctgaat   240
gttgaactct tgatgatttt tgcggcggtc gggtctgcgc tgatcggcta ctgggctgaa   300
ggggccgtgt taatttttat cttttctctc agccggagcgc ttgaaacgta acattaaat   360
aaaagcaaac gcgatttgac ttcactgatg aaattggagc gcgaggaagc cgttttgctt   420
gaaaagaag gaacaagaac cgtgcggcga gccgatcttc aggggcga cctcattctt   480
gtgaagcctg agaacgcat gcggcagac ggagaaatcg aaaccggaaa acgagtatc   540
gacgaatcgc ctctaacggg cgaatccatc ccagccgaaa aaacactcgg agacgcggtt   600
tttgcgggta cggtcaattt gagcggatcg ctcacggtcc gtgtcacaaa ggcaaatgaa   660
gattcgttgt tcaaaagat cattcggctc gttgagtctg cgcaaaacag cgtttcaccg   720

```
tcgcaggcgt tcattgagcg atttgaaaat atttacgtta aaggggtttt gcttgctgtc    780
ggactgctgc tctttctgcc gcatttttg cttggctgga gctggagcga gacattttac     840
agagcgatgg tgttcatggt cgtcgcttcg ccgtgcgccc ttgtcgcttc aatcatgcct    900
gccgcgctgt cgctgatatc aaatggcgca agaaacggcc tgcttgtcaa aggcagcgtc    960
tttcttgaaa agcttggcaa cagcaaaatc gttgcattga ataaacggg aacgattacg    1020
aacggaaagc ccggcgtgga ggatatgctt ttagctgcag atatcgagga gcgcgaatgc   1080
ttggaggctg ctgctgcgat tgagaagcag tcaggccatc cgcttgccaa agcgattgtc   1140
gagtatgcag aagcaaaagg catcaagccg ccgcgaatg tgtcgattga ggagacgtca    1200
gggtttggcg ttcaggctcg atacaatgga gagacatggc tgatcggcaa agccggattt   1260
gtcggggaag aggcagccgg gcaatttctc acggcggctg ttcaggagct tgccaagcag   1320
ggaaaaacaa ttgtgttcat gaaaaaggc gaaaaaatcg cggggtgttt tgcattaaaa    1380
gaccaaatca gaccggaagc aaaagcggtg gtcgaagagc tgaacgcgct tggcgttcag    1440
acggcgatgc tgacagggga ccagcctgaa accgcagcgg ccatcgcacg agaagcgggc   1500
ttgaaaatcg tcgtttcaga atgccttcct gacagaaaag tagaggaagc gaaaaagctg   1560
aaaaaaacat acggaacaat cgttatggtg ggagacggaa tcaatgatgc accggccta    1620
gccgccgctg atgtgggat cgcaatgggg ggaggaacag atgtcgcact ggaaacggct    1680
gacgtcgttt taatgaaaaa cgaattgaca ggactgacca aaatgattcg gctctcccgg   1740
aaaatgaata cgatcattaa acaaaacgtc attttctcgc ttgctgtgat ctgtcttta    1800
atctgcagca actttcttca aattcttgat ctgccgctcg tgtcatcgg gcatgaaggc    1860
agcacgctgc ttgtgat                                                   1877

SEQ ID NO: 48           moltype = AA    length = 625
FEATURE                 Location/Qualifiers
source                  1..625
                        mol_type = protein
                        organism = Bacillus licheniformis
SEQUENCE: 48
MQLEIGKQSQ QNRHTLQFEN WRQHGELIAA LLSGLLILAG WLLSGNETLS VVLFILAFCI    60
GGFAKAKEGI QETLSEKTLN VELLMIFAAV GSALIGYWAE GAVLIFIFSL SGALETYTLN   120
KSKRDLTSLM KLEPEEAVLL EKEGTRTVAA ADLQAGDLIL VKPGERIAAD GEIETGKTSI   180
DESALTGESI PAEKTLGDAV FAGTVNLSGS LTVRVTKANE DSLFKKIIRL VESAQNSVSP   240
SQAFIERFEN IYVKGVLLAV GLLLFLPHFL LGWSWSETFY RAMVFMVVAS PCALVASIMP   300
AALSLISNGA RNGLLVKGSV FLEKLGNSKI VALDKTGTIT NGKPGVEDML LAADIEEREC   360
LEAAAAIEKQ SGHPLAKAIV EYAEAKGIKP AANVSIEETS GPGVQARYNG ETWLIGKAGF   420
VGEEAAGQFL TAAVQELAKQ GKTIVFMKKG EKIAGCFALK DQIRPEAKAV VEELNALGVQ   480
TAMLTGDQPE TAAAIAREAG LKIVVSECLP DRKVEEAKKL KKTYGTIVMV GDGINDAPAL   540
AAADVGIAMG GGTDVALETA DVVLMKNELT GLTKMIRLSR KMNTIIKQNV IFSLAVICLL   600
ICSNFLQILD LPLGVIGHEG STLLV                                          625

SEQ ID NO: 49           moltype = DNA   length = 178
FEATURE                 Location/Qualifiers
source                  1..178
                        mol_type = other DNA
                        organism = Bacillus licheniformis
SEQUENCE: 49
atggaacgct tttcagaaga agagagaaaa ctgttgctga acgtactttt ggaccatgag     60
tatgccgtag agctactaag cagtgagatc aatgatatag aaactggtac aaaaaatgtg   120
gatagcctga catataagaa actggttacc ttatatgacc gtgtccggtc tgaaaatt     178

SEQ ID NO: 50           moltype = AA    length = 59
FEATURE                 Location/Qualifiers
source                  1..59
                        mol_type = protein
                        organism = Bacillus licheniformis
SEQUENCE: 50
MERFSEEERK LLLNVLLDHE YAVELLSSEI NDIETGTKNV DSLTYKKLVT LYDRVRSEN      59

SEQ ID NO: 51           moltype = DNA   length = 537
FEATURE                 Location/Qualifiers
source                  1..537
                        mol_type = other DNA
                        organism = Bacillus licheniformis
SEQUENCE: 51
atgattaatc agcttaaatt gcgtccgctt gaaagagaag accttccgtt tgtccaccgt     60
cttaacaacg atgcgaaaat tatgtcatat tggtttgaag aaccgtacga gacttttgtt   120
gagctgcagg atttatttga caaacacatt cacgaccaaa gcgagcggcg ctttatcata   180
gagaaagaga ctgagatgat cggattggta gagctggtcg aaattgatta tattcacagg   240
cgggcggagt ttcaaatcat aattgatccc gagcatcaag ggaacggtta ttcgtcaagc   300
gcaacatatt tggtcaatga actacgcattt ccgttcttga acttgctcaa attgctattg   360
atcgtcgacg aagataatgc aaaagcgatt cacttgtata aaaaggcagg gttcactatc   420
gagagcgagc tgcaggatga atttttcgtc gacggctatt atcgtaacgc cattagaatg   480
tgcattttc aggatgagtt tttatcactt aaaaaaagca agaggaagg catgcag        537

SEQ ID NO: 52           moltype = AA    length = 178
FEATURE                 Location/Qualifiers
source                  1..178
                        mol_type = protein
                        organism = Bacillus licheniformis
SEQUENCE: 52
```

```
MINQLKLRPL EREDLPFVHR LNNDAKIMSY WFEEPYETFV ELQDLFDKHI HDQSERRFII    60
EKETEMIGLV ELVEIDYIHR RAEFQIIIDP EHQGNGYSSS ATYLAMNYAF SVLNLHKLYL   120
IVDEDNAKAI HLYKKAGFTI ESELQDEFFV DGYYRNAIRM CIFQDEFLSL KKSKEEGM    178

SEQ ID NO: 53           moltype = DNA  length = 207
FEATURE                 Location/Qualifiers
source                  1..207
                        mol_type = other DNA
                        organism = Bacillus licheniformis
SEQUENCE: 53
atgcaccata tgaacgtatc atacttaaga aattgttttg ccgagatgaa acagtatgag    60
acagactgca tgaacaaact gatggatttc gctaagtttt tgtatatcca gggacatctg   120
acattaaacg aatttcgcac aagtatgaaa gttcttgaag cgaatggcgc acagcaccct   180
gcttatgata tgaatacgga cgccagc                                      207

SEQ ID NO: 54           moltype = AA  length = 69
FEATURE                 Location/Qualifiers
source                  1..69
                        mol_type = protein
                        organism = Bacillus licheniformis
SEQUENCE: 54
MHHMNVSYLR NCFAEMKQYE TDCMNKLMDF AKFLYIQGHL TLNEFRTSMK VLEANGAQHP    60
AYDMNTDAS                                                           69

SEQ ID NO: 55           moltype = AA  length = 69
FEATURE                 Location/Qualifiers
source                  1..69
                        mol_type = protein
                        organism = Bacillus licheniformis
SEQUENCE: 55
MHHMNVSYLR NCFAEMKQYE TDCMNKLMDF AKFLYIQGHL TLNEFRTSMK VLEANGAQHP    60
AYDMNTDAS                                                           69

SEQ ID NO: 56           moltype = AA  length = 160
FEATURE                 Location/Qualifiers
source                  1..160
                        mol_type = protein
                        organism = Bacillus licheniformis
SEQUENCE: 56
MKKAILGFSL SAALLVPSSF AAAAGDGQLT SEQKELLEAK TEYVQSLPEQ ASVQSGVTAY    60
AGKRLTIKRG SFLAWSKDYI DWYYNGKKVS KSSGSQDVGY VFPNVVRAKG IKRYYKSSGL   120
HKWRAKKTLS FGTVTPWGDV ELASSTFTDR RWVNKKGKYG                         160

SEQ ID NO: 57           moltype = DNA  length = 422
FEATURE                 Location/Qualifiers
source                  1..422
                        mol_type = other DNA
                        organism = Bacillus licheniformis
SEQUENCE: 57
atgacaacac cgagtatgga agattacata gaacaaattt atatgctgat tgaagaaaaa    60
ggatatgcaa gagtctcaga tatagccgaa gctctggccg tccatccctc ctcggttaca   120
aaaatggttc aaaaactcga taagacgaaa tatttgattt atgaaaagta tcgcggcctc   180
gtgctgacgc ctaaaggaaa gaaaataggc aagcgtttag tatacagaca tgaattattg   240
gagcagtttt tacgaatcat tggtgttgac gaagagaaaa tttatgatga tgttgaagga   300
atcgaacatc atttaagctg gaacagcatt gaccgtatcg gagatcttgt gcagtatttt   360
gaagacgaca gcaaagatt cgacgatttg agaagcgtcc aaaaaagaaa cgaacaggaa   420
aa                                                                 422

SEQ ID NO: 58           moltype = AA  length = 140
FEATURE                 Location/Qualifiers
source                  1..140
                        mol_type = protein
                        organism = Bacillus licheniformis
SEQUENCE: 58
MTTPSMEDYI EQIYMLIEEK GYARVSDIAE ALAVHPSSVT KMVQKLDKDE YLIYEKYRGL    60
VLTPKGKKIG KRLVYRHELL EQFLRIIGVD EEKIYDDVEG IEHHLSWNSI DRIGDLVQYF   120
EDDSKRIDDL RSVQKRNEQE                                              140

SEQ ID NO: 59           moltype = DNA  length = 234
FEATURE                 Location/Qualifiers
source                  1..234
                        mol_type = other DNA
                        organism = Bacillus licheniformis
SEQUENCE: 59
gtgccggacg ttcaccata tcgtaaacgc tatcaaccag ccggtccggt cggcagatg    60
aaaaacaaac gtctgttcat actttcgttg attgtgttga gcgtggtcat gatcggagtt   120
caggaaacct tcccaaacct gctgacgaca gggttaatga ctgtcgttat tgcggcggca   180
gttttttaata ttttaaaaga atcgctgaat aaaaagatg aaacacacag caaa         234
```

| SEQ ID NO: 60 | moltype = AA length = 78 |
| --- | --- |
| FEATURE | Location/Qualifiers |
| source | 1..78 |
| | mol_type = protein |
| | organism = Bacillus licheniformis |

SEQUENCE: 60
```
MPDGSPYRKR YQPAGPVRQM KNKRLFILSL IVLSVVMIGV QETFPNLLTT GLMTVVIAAA    60
VFNILKESLN KKDETHSK                                                  78
```

| SEQ ID NO: 61 | moltype = DNA length = 210 |
| --- | --- |
| FEATURE | Location/Qualifiers |
| source | 1..210 |
| | mol_type = other DNA |
| | organism = Bacillus licheniformis |

SEQUENCE: 61
```
atggctcaaa acaacagaca aagcagttct aaccaactat tggttcctgg tgctgctcaa    60
gctatcgacc aaatgaaatt cgaaatcgct tctgaatttg gcgttaacct tggagcagaa   120
actacttctc gtgcaaacgg ttcagttgga ggagaaatca ctaagcgttt agtttctttc   180
gctcaacagc aaatgggtgg aacacaacaa                                    210
```

| SEQ ID NO: 62 | moltype = AA length = 70 |
| --- | --- |
| FEATURE | Location/Qualifiers |
| source | 1..70 |
| | mol_type = protein |
| | organism = Bacillus licheniformis |

SEQUENCE: 62
```
MAQNNRQSSS NQLLVPGAAQ AIDQMKFEIA SEFGVNLGAE TTSRANGSVG GEITKRLVSF    60
AQQQMGGTQQ                                                           70
```

| SEQ ID NO: 63 | moltype = DNA length = 1502 |
| --- | --- |
| FEATURE | Location/Qualifiers |
| source | 1..1502 |
| | mol_type = other DNA |
| | organism = Bacillus licheniformis |

SEQUENCE: 63
```
atgagcaaca ctgaacttga tttgctgagg cagcaggcga atgaattaaa cttgcaaata    60
ttaaagctga ttaacgagcg aggaagaatc gttcaggaga ttggaaaagc gaaggaagca   120
caaggcatca accgctacga tcctgtcaga gaaagagcga tgctgaacga aattattgaa   180
aataacgacg gaccgtttga aaactgacga atccagcata tcttcaaaga gattttcaaa   240
gccgggcttg aactgcagga agacgatcac agcaaagcgc tgctcgtttc ccgcaagaaa   300
aagcctgaaa atacaatcgt tgatctgaaa ggcgaaaaaa tcggcgacgg agaacaaaga   360
tttatcgtcg gtccgtgtgc ggttgaaagc tacgaacaag tagcggaagt cgcagcggca   420
gctaaaaagc aaggcttgaa actgcttcgc ggcgagcttt caaaccgcg tacaagcccg   480
tacgacttcc aaggcctcgg cgtggaaggc ctgcaaatct taaagcgtgt tgctgatgag   540
tatgatctgg ccgtcatcag tgagatcgtg aatccgcagc atattgaaga agccattgat   600
tacatcgatg tcatccaaat cggcgcccgc aacatgcaga acttcgagct cttaaaagcg   660
gccggttcag tgaagaagcc ggttctgctg aagcgcgaac ttgccgcaac gctgaaggaa   720
ttcatcaatg cagcggagta catcatgtcg cagggcaatg atcaaatcat cctttgtgaa   780
cgcggaatca gaacgtatga acagcgcact agaaatacgc ttgatatctc agctgtgccg   840
atcctgaagc aggaaactca ccttcctgta ttcgtggatc tcactcattc aaccggacgc   900
cgcgacctgc ttcttccgac agcaaaagca gcgcttcgca tcggagctga cggtgtcatg   960
gccgaggtcc atcctgatcc ttctgtcgcg ctttccgact cagctcagca aatggatatc  1020
ccgacatttg aaaatggtt aaatgaactg aagccgctcg ttcaagtaaa agcataattg  1080
aacactgaat taaagtacat gcttcaatcc gttctaaaag aagaattgag tccgatcaat  1140
cagcgccttg atggaatcga caagcgctta gacaaaatcg acgcacgtc gttgagata  1200
gacaagcgct tcgatgaagt ggacgcacgc ttcgttgaag tagataagcg ctttaacgca  1260
atcgacaagc gcttcaaaga aatagacggg cgcttaaaca aagtagaaaa ccgcttaaac  1320
gcaatggaca agcggctgaa tcggcttgaa acagatatag atgaactgaa agagggcag  1380
gagaggctcc cgaaaacgat catcgagaac atcggacaat ttacggagaa cattgtcgaa  1440
catgccgatg ataaggcggc tgccttgaat gacagggttt tagcgtcga aaccgcaata  1500
ca                                                                1502
```

| SEQ ID NO: 64 | moltype = AA length = 147 |
| --- | --- |
| FEATURE | Location/Qualifiers |
| source | 1..147 |
| | mol_type = protein |
| | organism = Bacillus licheniformis |

SEQUENCE: 64
```
MNTELKYMLQ SVLKEELSPI NQRLDGIDKR LDKIDARFVE IDKRFDEVDA RFVEVDKRFN    60
AIDKRFKEID GRLNKVENRL NAMDKRLNRL ETDIDELKRG QERLPKTIIE NIGQFTENIV   120
EHADDKAAAL NDRVFSVETA IQRIYRL                                       147
```

| SEQ ID NO: 65 | moltype = DNA length = 375 |
| --- | --- |
| FEATURE | Location/Qualifiers |
| source | 1..375 |
| | mol_type = other DNA |
| | organism = Bacillus licheniformis |

SEQUENCE: 65
```
atgaaactaa attatgattg tgtccgctca attcttctag aattagagga aaatttaact    60
```

-continued

```
cttaacgatg gcgtcacttt atatcagctc aaagattttg agacattcaa agagtatggc    120
tatgaaactt ccgtttacgc tttaaccaag ttaatcgaag ctgactttt  aaacggttcg    180
gtttcgcgcg cagacaataa gattgactat attggtgttg ctctattac  ttgggatgga    240
catcaatttt tagacaacat tcgtgacaat gctgtttggt ctaaaacgaa agatgccgtt    300
aagtcgttat caagcgtttc cttgtccata cttttcaaatg tcggagaaag catcacgaaa    360
aagcttatcg gttta                                                      375

SEQ ID NO: 66           moltype = AA  length = 124
FEATURE                 Location/Qualifiers
source                  1..124
                        mol_type = protein
                        organism = Bacillus licheniformis
SEQUENCE: 66
MKLNYDCVRS ILLELEENLT LNDGVTLYQL KDFETFKEYG YETSVYALTK LIEADFLNGS     60
VSRADNKIDY IGVGSITWDG HQFLDNIRDN AVWSKTKDAV KSLSSVSLSI LSNVGESITK    120
KLIG                                                                  124

SEQ ID NO: 67           moltype = DNA  length = 458
FEATURE                 Location/Qualifiers
source                  1..458
                        mol_type = other DNA
                        organism = Bacillus licheniformis
SEQUENCE: 67
atgatctctc aacaattaaa acagcaaaat cctgtacttg aaaactcaat gaatacgaat     60
ttgtcaaact ggttcatcct ttacacgaag cttcaccgtt tcactggta  cgtaaaaggg    120
ccgcagttct ttaccctaca tgaaaaattt gaagagctat acaaccatga gtcagaaaca    180
gcagatgtga tcgcggaacg cttgctggcc atcggcggac agccgctcgc cacaatgaaa    240
gaatacattg accacggcac aattgaggaa acggagccg  aaaaaacggc cgaagaaatg    300
gtttccgcac tggtaagcga ttaccgtcaa atccgcgatg aaattcagca taccatcgaa    360
cttgcggaag ataaatcaga tcattctacc gctgaccttt atatcgccct gacagaggaa    420
attgataagc agatttggat gctttcttca ttttttgga                            458

SEQ ID NO: 68           moltype = AA  length = 152
FEATURE                 Location/Qualifiers
source                  1..152
                        mol_type = protein
                        organism = Bacillus licheniformis
SEQUENCE: 68
MISQQLKQQN PVLENSMNTN LSNWFILYTK LHRFHWYVKG PQFFTLHEKF EELYNHASET     60
ADVIAERLLA IGGQPLATMK EYIDHGTIEE NGAEKTAEEM VSALVSDYRQ IRDEIQHTIE    120
LAEDKSDHST ADLYIALTEE IDKQIWMLSS FL                                   152

SEQ ID NO: 69           moltype = DNA  length = 373
FEATURE                 Location/Qualifiers
source                  1..373
                        mol_type = other DNA
                        organism = Bacillus licheniformis
SEQUENCE: 69
atgaatgaga agatttttaat cgtagacgac cagtacggga ttcgggttct gctgaatgaa     60
gttttcaata agaagggta  caaaaccttc caggccgcaa acgggattca agcgcttgac    120
attgtgaaaa accagcgccc cgacctcgtt ctgctcgata tgaaaatccc cggaatgac     180
ggaattgaaa ttttaaaaag aatgaagatc atagacgagg ggatccgcgt catcatcatg    240
acggcctacg gagagctcga catgatccag gaatcgaagg agctcggagc cctgacacac    300
tttgctaagc cttttgacat cgacgaaatc cgcgatgccg tcaaaacgta tctgcccata    360
aagtccaacg gat                                                        373

SEQ ID NO: 70           moltype = AA  length = 122
FEATURE                 Location/Qualifiers
source                  1..122
                        mol_type = protein
                        organism = Bacillus licheniformis
SEQUENCE: 70
MNEKILIVDD QYGIRVLLNE VFNKEGYKTF QAANGIQALD IVKNQRPDLV LLDMKIPGMD     60
GIEILKRMKI IDEGIRVIIM TAYGELDMIQ ESKELGALTH FAKPFDIDEI RDAVKTYLPI    120
KS                                                                    122

SEQ ID NO: 71           moltype = DNA  length = 523
FEATURE                 Location/Qualifiers
source                  1..523
                        mol_type = other DNA
                        organism = Bacillus licheniformis
SEQUENCE: 71
ttgcttaaaa ttttcaccac tcaattgacg ggaatcttca accggattca agagggcgag     60
gcccaatcga tagaggcgg  cgcccgcttg ttggctcagg cggtcatcag tgatcattcg    120
gtttatgtat acggaaaaaa tgaattgaa  ggcattttga agaagcgat  gtacagttct    180
gaaccgttcc cctcagtcaa accgctgcag aaggacgaag aaaaactggcc cgattttgaa    240
atgacgggca aagtgctgat gttctgcgcc ggttcagcgg atgacgaaga actgaaaatg    300
gcggaaaaac tgtatgaaaa aggaatcgga cttgttgtcg tctcccccttc gggaaaagac    360
ggcgtcccga tcgcatcctt cgccgatgtc catatcgatt caaagctgag aatgccgctt    420
```

```
cttcccgatg aagacggaac aaggtacgga tttccgtccc tgatggtcag cctctatatt    480
tatcatgccc tatcctttac attaaaggaa atcctccagg aat                      523

SEQ ID NO: 72              moltype = AA  length = 174
FEATURE                    Location/Qualifiers
source                     1..174
                           mol_type = protein
                           organism = Bacillus licheniformis
SEQUENCE: 72
MLKIFTTQLT GIFNRIQEGE AQSIEDGARL LAQAVISDHS VYVYGKNELE GILKEAMYSS     60
EPFPSVKPLQ KDEENWPDFE MTDKVLMFCA GSADDEELKM AEKLYEKGIG LVVVSPSGKD    120
GVPIASFADV HIDSKLRMPL LPDEDGTRYG FPSLMVSLYI YHALSFTLKE ILQE          174

SEQ ID NO: 73              moltype = DNA  length = 266
FEATURE                    Location/Qualifiers
source                     1..266
                           mol_type = other DNA
                           organism = Bacillus licheniformis
SEQUENCE: 73
atgagcaaaa cgattaaact taaccatgca gcggttatga agaagctgga acaagtaagc     60
agcacgcttc aagccgtatc tttaaaaagc ccgccagccg gagcgctcgg gcggaacaac    120
cttgatttta cgaaaaagtg gcttgaacga gaagccgaaa tttgcaatat ggtcaaacag    180
tataagagg ctgttcgtaa aaacattgag gacacccgct caaatgtgga cacgctgaag     240
gaacaggatg aggcgattgc ccgaag                                         266

SEQ ID NO: 74              moltype = AA  length = 88
FEATURE                    Location/Qualifiers
source                     1..88
                           mol_type = protein
                           organism = Bacillus licheniformis
SEQUENCE: 74
MSKTIKLNHA AVMKKLEQVS STLQAVSLKS PPAGALGRNN LDFTKKWLER EAEICNMVKQ     60
YKEAVRKNIE DTRSNVDTLK EQDEAIAR                                        88

SEQ ID NO: 75              moltype = DNA  length = 1396
FEATURE                    Location/Qualifiers
source                     1..1396
                           mol_type = other DNA
                           organism = Bacillus licheniformis
SEQUENCE: 75
atgaaaatata aaacattagc tcaatttccg aaagattttt tgtggggcgc gtctacttcc     60
gcttatcaag tggaaggcgc ttgggacgaa gatggaaaag ggccttctgt catcgatgcg    120
cgcgaaagct acccggaagg gacaaccgat tttaaagtcg caagcgacca ttaccagcgc    180
tataaagaag atatcgcttt atttgcgaa atgggcttca aagcgtaccg ttttcgatt      240
gcctggacgc gcatcattcc ggacggggac ggtgatatta tccgaagg aatcgaattt      300
tacagccgtt tgatcgatga acttctaaag tatgaatcg aaccaattgt tacgatgtac     360
cactttgatc tgccgaatgc tttgcagaaa aaaggcggtt ggtcggacag ggccacgatt    420
gatgcttttg aaaagtatgc gaaggtcctt tttgaaagct acggtgaccg cgtcaaatac    480
tggctgacca tcaatgagca aaatatgatg atcctccacg gatctgcact cggtacactc    540
gatccgaact tggaaaatcc gaaaaaagag ctttatcagc aaaaccatca catgctcgtc    600
gcacaggcga aagcgatcaa gctttgccat gagatgctga cggaagcaaa aatcggtcct    660
gcgccgaata ttgcgctcat ctatcccgct tcttcgaaac cggaggacgt gctggcggct    720
tttaactata atgcgatccg aaactggctt tacttggata tggccgtatt cggacggtac    780
aatacaacg cgtgggcata tatgaaagaa aaaggctgca caccggtcat cgctgaaggg    840
gatatggaca ttctgcggtc ggccaagccg gattttatcg cgtttaacta tatacatcg    900
caaacggctg aagcaagcag gggtgatggc agcgacacg ctgctcgagg cggagaccag    960
catttgcaga cggaagaaga aggcgtatat aggggaagca gcaatccgca cctaaagaaa   1020
aacgcatttg gctgggagat cgaccctgtc ggtttccgtt cgacgctgcg cgaaatttac   1080
gaccgctacc agctgccgct gatcgtcact gagaacggcc tcggcgcgtt tgatcagctg   1140
gaagacggag atgtcgtaaa tgacgattac cgcatcgatt atttaaaaga gcatatcaag   1200
caaattcagc tggcaatcac ggatggagtc gatgtttcg gctactcccc atggtctgcc   1260
atcgacttaa tttcgaccca tcaaggctgt caaaacgct acggatttat ttatgtgaac    1320
cgcgatgaat ttgatttgaa agacttgcgc gcattcgca aaaaagcttt tactggtat    1380
aaaaaacctga ttgcta                                                  1396

SEQ ID NO: 76              moltype = AA  length = 465
FEATURE                    Location/Qualifiers
source                     1..465
                           mol_type = protein
                           organism = Bacillus licheniformis
SEQUENCE: 76
MKYKTLAQFP KDFLWGASTS AYQVEGAWDE DGKGPSVIDA RESYPEGTTD FKVASDHYQR     60
YKEDIALFAE MGFKAYRFSI AWTRIIPDGD GDINPKGIEF YSRLIDELLK YGIEPIVTMY    120
HFDLPNALQK KGGWSDRATI DAFEKYAKVL FESYGDRVKY WLTINEQNMM ILHGSALGTL    180
DPNLENPKKE LYQQNHHMLV AQAKAIKLCH EMLPEAKIGP APNIALIYPA SSKPEDVLAA    240
FNYNAIRNWL YLDMAVFGRY NTTAWAYMKE KGCTPVIAEG DMDILRSAKP DPIAFNYYTS    300
QTAEASRGDG SDTAARGGDQ HLQTEEGVY RGSSNPHLKK NAFGWEIDPV GFRSTLREIY     360
DRYQLPLIVT ENGLGAFDQL EDGDVVNDDY RIDYLKEHIK QIQLAITDGV DVFGYSPWSA    420
IDLISTHQGC SKRYGFIYVN RDEFDLKDLR RIRKKSFYWY KNLIA                    465
```

| SEQ ID NO: 77 | moltype = DNA length = 1830 |
| --- | --- |
| FEATURE | Location/Qualifiers |
| source | 1..1830 |
| | mol_type = other DNA |
| | organism = Bacillus licheniformis |

SEQUENCE: 77

```
atgaatgttc aatcaatggc aaaagaaatt ctggcgcgcg tcggcgggga gaagaacgtt    60
gtatcgctag tccattgcgc gacaaggctc cgcttcaaac tgaaagaccg ttccaaagca   120
gacagagaag cgcttgaaaa tacggcggc gtggtaaccg tggtggagac cggcgggcaa   180
tttcaagtcg ttatcggcaa taacgttcct gaagtatata agaaatcgg ccggatctct   240
caactgttgg aaagttctgc ggccgatcac agtcaaaaag agaaggaag cctcgccggt   300
agattagtag atgtcgtatc cagcattttc actccgctgc tcggcgtcat ggcgggagcg   360
gggatttaa aaggcctgct tttgatttgc acaaacgcg gctggctctc gccggaagag   420
acgacatata cgattctata cgcggcagcc gacagcctgt tttatttcct gcctttgctg   480
ctcgccgtta cggccgccaa aaattcgga gcgaacccgt tcatagcgct gacgattgcc   540
ggagcgctga tctatccgac gatactcgaa ctgaaaaaca gcggcgccca tacggagttt   600
ttcggcattc cggtcgtctt gatgaattat acgtcgacgg ttatcccgat tatccttgcg   660
gtatttgtga tgagctatct gaaagatta tgtatgcgct ttattcatga aagcgtgaag   720
aacttatca cccctttatt atgcctgacg tgatggtgc cgttaacttt gatcgtattc   780
ggaccgctcg gcgtttacac aggaaacggg atcgcgcgg cgattctgtc cgttttgat   840
ttcagcccga ttctggcagg agcgattatt gcggcttat ggcaaatcct tgtcatcttc   900
gggattcact gggggatcgt ccctgtcatt ttgaacaaca ttgccgtcca cggcaaggac   960
tacattaagc cggcgacggc agccgccgtg tttgcccaaa caggagccgc atttggcgtc  1020
atgctgaaga cgaaaaacaa gaagctgaaa gcattggcag gatcagctgc cgttaccggg  1080
atattcggga ttacagagcc ggcgtctac ggggtgacag tcaggctgaa aaagccgttc  1140
gtatgcggtg tcatcagcgc ggcggcaggc ggagccatta tcggatactc cggcagcgtc  1200
gccctcgctt ccggcgctcc gggcttgttg acgattccga ttttttacgg accgggcttt  1260
ctcggcttca tcatcggcat ttcagttca tttgttttat cgattttgct cacttacatt  1320
gtcggcttg tcgaccctgt ggaggtgaca aagaggagc ctgttgaaaa aagcgccggt  1380
gaaccgattt acagcccttt gcaaggagaa gtcctgccgt taacagaagt atcagataaa  1440
gtgttcgcat cgggggcgct tggagaggga tcgcggtgg ttccgtcaaa aggcgttgtc  1500
accgccctg cggacggcat cgtgacaacg gcatttccga cgggtcacgc atacggcata  1560
acgaccgaaa gcggagccga tattttgatt catattggaa tggacacagt caggctcgaa  1620
ggaaagcact tcaatcctaa agccgtgcag gggcaaaatg tgaaacgggg tgatatactc  1680
gcagaattcg atctggacgc tttgaaagaa gaagggttg acgtgaaaac gccgatcatc  1740
gttacaaatt ccggtcaata cacggatgtc attccaacgg atcaaaaaaa ggtgaaaact  1800
gaagaacgga tcatcacttt aatttcatca                                    1830
```

| SEQ ID NO: 78 | moltype = AA length = 609 |
| --- | --- |
| FEATURE | Location/Qualifiers |
| source | 1..609 |
| | mol_type = protein |
| | organism = Bacillus licheniformis |

SEQUENCE: 78

```
MNVQSMAKEI LARVGGEKNV VSLVHCATRL RFKLKDRSKA DREALENTDG VVTVVESGGQ    60
FQVVIGNNVP EVYKEIGRIS QLLESSAADH SQKEKGSLAG RLVDVVSSIF TPLLGVMAGA   120
GILKGLLLIC TNAGWLSPEE TTYTILYAAA DSLFYFLPLL LAVTAAKKFG ANPFIALTIA   180
GALIYPTILE LKNSGAHTEF FGIPVVLMNY TSTVIPIILA VFVMSYLERL CMRFIHESVK   240
NFITPLLCLT VMVPLTLIVF GPLGVYTGNG IAAAILSVFD FSPILAGAII AALWQILVIF   300
GIHWGIVPVI LNNIAVHGKD YIKPATAAAV FAQTGAAFGV MLKTKNKKLK ALAGSAAVTG   360
IFGITEPAVY GVTLRLKKPF VCGVISAAG GAIIGYSGSV ALASGAPGLL TIPIFYGPGF   420
LGFIIGISVS FVLSILLTYI VGFDDPVEVT KEEPVEKSAG EPIYSPLQGE VLPLTEVSDK   480
VFASGALGEG IAVVPSKGVV TAPADGIVTT AFPTGHAYGI TTESGAEILI HIGMDTVRLE   540
GKHFNPKAVQ GQNVKRGDIL AEFDLDALKE EGFDVKTPII VTNSGQYTDV IPTDQKKVKT   600
EERIITLIS                                                            609
```

| SEQ ID NO: 79 | moltype = DNA length = 821 |
| --- | --- |
| FEATURE | Location/Qualifiers |
| source | 1..821 |
| | mol_type = other DNA |
| | organism = Bacillus licheniformis |

SEQUENCE: 79

```
gtgaaaattg ccaaagtgat caacaacaat gtgatcagtg ttttaaatga acagggtcag    60
gaattagtgg tcatgggcag gggaatcgct tttcaaaaaa agcctggcga agcggtggat   120
gaatcgagaa tcgagaagat tttcaggctt gataataaag atgtatcaga aaggtttaag   180
acgctgttga cgaaattcc aattgaattt atggaaatgt ctgaagaaat tatctccat    240
gcgaaattaa agctcggcaa aaagtcgaat gacagcattt atgtctcgct gaccgaccat   300
attcatttcg ccgtcgaacg gcataaaaag ggactggata taaaaatgc cctgctttgg   360
gagacgaaac ggctgtataa agatgagttc gccatcggca agaggcgct ggccatcatt   420
gaaaagaaga cggggacagc tcttccggag gatgaagccg cctttatcgc gctccatatc   480
gtaaacgccg agctgaatga agaaatgccg aacatcgtca atattacgaa agtcatgcag   540
gagatttaa gcatcgtcaa gtatcacttt catatcgaat ttgacgaaga atcgcttcac   600
tattaccgct tcattaccca tttgaaattt tccgcccaag gctgttcag cggaacctat   660
atggaaagcc gggacgactt tttatttgaa accgtcaaaa ataagtaccg ggacgcttat   720
gtttgtacaa ataaaatcag gcagtatatc gaaaaagaat acggtcatca gctgacaaac   780
gaagagcttg tgtatttgac gattcatatc gagcgagtcg t                       821
```

| SEQ ID NO: 80 | moltype = AA length = 273 |
| --- | --- |

| FEATURE | Location/Qualifiers |
|---|---|
| source | 1..273<br>mol_type = protein<br>organism = Bacillus licheniformis |

SEQUENCE: 80

```
MKIAKVINNN VISVLNEQGQ ELVVMGRGIA FQKKPGEAVD ESRIEKIFRL DNKDVSERFK   60
TLLDEIPIEF MEMSEEIISY AKLKLGKKLN DSIYVSLTDH IHFAVERHKK GLDIKNALLW  120
ETKRLYKDEF AIGKEALAII EKKTGTALPE DEAAFIALHI VNAELNEEMP NIVNITKVMQ  180
EILSIVKYHF HIEFDEESLH YYRFITHLKF FAQRLFSGTY MESRDDFLFE TVKNKYRDAY  240
VCTNKIRQYI EKEYGHQLTN EELLYLTIHI ERV                               273
```

| SEQ ID NO: 81 | moltype = DNA   length = 1387 |
|---|---|
| FEATURE | Location/Qualifiers |
| source | 1..1387<br>mol_type = other DNA<br>organism = Bacillus licheniformis |

SEQUENCE: 81

```
atgactgaac aaacgaaaaa gtttcctgaa ggttttttat ggggcggagc ggttgccgca    60
aaccaagtgg aagcgcccta taatgtcggc gggaaaggac tctcgacagc cgatgtgtcg   120
ccgaacggcg tcatgtatcc attcgatgag tcgatggagt cattgaacct gtatcatgaa   180
ggcatcgatt tttaccaccg ctacaaagaa gatatcgctc ttttcgccga atgggattt    240
aaagcattcc ggacatcgat tgcctggacg cggattttca ctaacggcga tgaaactgaa   300
ccgaatgaag agggactcga attttatgat cgcctctttg acgagctatt aaaatacaat   360
attgagccag tggtgacgat ttcccactac gaaatgccgc tcggtctgat taaaaaatac   420
ggcggctgga aaaccggaa agtgatcgat tgctatgagc attatgcgaa aacggtttc    480
acccgctata aagaaaaagt aaaatactgg atgacattca atgaaatcaa catggttctg   540
catgcgccgt ttacaggcgg aggccttgtg tttgaagaag gcgaaaacaa gttaaatgcc   600
atgtaccaag cggcgcatca tctatttgtc gcaagcgctc ttgccgttaa agcggggcac   660
gacatcattc cggacgctaa aatcggctgc atgatcgccg caacgacgac atacccgatg   720
acgccaaagc cggaagacgt gctcgctgcg atggagaatg agagaagaac gctgttttc    780
tcggatgtac aggcgcgcgg ggcttatccg ggctatatga agcgcttctt taaggaaaac   840
ggaattacga ttgaaatggc tgaaggtgat gaagacatct taaaggaaaa caccgtcgac   900
tatatccggtt tcagctacta catgtcaatg gtcgcaagca cgagtccgga agacttggca   960
aaaacggaag gcaacctgct cggcggcgtc aaaaatccgt accttgaatc gtccgaatgg  1020
ggctggcaga tcgatcctaa agggatccgc attacgctga atacattgta cgaccgctat  1080
caaaagccgc ttttcattgt tgaaaacggg ctcggcgccg tcgatgtcgt cgaagaagac  1140
ggctccatcc aggatgacta cagaatcaac tatttgcgcg atcatttaaa agaagtaaga  1200
gaagccattg cagacggcgt cgacttaatc ggctacacat catggggccc gatcgacctg  1260
gtcagcgcat ccaccgccga aatgaaaaag cgctacggct atatttacgt cgatcgtgac  1320
aatgaaggaa aaggcacgct ttcaagaacg agaaagaaaa gcttttactg gtataagaaa  1380
gtaatcg                                                             1387
```

| SEQ ID NO: 82 | moltype = AA   length = 462 |
|---|---|
| FEATURE | Location/Qualifiers |
| source | 1..462<br>mol_type = protein<br>organism = Bacillus licheniformis |

SEQUENCE: 82

```
MTEQTKKFPE GFLWGGAVAA NQVEGAYNVG GKGLSTADVS PNGVMYPFDE SMESLNLYHE   60
GIDFYHRYKE DIALFAEMGF KAFRTSIAWT RIFPNGDETE PNEEGLEFYD RLFDELLKYN  120
IEPVVTISHY EMPLGLIKKY GGWKNRKVID CYEHYAKTVF TRYKEKVKYW MTFNEINMVL  180
HAPFTGGGLV FEEGENKLNA MYQAAHHLFV ASALAVKAGH DIIPDAKIGC MIAATTYPM   240
TPKPEDVLAA MENERRTLFF SDVQARGAYP GYMKRFFKEN GITIEMAEGD EDILKENTVD  300
YIGFSYYMSM VASTSPEDLA KTEGNLLGGV KNPYLESSEW GWQIDPKGIR ITLNTLYDRY  360
QKPLFIVENG LGAVDVVEED GSIQDDYRIN YLRDHLKEVR EAIADGVDLI GYTSWGPIDL  420
VSASTAEMKK RYGYIYVDRD NEGKGTLSRT RKKSFYWYKK VI                      462
```

| SEQ ID NO: 83 | moltype = DNA   length = 1820 |
|---|---|
| FEATURE | Location/Qualifiers |
| source | 1..1820<br>mol_type = other DNA<br>organism = Bacillus licheniformis |

SEQUENCE: 83

```
atggattata ataaagtatc gaaggacatt ttacaactcg tggcggtga agagaacgta      60
cagagcgtga ttcactgcat gacaagactg cgtttcaatc tttatgacaa tgcgaaggca   120
gaccgcgcga aactgaaag tcttccggct gtaatgggca ccaacatcag cggccagcag    180
tttcaaatca tcattggaaa tgatgtccct aaggtgtata aagcgatcat tgccaacagc   240
gggctcagcg atgaaaaagc gggcgagcag caagctggca aaaagaaaaa cgtgctgagcg   300
gccattttg atgtgatatc aggcgtattt acgccgtatt tcgccggagcg   360
ggtatgatca aggggatcat tgcaatcgcc gtcacgttcg gctggatgag cgaaactagc   420
caggtccaca ccatttttatc cgccatcggc gacggagcat tttacttcct gccgattttg   480
ctggcggtca gtgccgcgag aaaattcggc agtaatcctt atgttgcggc ggcgatcgga   540
gcggcgattc tgcatcccga tctgacagcg cttctcggtt cagggaaaag catttccttt   600
gtcggattca gtgtaaccgc tgcccattat tcgtcgacg tcattccgat cctgctccgg   660
atttggattg catcttacgt tgagaaatgg attgacaaag tcaccccgac ttcgttgaag   720
atgatttttg taccgacgct gacgctgctg gttgtcgtgc ctgtcacatt aattacggtc   780
ggtccgctcg gtgcgattgc agggaactat ctgtcaatcg gtgtgaacgg tttatttgaa   840
aatgccggtt taatcacgat gatcctttta gcaggaacgt tctcgctgat cgtcatgaca   900
ggaatgcact atgctttcat tccggttatg ttcaacaaca ttacgcaaaa cggctacgat   960
```

```
tacttgatac ctgcgatgtt cttggcgaat atggggcagg ctggcgcgtc atttgccgtc   1020
ttcctgcgat ccagaaataa gaaattcaaa tcattgtcgc tgacgacaag catcacggct   1080
ttgatgggga ttacagagcc ggcgatgtac ggtgtcaaca tgaggctgaa aaagccgttt   1140
gtatccgcgc ttctcggcgc cgctgtcgga ggagcatttt acggcatcac cggcgtagca   1200
gcatatatta ttggcggaaa cgtcggtttg ccgggaatta cgacgtttat cggcccgact   1260
tttatacagg caatgatcgg tatcgtcatc gcgttcttg ccgcaacggc gtttgctttt   1320
gtattgggt tgaagacat tccttcagat gaagccgctg aacaaggagc cgctccatct   1380
gaagcgggcg cggagagat cattcaaagc ccgctgaaag gcgaagtcaa agcattgagt   1440
gaagtggatg atgcgacatt ttctggagaa gtcatgggaa aaggcgtcgc cattgagcgc   1500
gaagaaggca aagtggtgtc gccggatca ggcacgatca caaccgtttt tcaaacgaag   1560
cacgccctcg gcattacaag cgacaatggg gcggaaatta ttatccatat cggaatcgac   1620
acggtgaaat tgaacggcga gcactttacc gtgcatgtca taaaggcga cgctgtaaaa   1680
ccgggagacg agcttgtctc atttgatatg gatgcgatta aggatgcagg ctatcagttg   1740
atcacgccgg ttatcatcac aaatacggac cggtaccagt cgatcaaacc tttgaaatca   1800
gatgaaagcg ttgacattga                                              1820

SEQ ID NO: 84              moltype = AA  length = 604
FEATURE                    Location/Qualifiers
source                     1..604
                           mol_type = protein
                           organism = Bacillus licheniformis
SEQUENCE: 84
MDYNKVSKDI LQLVGGEENV QSVIHCMTRL RFNLYDNAKA DRAKLESLPA VMGTNISGQQ    60
FQIIIGNDVP KVYKAIIANS GLSDEKAGEQ QAGKKKNVLS AIFDVISGVF TPILPAIAGA   120
GMIKGIIAIA VTFGWMSETS QVHTILSAIG DGAFYFLPIL LAVSAARKFG SNPYVAAAIG   180
AAILHPDLTA LLGSGKSISF VGLPVTAATY SSTVIPILLA IWIASYVEKW IDKVTPTSLK   240
MIFVPTLTLL VVVPVTLITV GPLGAIAGNY LSIGVNGLFE NAGLITMILL AGTFSLIVMT   300
GMHYAFIPVM FNNITQNGYD YLIPAMFLAN MGQAGASFAV FLRSRNKKFK SLSLTTSITA   360
LMGITEPAMY GVNMRLKKPF VSALLGAAVG GAFYGITGVA AYIIGGNVGL PGITTFIGPT   420
FIQAMIGIVI AFFAATAFAF VLGFEDIPSD EAAEQGAAPS EAGAGEIIQS PLKGEVKALS   480
EVDDATFSGE VMGKGVAIEP EEGKVVSPVS GTITTVFQTK HALGITSDNG AEIIIHIGID   540
TVKLNGEHFT VHVNKGDAVK PGDELVSFDM DAIKDAGYQL ITPVIITNTD RYQSIKPLKS   600
DESV                                                                604

SEQ ID NO: 85              moltype = DNA  length = 570
FEATURE                    Location/Qualifiers
source                     1..570
                           mol_type = other DNA
                           organism = Bacillus licheniformis
SEQUENCE: 85
atgagcacag aggatatgac aaaggatacg tatgaagtaa acagttcgac aatggctgtc    60
ctgcctctgg gagaggggga gaaacccgcc tcaaaaatac ttgagaccga caggactttc   120
cgcgtcaata tgaagccgtt tcaaattatc gaaagaagct gccgctattt cggatcgagc   180
tatgcgggaa gaaaagcggg cacatatgaa gtcattaaag tttcccataa accgccgatc   240
atggtggatc actcaaacaa cattttttctt ttccccacat tttcctcaac tcgtcctcag   300
tgcgggtggc tttcccatgc gcatgttcac gagttttgcg cggcaaagta tgacaacacg   360
tttgtcacgt ttgtcaacgg ggaaacgctg gagctgcccg tatccatctc atcttttcgaa   420
aaccaggttt accgaacggc atggctgaga acaaaattta cgacaggat tgaaggaaac   480
cccatgcaga gaaacagga atttatgctc tatccgaaag aagaccggaa tcagctgata   540
tacgaattca tcctcaggga gctgaaaaag                                    570

SEQ ID NO: 86              moltype = AA  length = 189
FEATURE                    Location/Qualifiers
source                     1..189
                           mol_type = protein
                           organism = Bacillus licheniformis
SEQUENCE: 86
MSTEDMTKDT YEVNSSTMAV LPLGEGEKPA SKILETDRTF RVNMKPFQII ERSCRYFGSS    60
YAGRKAGTYE VIKVSHKPPI MVDHSNNIFL FPTFSSTRPQ CGWLSHAHVH EFCAAKYDNT   120
FVTFVNGETL ELPVSISSFE NQVYRTAWLR TKFIDRIEGN PMQKKQEFML YPKEDRNQLI   180
YEFILRELK                                                           189

SEQ ID NO: 87              moltype = DNA  length = 36
FEATURE                    Location/Qualifiers
source                     1..36
                           mol_type = other DNA
                           organism = Bacillus licheniformis
SEQUENCE: 87
gccgcagcca tttccagagc cgcagccatt tccaga                              36

SEQ ID NO: 88              moltype = AA  length = 1368
FEATURE                    Location/Qualifiers
source                     1..1368
                           mol_type = protein
                           organism = Streptococcus pyogenes
SEQUENCE: 88
MDKKYSIGLD IGTNSVGWAV ITDEYKVPSK KFKVLGNTDR HSIKKNLIGA LLFDSGETAE    60
ATRLKRTARR RYTRRKNRIC YLQEIFSNEM AKVDDSFFHR LEESFLVEED KKHERHPIFG   120
NIVDEVAYHE KYPTIYHLRK KLVDSTDKAD LRLIYLALAH MIKFRGHFLI EGDLNPDNSD   180
```

```
VDKLFIQLVQ  TYNQLFEENP  INASGVDAKA  ILSARLSKSR  RLENLIAQLP  GEKKNGLFGN   240
LIALSLGLTP  NFKSNFDLAE  DAKLQLSKDT  YDDDLDNLLA  QIGDQYADLF  LAAKNLSDAI   300
LLSDILRVNT  EITKAPLSAS  MIKRYDEHHQ  DLTLLKALVR  QQLPEKYKEI  FFDQSKNGYA   360
GYIDGGASQE  EFYKFIKPIL  EKMDGTEELL  VKLNREDLLR  KQRTFDNGSI  PHQIHLGELH   420
AILRRQEDFY  PFLKDNREKI  EKILTFRIPY  YVGPLARGNS  RFAWMTRKSE  ETITPWNFEE   480
VVDKGASAQS  FIERMTNFDK  NLPNEKVLPK  HSLLYEYFTV  YNELTKVKYV  TEGMRKPAFL   540
SGEQKKAIVD  LLFKTNRKVT  VKQLKEDYFK  KIECFDSVEI  SGVEDRFNAS  LGTYHDLLKI   600
IKDKDFLDNE  ENEDILEDIV  LTLTLFEDRE  MIEERLKTYA  HLFDDKVMKQ  LKRRRYTGWG   660
RLSRKLINGI  RDKQSGKTIL  DFLKSDGFAN  RNFMQLIHDD  SLTFKEDIQK  AQVSGQGDSL   720
HEHIANLAGS  PAIKKGILQT  VKVVDELVKV  MGRHKPENIV  IEMARENQTT  QKGQKNSRER   780
MKRIEEGIKE  LGSQILKEHP  VENTQLQNEK  LYLYYLQNGR  DMYVDQELDI  NRLSDYDVDH   840
IVPQSFLKDD  SIDNKVLTRS  DKNRGKSDNV  PSEEVVKKMK  NYWRQLLNAK  LITQRKFDNL   900
TKAERGGLSE  LDKAGFIKRQ  LVETRQITKH  VAQILDSRMN  TKYDENDKLI  REVKVITLKS   960
KLVSDFRKDF  QFYKVREINN  YHHAHDAYLN  AVVGTALIKK  YPKLESEFVY  GDYKVYDVRK  1020
MIAKSEQEIG  KATAKYFFYS  NIMNFFKTEI  TLANGEIRKR  PLIETNGETG  EIVWDKGRDF  1080
ATVRKVLSMP  QVNIVKKTEV  QTGGFSKESI  LPKRNSDKLI  ARKKDWDPKK  YGGFDSPTVA  1140
YSVLVVAKVE  KGKSKKLKSV  KELLGITIME  RSSFEKNPID  FLEAKGYKEV  KKDLIIKLPK  1200
YSLFELENGR  KRMLASAGEL  QKGNELALPS  KYVNFLYLAS  HYEKLKGSPE  DNEQKQLFVE  1260
QHKHYLDEII  EQISEFSKRV  ILADANLDKV  LSAYNKHRDK  PIREQAENII  HLFTLTNLGA  1320
PAAFKYFDTT  IDRKRYTSTK  EVLDATLIHQ  SITGLYETRI  DLSQLGGD                1368

SEQ ID NO: 89              moltype = AA   length = 1307
FEATURE                    Location/Qualifiers
source                     1..1307
                           mol_type = protein
                           organism = Acidomiococcus sp.
SEQUENCE: 89
MTQFEGFTNL  YQVSKTLRFE  LIPQGKTLKH  IQEQGFIEED  KARNDHYKEL  KPIIDRIYKT    60
YADQCLQLVQ  LDWENLSAAI  DSYRKEKTEE  TRNALIEEQA  TYRNAIHDYF  IGRTDNLTDA   120
INKRHAEIYK  GLFKAELFNG  KVLKQLGTVT  TTEHENALLR  SFDKFTTYFS  GFYENRKNVF   180
SAEDISTAIP  HRIVQDNFPK  FKENCHIFTR  LITAVPSLRE  HFENVKKAIG  IFVSTSIEEV   240
FSFPFYNQLL  TQTQIDLYNQ  LLGGISREAG  TEKIKGLNEV  LNLAIQKNDE  TAHIIASLPH   300
RFIPLFKQIL  SDRNTLSFIL  EEFKSDEEVI  QSFCKYKTLL  RNENVLETAE  ALFNELNSID   360
LTHIFISHKK  LETISSALCD  HWDTLRNALY  ERRISELSAH  ITKSAKEKVQ  RSLKHEDINL   420
QEIISAAGKE  LSEAFKQKTS  EILSHAHAAL  DQPLPTTLKK  QEEKEILKSQ  LDSLLGLYHL   480
LDWFAVDESN  EVDPEFSARL  TGIKLEMEPS  LSFYNKARNY  ATKKPYSVEK  FKLNFQMPTL   540
ASGWDVNKEK  NNGAILFVKN  GLYYLGIMPK  QKGRYKALSF  EPTEKTSEGF  DKMYYDYFPD   600
AAKMIPKCST  QLKAVTAHFQ  THTTPILLSN  NFIEPLEITK  EIYDLNNPEK  EPKKFQTAYA   660
KKTGDQKGYR  EALCKWIDFT  RDFLSKYTKT  TSIDLSSLRP  SSQYKDLGEY  YAELNPLLYH   720
ISFQRIAEKE  IMDAVETGKL  YLFQIYNKDF  AKGHHGKPNL  HTLYWTGLFS  PENLAKTSIK   780
LNGQAELFYR  PKSRMKRMAH  RLGEKMLNKK  LKDQKTPIPD  TLYQELYDYV  NHRLSHDLSD   840
EARALLPNVI  TKEVSHEIIK  DRRFTSDKFF  FHVPITLNYQ  AANSPSKFNQ  RVNAYLKEHP   900
ETPIIGIDRG  ERNLIYITVI  DSTGKILEQR  SLNTIQQFDY  QKKLDNREKE  RVAARQAWSV   960
VGTIKDLKQG  YLSQVIHEIV  DLMIHYQAVV  VLENLNFGFK  SKRTGIAEKA  VYQQFEKMLI  1020
DKLNCLVLKD  YPAEKVGGVL  NPYQLTDQFT  SFAKMGTQSG  FLFYVPAPYT  SKIDPLTGFV  1080
DPFVWKTIKN  HESRKHFLEG  FDFLHYDVKT  GDFILHFKMN  RNLSFQRGLP  GFMPAWDIVF  1140
EKNETQFDAK  GTPFIAGKRI  VPVIENHRFT  GRYRDLYPAN  ELIALLEEKG  IVFRDGSNIL  1200
PKLLENDDSH  AIDTMVALIR  SVLQMRNSNA  ATGEDYINSP  VRDLNGVCFD  SRFQNPEWPM  1260
DADANGAYHI  ALKGQLLLNH  LKESKDLKLQ  NGISNQDWLA  YIQELRN                 1307

SEQ ID NO: 90              moltype = AA   length = 887
FEATURE                    Location/Qualifiers
source                     1..887
                           mol_type = protein
                           organism = N. gregoryi
SEQUENCE: 90
MTVIDLDSTT  TADELTSGHT  YDISVTLTGV  YDNTDEQHPR  MSLAFEQDNG  ERRYITLWKN    60
TTPKDVFTYD  YATGSTYIFT  NIDYEVKDGY  ENLTATYQTT  VENATAQEVG  TTDEDETFAG   120
GEPLDHHLDD  ALNETPDDAE  TESDSGHVMT  SFASRDQLYA  WTLHTYTLTA  TDGAKTDTEY   180
ARRTLAYTVR  QELYTDHDAA  PVATDGLMLL  TPEPLGETPL  DLDCGVRVEA  DETRTLDYTT   240
AKDRLLAREL  VEEGLKRSLW  DDYLVRGIDE  VLSKEPVLTC  DEFDLHERYD  LSVEVGHSGR   300
AYLHINFRHR  FVPKLTLADI  DDDNIYPGLR  VKTTYRPRRG  HIVWGLRDEC  ATDSLNTLGN   360
QSVVAYHRNN  QTPINTDLLD  AIEAADRRVV  ETRRQGHGDD  AVSFPQELLA  VEPNTHQIKQ   420
FASDGFHQQA  RSKTRLSASR  CSEKAQAFAE  RLDPVRLNGS  TVEFSSEFFT  GNNEQQLRLL   480
YENGESVLTF  RDGARGAHPD  ETFSKGIVNP  PESFEVAVVL  PEQQADTCKA  QWDTMADLLN   540
QAGAPPTRSE  TVQYDAFSSP  ESISLNVAGA  IDPSEVDAAF  VVLPPDQEGF  ADLASPTETY   600
DELKKALANM  GIYSQMAYFD  RFRDAKIFYT  RNVALGLLAA  AGGVAFTTEH  AMPGDADMFI   660
GIDVSRSYPE  DGASGQINIA  ATATAVYKDG  TILGHSSTRP  QLGEKLQSTD  VRDIMKNAIL   720
GYQQVTGESP  THIVIHRDGF  MNEDLDPATE  FLNEQGVEYD  IVEIRKQPQT  RLLAVSDVQY   780
DTPVKSIAAI  NQNEPRATVA  TFGAPEYLAT  RDGGGLPRPI  QIERVAGETD  IETLTRQVYL   840
LSQSHIQVHN  STARLPITTA  YADQASTHAT  KGYLVQTGAF  ESNVGFL                  887

SEQ ID NO: 91              moltype = DNA   length = 12203
FEATURE                    Location/Qualifiers
source                     1..12203
                           mol_type = other DNA
                           organism = Streptococcus pyogenes
SEQUENCE: 91
atggataaga  aatactcaat  aggcttagat  atcggcacaa  atagcgtcgg  atgggcggtg    60
```

```
atcactgatg aatataaggt tccgtctaaa aagttcaagg ttctgggaaa tacagaccgc    120
cacagtatca aaaaaaatct tatagggggct cttttatttg acagtggaga gacagcggaa   180
gcgactcgtc tcaaacggac agctcgtaga aggtatacac gtcggaagaa tcgtatttgt   240
tatctacagg agatttttc aaatgagatg gcgaaagtag atgatagttt ctttcatcga    300
cttgaagagt ctttttggt ggaagaagac aagaagcatg aacgtcatcc tatttttgga    360
aatatagtag atgaagttgc ttatcatgag aaatatccaa ctatctatca tctgcgaaaa   420
aaattggtag attctactga taaagcggat ttgcgcttaa tctatttggc cttagcgcat   480
atgattaagt ttcgtggtca tttttttgatt gagggagatt taaatcctga taatagtgat  540
gtggacaaac tatttatcca gttggtacaa acctacaatc aattatttga agaaaacct   600
attaacgcaa gtggagtaga tgctaaagcg attctttctg cacgattgag taaatcaaga   660
cgattagaaa atctcattgc tcagctcccc ggtgagaaga aaaatggctt atttgggaat   720
ctcattgctt tgtcattggg tttgaccct aattttaaat caaattttga tttggcagaa    780
gatgctaaat tacagctttc aaaagatact tacgatgatg atttagataa tttattggcg   840
caaattggag atcaatatgc tgatttgttt ttggcagcta agaatttatc agatgctatt   900
ttactttcag atatcctaag agtaaatact gaaataacta aggctcccct atcagcttca   960
atgattaaac gctacgatga acatcatcaa gacttgactc ttttaaaagc tttagttcga  1020
caacaacttc agaaaagta taagaaatc tttttttgatc aatcaaaaaa cggatatgca   1080
ggttatattg atggggagc tagccaagaa gaattttata aatttatcaa accaatttta   1140
gaaaaaatgg atggtactgc ggaattattg gtgaaactaa atcgtgaaga tttgctgcgc  1200
aagcaacgga cctttgacaa cggctctatt ccccatcaaa ttcacttggg tgagctgcat  1260
gctatttga gaagacaaga agacttttat ccattttta aagacaatcg tgagaagatt   1320
gaaaaaatct tgacttttcg aattccttat tatgttggtc cattggcgcg tggcaatagt  1380
cgttttgcat ggatgactcg gaagtctgaa gaaacaatta ccccatggaa ttttgaagaa  1440
gttgtcgata aagtgcttc agctcaatca tttattgaac gcatgacaaa ctttgataaa  1500
aatcttccaa atgaaaagt actaccaaaa catagtttgc tttatgagta ttttacggtt   1560
tataacgaat tgacaaagt caaatatgtt actgaaggaa tgcgaaaacc agcatttctt  1620
tcaggtgaac agaagaaagc cattgttgat ttactcttca aaacaaatcg aaaagtaacc  1680
gttaagcaat aaaagaaga ttatttcaaa aaaatagaat gttttgatag tgttgaaatt  1740
tcaggagttg aagatagatt taatgcttca ttaggtaccct accatgattt gctaaaaatt  1800
attaaagata aagattttt ggataatgaa gaaaatgaag atatcttaga ggatattgtt   1860
ttaacattga ccttatttga agataggag atgattgagg aaagacttaa aacatatgct  1920
cacctctttg atgataaggt gatgaaacag cttaaacgtc gccgttatac tggttgggga  1980
cgtttgtctc gaaaattgat taatggtatt agggataagc aatctggcaa aacaatatta  2040
gatttttga aatcagattg ttttgccaat cgcaatttta tgcagctgat ccatgatgat  2100
agtttgacat ttaaagaaga cattcaaaaa gcacaagtgt ctggacaagg cgatagttta  2160
catgaacata ttgcaatttt agctggtagc cctgctatta aaaaaggtat tttacagact  2220
gtaaaagttg ttgatgaatt ggtcaaagta atggggcggc ataagccaga aaatatcgtt  2280
attgaaatgg cacgtgaaaa tcagacaact caaaagggcc agaaaaattc gcgagagcgt  2340
atgaaacgaa tcgaagaagg tatcaaagaa ttaggaagtc agattcttaa agagcatcct  2400
gttgaaaata ctcaattgca aaatgaaaag ctctatctct attatctcca aaatggaaga  2460
gacatgtatg tggaccaaga attagatatt aatcgtttaa gtgattatga tgtcgatcac  2520
attgttccac aaagttcct taagacgat tcaatagaca ataaggtctt aacgcgttct  2580
gataaaaatc gtggtaaatc ggataacgtt ccaagtgaag aagtagtcaa aagtgataaa  2640
aactattgga gacaacttct aaacgccaag ttaatcactc aacgtaagtt tgataattta  2700
acgaaagctg aacgtggagg tttgagtgaa cttgataaag ctggttttat caaacgccaa  2760
ttggttgaaa ctcgccaaat cactaagcat gtggcacaaa tttttgatag tcgcatgaat  2820
actaaatacg atgaaaatga taacttatt cgagaggtta aagtgattac cttaaaatct  2880
aaattagttt ctgacttccg aaaagatttc caattctata agtacgtga gattaacaat  2940
taccatcatg cccatgatgc gtatctaaat gccgtcgttg gaactgcttt gattaagaaa  3000
tatccaaaac ttgaatcgga gtttgtctat ggtgattata agtttatga tgttcgtaaa  3060
atgattgcta agtctgagca agaaataggc aaagcaaccg caaaatattt cttttactct  3120
aatatcatga acttcttcaa aacagaaatt acacttgcaa atggagagat tcgcaaacgc  3180
cctctaatcg aaactaatgg ggaaactgga gaaattgtct gggataaagg gcgagatttt  3240
gccacagtgc gcaaagtatt gtccatgccc caagtcaata ttgtcaagaa aacagaagta  3300
cagacaggcg gattctccaa ggagtcaatt taccaaaaa gaaattcgga caagcttatt  3360
gctcgtaaaa aagactggga tccaaaaaa tatggtggtt ttgatagtcc aacggtagct  3420
tattcagtcc tagtggttgc taaggtggaa aagggaaat cgaagaagtt aaaatccgtt  3480
aaagagttac tagggatcac aattatgaaa agaagttcct ttgaaaaaaa tccgattgac  3540
ttttagaag ctaaaggata taaggaagtt aaaaaagact taatcattaa actacctaaa  3600
tatagtcttt ttgagttaga aaacggtcgt aaacggatgc tggctagtgc cggagaatta  3660
caaaaaggaa atgagctggc tctgccaagc aaatatgtga attttttata tttagctagt  3720
cattatgaaa agttgaaggg tagtccagaa gataacgaac aaaaacaatt gtttgtggag  3780
cagcataagc attattttaga tgagattatt gagcaaatca gtgaatttttc taagcgtgtt  3840
attttagcag atgccaattt agataaagtt cttagtgcat ataacaaaca tagagacaaa  3900
ccaatacgtg aacaagcaga aaatattatt catttatta cgttgacgaa tcttggagct  3960
cccgctgctt ttaaatattt tgatacaaca attgatcgta acgatatac gtctacaaaa  4020
gaagttttag atgccactct tatccatcaa tccatcactg gtctttatga aacacgcatt  4080
gatttgagtc agctaggagg tgactgaatg gataagaaat actcaatagg cttagatatc  4140
ggcacaaata gcgtcggatg ggcggtgatc actgatgaat ataaggttcc gtctaaaaag  4200
ttcaaggttc tgggaaatac agaccgccac agtatcaaaa aaatcttat aggggctctt  4260
ttattttgaca gtggagagac agcggaagcg actcgtctca aacggacagc tcgtagaagg  4320
tatacacgtc ggaagaatcg tatttgttat ctacaggaga ttttttcaaa tgagatggcg  4380
aaagtagatg atagttcttt tcatcgactt gaagagtctt ttttggtgga agaagacaag  4440
aagcatgaac gtcatcctat ttttggaaat atagtagatg aagttgctta tcatgagaaa  4500
tatccaacta tctatcatct gcgaaaaaaa ttggtagatt ctactgataa agcggatttg  4560
cgcttaatct atttggcctt agcgcatatg attaagtttc gtggtcattt tttgattgag  4620
ggagatttaa atcctgataa tagtgatgtg gacaaactat ttatccagtt ggtacaaacc  4680
tacaatcaat tatttgaaga aaaccctatt aacgcaagtg gagtagatgc taaagcgatt  4740
ctttctgcac gattgagtaa atcaagacga ttagaaaatc tcattgctca gctccccggt  4800
```

```
gagaagaaaa atggcttatt tgggaatctc attgctttgt cattgggttt gaccectaat    4860
tttaaatcaa attttgattt ggcagaagat gctaaattac agctttcaaa agatacttac    4920
gatgatgatt tagataattt attggcgcaa attgggatc aatatgctga tttgtttttg     4980
gcagctaaga atttatcaga tgctatttta ctttcagata tcctaagagt aaatactgaa    5040
ataactaagg ctcccctatc agcttcaatg attaaacgct acgatgaaca tcatcaagac    5100
ttgactcttt taaaagcttt agttcgacaa caacttccag aaaagtataa agaaatcttt    5160
tttgatcaat caaaaaacgg atatgcaggt tatattgatg ggggagctag ccaagaagaa    5220
tttttataaat ttatcaaacc aattttagaa aaaatggatg gtactgagga attattggtg    5280
aaactaaatc gtgaagattt gctgcgcaag caacggacct ttgacaacgg ctctattccc    5340
catcaaattc acttgggtga gctgcatgct attttgagaa gacaagaaga cttttatcca    5400
ttttttaaaag acaatcgtga gaagattgaa aaaatcttga cttttcgaat tcctattat    5460
gttggtccat ggcgcgtgg caatagtcgt tttgcatgga tgactcggaa gtctgaagaa    5520
acaattaccc catggaattt tgaagaagtt gtcgataaag gtgcttcagc tcaatcattt    5580
attgaacgca tgacaaactt tgataaaaat cttccaaatg aaaaagtact accaaaacat    5640
agtttgcttt atgagtattt tacgtttat aacgaattga caaaggtcaa atatgttact     5700
gaaggaatgc gaaaaccagc atttctttca ggtgaacaga agaagccat tgttgattta     5760
ctcttcaaaa caaatcgaaa agtaaccgtt aagcaattaa aagaagatta tttcaaaaaa    5820
atagaatgtt ttgatagtgt tgaaatttca ggagttgaaa atagatttaa tgcttcatta    5880
ggtacctacc atgatttgct aaaaattatt aaagataaag atttttttgga taatgaagaa    5940
aatgaagata tcttagagga tattgttta acattgacct tattgtgaaga tagggagatg    6000
attgaggaaa gacttaaaac atatgctcac ctctttgatg ataaggtgat gaaacagctt    6060
aaacgtcgcc gttatactgg ttggggacgt ttgtctcgaa aattgattaa tggtattagg    6120
gataagcaat ctggcaaaac aatattagat ttttttgaaat cagatggttt tgccaatcgc    6180
aattttatgc agctgatcca tgatgatagt ttgacattta aagaagacat tcaaaaagca    6240
caagtgtctg acaaggcga tagtttacat gaacatattg caaatttagc tggtagccct    6300
gctattaaaa aagtatttt acagactgta agttgttg atgaattggt caaagtaatg    6360
gggcggcata agccagaaaa tatcgttatt gaaatggcac gtgaaaatca gacaactcaa    6420
aagggccaga aaaattcgcg agagcgtatg aaacgaatcg aagaaggtat caagaatta    6480
ggaagtcaga ttcttaaaga gcatcctgtt gaaaatactc aattgcaaaa tgaaaagctc    6540
tatctctatt atctccaaaa tggaagagac atgtatgtgg accaagaatt agatattaat    6600
cgtttaagtg attatgatgt cgatcacatt gttccacaaa gtttccttaa agacgattca    6660
atagacaata aggtcttaac gcgttctgat aaaaatcgtg gtaaatcgga taacgttcca    6720
agtgaagaag tagtcaaaaa gatgaaaaac tattggagac aacttctaaa cgccaagtta    6780
atcactcaac gtaagtttga taatttaacg aaagctgaac gtggaggttt gagtgaactt    6840
gataaagctg gtttttatcaa acgccaattg gttgaaactc gccaaatcac taagcatgtg    6900
gcacaaattt tggatagtcg catgaatact aaatacgatg aaaatgataa acttattcga    6960
gaggttaaag tgattacctt aaaatctaaa ttagtttctg acttccgaaa agatttccaa    7020
ttctataaag tacgtgagat taacaattac catcatgccc atgatgcgta tctaaatgcc    7080
gtcgttggaa ctgctttgat taagaaatat ccaaacttg aatcggagtt tgtctatggt    7140
gattataaag tttatgatgt tcgtaaaatg attgctaagt ctgagcaaga aataggcaaa    7200
gcaaccgcaa aatatttctt ttactctaat atcatgaact tcttcaaaac agaaattaca    7260
cttgcaaatg gagagattcg caaacgccct ctaatcgaaa ctaatgggga aactggagaa    7320
attgtctggg ataaagggcg agattttgcc acagtgcgca aagtattgtc catgccccaa    7380
gtcaatattg tcaagaaaac agaagtacga caggcggat tctccaagga gtcaattta     7440
ccaaaaagaa attcggacaa gctattgct cgtaaaaaag actgggatcc aaaaaaaatat    7500
ggtggttttg atagtccaac ggtagcttat tcagtcctag tggttgctaa ggtggaaaaa    7560
gggaaatcga agaagttaaa atccgttaaa gagttactag ggatcacaat tatggaaaga    7620
agttccttg aaaaaaatcc gattgacttt ttagaagcta aaggatataa ggaagttaaa    7680
aaaagacttaa tcattaaact acctaaatat agtcttttg agttagaaaa cggtcgtaaa    7740
cggatgctgg ctagtgccgg agaattacaa aaaggaaatg agctggctct gccaagcaaa    7800
tatgtgaatt ttttatattt agctagtcat atgaaaagt tgaagggtag tccagaagat    7860
aacgaacaaa aacaattgtt tgtgagcag cataagcatt atttagatga gattattgag    7920
caaatcagtg aattttctaa gcgtgttatt ttagcagatg ccaatttaga taaagttctt    7980
agtgcatata caaacatag agacaaacca atacgtgaac aagcagaaaa tattattcat    8040
ttatttacgt tgacgaatct tggagctccc gctgctttta aatattttga tacaacaatt    8100
gatcgtaaac gatatacgtc tacaaaagaa gttttagatg ccactcttat ccatcaatcc    8160
atcactggtc tttatgaaac acgcattgat ttgagtcagc taggaggtga ctgaatggat    8220
aagaaatact caataggctt agatatcggc acaaatagcg tcggatgggc ggtgatcact    8280
gatgaatata aggttccgtc taaaaagttc aaggttctgg gaaatacaga ccgccacagt    8340
atcaaaaaaa atcttatagg ggctcttta tttgacagtg gagagacagc ggaagcgact    8400
cgtctcaaac ggacagctcg tagaaggtat acacgtcgga agaatcgtat tgttatccta    8460
caggagattt tttcaaatga gatggcgaaa gtagatgata gtttctttca tcgacttgaa    8520
gagtcttttt tggtggaaga agacaagaag catgaacgtc atcctatttt tggaaatata    8580
gtagatgaag ttgcttatca tgaaaaatat ccaactatct atcatctgcg aaaaaaattg    8640
gtagattcta ctgataaagc ggatttgcgc ttaatctatt tggccttagc gcatatgatt    8700
aagtttcgtg gtcatttttt gattgaggga gatttaaatc ctgataatag tgatgtggac    8760
aaactatttta tccagttggt acaaacctac aatcaattat ttgaagaaaa ccctattaac    8820
gcaagtggag tagatgctaa agcgattctt tctgcacgat tgagtaaatc aagacgatta    8880
gaaaatctca ttgctcagct ccccggttag aagaaaaatg gcttatttgg aatctcatt    8940
gctttgtcat tgggtttgac ccctaatttt aaatcaaatt ttgatttggc agaagatgct    9000
aaattacagc tttcaaaaga tacttacgat gatgatttag ataatttatt ggcgcaaatt    9060
ggagatcaat atgctgattt gtttttgca gctaagaatt tatcagatgc tattttactt    9120
tcagatatcc taagagtaaa tactgaaata actaaggctc ccctatcagc ttcaatgatt    9180
aaacgctacg atgaacatca tcaagactg actctttaa agctttagt tcgacaacaa    9240
cttccagaaa agtataaaga aatcttttt gatcaatcaa aaacggata tgcaggttat     9300
attgatgggg gagctagcca agaagaattt tataaattta tcaaaccaat tttagaaaaa    9360
atggatggta ctgaggaatt attggtgaaa ctaaatcgtg aagatttgct gcgcaagcaa    9420
cggacctttg acaacggctc tattcccat caaattcact ggtgagct gcatgctatt     9480
ttgagaagac aagaagactt ttatccattt ttaaaagaca atcgtgagaa gattgaaaaa    9540
```

```
atcttgactt ttcgaattcc ttattatgtt ggtccattgg cgcgtggcaa tagtcgtttt   9600
gcatggatga ctcggaagtc tgaagaaaca attaccccat ggaattttga agaagttgtc   9660
gataaaggtg cttcagctca atcatttatt gaacgcatga caaactttga taaaaatctt   9720
ccaaatgaaa aagtactacc aaaacatagt ttgctttatg agtattttac ggtttataac   9780
gaattgacaa aggtcaaata tgttactgaa ggaatgcgaa aaccagcatt tctttcaggt   9840
gaacagaaga aagccattgt tgatttactc ttcaaaacaa atcgaaaagt aaccgttaag   9900
caattaaaag aagattattt caaaaaaata gaatgttttg atagtgttga aatttcagga   9960
gttgaagata gatttaatgc ttcattaggt acctaccatg atttgctaaa aattattaaa  10020
gataaagatt ttttggataa tgaagaaaat gaagatatct taggggatat tgttttaaca  10080
ttgaccttat ttgaagatag ggagatgatt gaggaaagac ttaaaacata tgctcacctc  10140
tttgatgata aggtgatgaa acagcttaaa cgtcgccgtt atactggttg gggacgtttg  10200
tctcgaaaat tgattaatgg tattagggat aagcaatctg gcaaaacaat attagatttt  10260
ttgaaatcag atggtttttgc caatcgcaat tttatgcagc tgatccatga tgatagtttg  10320
acatttaaaag aagacattca aaaagcacaa gtgtctggac aaggcgatag tttacatgaa  10380
catattgcaa atttagctgg tagccctgct attaaaaaag gtattttaca gactgtaaaa  10440
gttgttgatg aattggtcaa agtaatgggg cggcataagc cagaaaatat cgttattgaa  10500
atggcacgtg aaaatcagac aactcaaaag ggccagaaaa ttcgcgaga gcgtatgaaa  10560
cgaatcgaag aaggtatcaa agaattagga agtcagattc ttaaagagca tcctgttgaa  10620
aatactcaat tgcaaaatga aaagctctat ctctattatc tccaaaatgg aagagacatg  10680
tatgtggacc aagaattaga tattaatcgt ttaagtgatt atgatgtcga tcacattgtt  10740
ccacaaaagtt tccttaaaga cgattcaata gacaataagg tcttaacgcg ttctgataaa  10800
aatcggtgta aatcggataa cgttccaagt gaagaagtag tcaaaaagat gaaaaactat  10860
tggagacaac ttctaaacgc caagttaatc actcaacgta agtttgataa tttaacgaaa  10920
gctgaacgtg gaggtttgag tgaacttgat aaagctggtt ttatcaaacg ccaattggtt  10980
gaaactcgcc aaatcactaa gcatgtggca caaattttgg atagtcgcat gaatactaaa  11040
tacgatgaaa atgataaact tattcgagag gttaaagtga ttaccttaaa atctaaatta  11100
gtttctgact tccgaaaaga tttccaattc tataaagtac gtgagattaa caattaccat  11160
catgcccatg atgcgtatct aaatgccgtc gttggaactg ctttgattaa gaaatatcca  11220
aaacttgaat cggagtttgt ctatggtgat tataaagttt atgatgttcg taaaatgatt  11280
gctaagtctg agcaagaaat aggcaaagca accgcaaaat atttcttta ctctaatatc  11340
atgaacttct tcaaaacaga aattacactt gcaaatggag agattcgcaa acgccctcta  11400
atcgaaacta atgggaaac tggagaaatt gtctgggata aagggcgaga ttttgccaca  11460
gtgcgcaaag tattgtccat gccccaagtc aatattgtca agaaaacaga agtacagaca  11520
ggcggattct ccaaggagtc aattttacca aaaagaaatt cggacaagct tattgctcgt  11580
aaaaaagact gggatccaaa aaaatatggt ggttttgata gtccaacgct agcttattca  11640
gtcctagtgg ttgctaaggt ggaaaaaggg aaatcgaaga agttaaaatc cgttaaagag  11700
ttactaggga tcacaattat ggaagaagt tcctttgaaa aaaatccgat tgacttttta  11760
gaagctaaag gatataagga agttaaaaaa gacttaatca ttaaactacc taaatatagt  11820
ctttttgagt tagaaaacgg tcgtaaacg atgctggcta gtgccggaa attacaaaaa  11880
ggaaatgagc tggctctgcc aagcaaatat gtgaattttt tatatttagc tagtcattat  11940
gaaaagttga agggtagtcc agaagataac gaacaaaaac aattgtttgt ggagcagcat  12000
aagcattatt tagatgagat tattgagcaa atcagtgaat tttctaagcg tgttatttta  12060
gcagatgcca atttagataa agttcttagt gcatataaca aacatagaga caaaccaata  12120
cgtgaacaag cagaaaatat tattcattta tttacgttga cgaatcttgg agctcccgct  12180
gcttttaaat attttgatac aac                                           12203
```

```
SEQ ID NO: 92        moltype = DNA   length = 4107
FEATURE              Location/Qualifiers
misc_feature         1..4107
                     note = codon optimized S. pyogenes Cas9
source               1..4107
                     mol_type = other DNA
                     organism = synthetic construct
SEQUENCE: 92
atggataaaa aatcagcat tggtctggat atcggaacca acagcgttgg gtgggcagta     60
ataacagatg aatacaaagt gccgtcaaaa aaatttaagg ttctggggaa tacagatcgc    120
cacagcataa aaaagaatct gattgggca ttgctgtttg attcgggtga cagctgag      180
gccacgcgtc tgaaacgtac agcaagaaga cgttacacac gtcgtaaaaa tcgtatttgc    240
tacttacagg aaattttttc taacgaaatg gccaaggtag atgatagttt cttccatcgt    300
ctcgaagaat cttttctggt tgaggaagat aaaaaacacg aacgtcaccc tatctttggt    360
aatatcgtgg atgaagtggc ctatcatgaa aaataccta cgatttatca tcttcgcaag    420
aagttggttg atagtacgga caaagcggat ctgcgtttaa tctatcttgc gttagcgcac    480
atgatcaaat tcgtggtca tttcttaatt gaaggtgatc tgaatcctga taactctgat    540
gtggacaaat tgtttataca attagtgcaa acctataatc agctgttcga ggaaaacccc    600
attaatgcct ctggagttga tgccaaagcg atttttaagcg cgagactttc taagtcccgg    660
cgtctgaga atctgatcgc ccagttacca ggggaaaaga aaatggtct gtttggtaat    720
ctgattgccc tcagtctggg gcttaccccg aacttcaaat ccaatttgga cctggctgag    780
gacgcaaagc tgcagctgag caaagatact tatgatgatg acctgcaaa tctgctcgcc    840
cagattggtg accaatatgc agatctgttt ctggcagcga agaatctttc ggatgctatc    900
ttgctgtcgg atattctgcg tgttaatacc gaaatcacca agcgcctct gtctgcaagt    960
atgatcaaga gatacgacga gcaccaccag gacctgactc ttcttaaggc actggtacgc   1020
caacagcttc cggagaaata caaagaaata ttcttcgacc agtccaagaa tggttacgcg   1080
ggctacatcg atggtggtgc atcacaggaa gagttctata aatttattaa accaatcctt   1140
gagaaaatgg atggcacgga agagttactt gttaaactta atcgagaggt gttagatcga   1200
aagcaacgta cattcgacaa cggctccatc ccacaccaga tcattagg tgaacttcac   1260
gccatcttgc gcagacaaga agatttctat cccttcttaa aagacaatcg ggagaaaatc   1320
gagaagatct gacgttccg cattccctat atgtcggtc cctggcacg tggtaattct   1380
cggtttgcct ggatgacgcg caaaagtgag gaaaccatca ccccttggaa ctttgaagaa   1440
gtcgtggata aggtgctag cgcgcagtct tttatagaaa gaatgacgaa cttcgataaa   1500
```

```
aacttgccca acgaaaaagt cctgcccaag cactctcttt tatatgagta ctttactgtg   1560
tacaacgaac tgactaaagt gaaatacgtt acggaaggta tgcgcaaacc tgcctttctt   1620
agtggcgagc agaaaaaagc aattgtcgat cttctcttta aaacgaatcg caaggtaact   1680
gtaaaacagc tgaaggaaga ttatttcaaa agatcgaat gctttgattc tgtcgagatc   1740
tcgggtgtcg aagatcgttt caacgcttcc ttagggacct atcatgattt gctgaagata   1800
ataaaagaca aagactttct cgacaatgaa gaaaatgaag atattctgga ggatattgtt   1860
ttgaccttga ccttattcga agatagagag atgatcgagg agcgcttaaa aacctatgcc   1920
cacctgtttg atgacaaagt catgaagcaa ttaaagcgcc gcagatatac ggggtggggc   1980
cgcttgagcc gcaagttgat taacggtatt agagacaagc agagcggaaa aactatcctg   2040
gatttcctca aatctgacgg atttgcgaac cgcaattta tgcagcttat acatgatgat   2100
tcgcttacat tcaaagagga tattcagaag gctcaggtgt ctgggcaagg tgattcactc   2160
cacgaacata tagcaaattt ggccggctct cctgcgatta agaaggggat cctgcaaaca   2220
gttaaagttg tggatgaact tgtaaaagta atgggccgcc acaagccgga gaatatcgtg   2280
atagaaagtg cgcgcggaaa tcaaacgaca caaaaagtc aaaagaactc aagagagaga   2340
atgaagcgca ttgaggaggg gataaaggaa cttggatctc aaattctgaa agaacatcca   2400
gttgaaaaca ctcagctgca aaatgaaaaa ttgtacctgt actacctgca gaatgaagaa   2460
gacatgtacg tggatcagga attggatatc aatagactct cggactatga cgtagatcac   2520
attgtccctc agagcttcct caaggatgat tctatagata ataagtact tacgagatcg   2580
gacaaaaatc gcggtaaatc ggataacgtc ccatcggagg aagtcgttaa aaagatgaaa   2640
aactattggc gtcaactgct gaacgccaag ctgatcacac agcgtaagtt tgataatctg   2700
actaaagccg aacgcggtgg tcttagtgaa ctcgataaag caggatttat aaaacggcag   2760
ttagtagaaa cgcgccaaat tacgaaacac gtggctcaga tcctcgattc tagaatgaat   2820
acaaagtacg atgaaaacga taactgatc cgtgaagtaa aagtcattac cttaaaatct   2880
aaacttgtgt ccgatttccg caaagatttt cagttttaca aggtccggga aatcaataac   2940
tatcaccatg cacatgatgc atatttaaat gcggttgtag gcacggccct tattaagaaa   3000
taccctaaac tcgaaagtga gttttgtttat ggggattata aagtgtatga cgttcgcaaa   3060
atgatcgcga aatcagaaca ggaaatcggt aaggctaccg ctaaatactt ttttttattcc   3120
aacattatga atttttttaa gaccgaaata actctcgcga atggtgaaat ccgtaaacgg   3180
cctcttatag aaaccaatgg tgaaacggga gaaatcgttt gggataaagg tcgtgacttt   3240
gccaccgttc gtaaagtcct ctcaatgccg caagttaaca ttgtcaagaa gacggaagtt   3300
caaacaggggg gattctccaa agaatctatc ctgccgaagc gtaacagtga taaacttatt   3360
gccagaaaaa aagattggga tccaaaaaaa tacggaggct ttgattcccc taccgtcgcg   3420
tatagtgtgc tggtggttgc taaagtcgag aaagggaaaa gcaagaaatt gaatcagtt   3480
aaagaactgc tgggtattac aattatggaa agatcgtcct ttgagaaaaa tccgatcgac   3540
tttttagagg ccaagggggta taaggaagtg aaaaaagatc tcatcatcaa attaccgaag   3600
tatagtcttt ttgagctgga aaacggcaga aaaagaatgc tggcctccgc gggcgagtta   3660
cagaagggaa atgagctggc gctgccttcc aaatatgtta attttctgta ccttgccagt   3720
cattatgaga aactgaaggg cagccccgaa gataacgaac agaaacaatt attcgtggaa   3780
cagcataagc actatttaga tgaaattata gagcaaatta gtgaattttc taagcgcgtt   3840
atcctcgcgg atgctaattt agacaaagta ctgtcagctt ataataaaca tcgggataag   3900
ccgattagag aacaggccga aaatatcatt catttgttta ccttaaccaa ccttggagca   3960
ccagctgcct tcaaatattt cgataccaca attgatcgta aacggtatac aagtacaaaa   4020
gaagtcttgg acgcaacccct cattcatcaa tctattactg gattatatga gacacgcatt   4080
gatctttcac agctgggcgg agactaa                                       4107
SEQ ID NO: 93           moltype = DNA   length = 607
FEATURE                 Location/Qualifiers
source                  1..607
                        mol_type = other DNA
                        organism = Bacillus subtilis
SEQUENCE: 93
attcctccat tttcttctgc tatcaaaata acagactcgt gattttccaa acgagctttc    60
aaaaaagcct ctgcccctttg caaatcggat gcctgtctat aaaattcccg atattggtta   120
aacagcggcg caatgcggc cgcatctgat gtctttgctt ggcgaatgtt catcttattt    180
cttcctccct ctcaataatt ttttcattct atccctttc tgtaaagttt attttttcaga   240
atacttttat catcatgctt tgaaaaaata tcacgataat atccattgtt ctcacggaag   300
cacacgcagg tcatttgaac gaattttttc gacaggaatt tgccgggact caggagcatt   360
taacctaaaa aagcatgaca tttcagcata atgaacattt actcatgtct attttcgttc   420
ttttctgtat gaaaatagtt attttcgagtc tctacgaaa tagcgagaga tgatataact   480
aaatagagat aaaatcatct caaaaaaatg ggtctactaa aatattattc catctattac   540
aataaattca cagaatagtc ttttaagtaa gtctactctg aattttttta aaaggagagg   600
gtaacta                                                              607

SEQ ID NO: 94           moltype = DNA   length = 138
FEATURE                 Location/Qualifiers
source                  1..138
                        mol_type = other DNA
                        organism = Bacillus subtilis
SEQUENCE: 94
tattgaaaat actgacgagg ttatataaga tgaaataag ttagtttgtt taaacaacaa     60
actaataggt gatgtactta ctatatgaaa taaaatgcat ctgtatttga atgaatttat   120
ttttaagggg gaaatcac                                                  138

SEQ ID NO: 95           moltype = DNA   length = 177
FEATURE                 Location/Qualifiers
misc_feature            1..177
                        note = spac promoter
source                  1..177
                        mol_type = other DNA
```

```
                        organism = synthetic construct
SEQUENCE: 95
ggtagccctt gcctacctag cttccaagaa agatatccta acagcacaag agcggaaaga    60
tgttttgttc tacatccaga acaacctctg ctaaaattcc tgaaaaattt tgcaaaaagt   120
tgttgacttt atctacaagg tgtggcataa tgtgtggaat tgtgagcgct cacaatt      177

SEQ ID NO: 96           moltype = DNA   length = 100
FEATURE                 Location/Qualifiers
misc_feature            1..100
                        note = hyper-spank promoter
source                  1..100
                        mol_type = other DNA
                        organism = synthetic construct
SEQUENCE: 96
ctcgagggta aatgtgagca ctcacaattc attttgcaaa agttgttgac tttatctaca    60
aggtgtggca taatgtgtgt aattgtgagc ggataacaat                         100

SEQ ID NO: 97           moltype = DNA   length = 237
FEATURE                 Location/Qualifiers
source                  1..237
                        mol_type = other DNA
                        organism = Bacillus subtilis
SEQUENCE: 97
ggagttctga gaattggtat gccttataag tccaattaac agttgaaaac ctgcatagga    60
gagctatgcg ggttttttat tttacataat gatacataat ttaccgaaac ttgcggaaca   120
taattgagga atcatagaat tttgtcaaaa taattttatt gacaacgtct tattaacgtt   180
gatataattt aaatttattt tgacaaaaat gggctcgtgt tgtacaataa atgtagt      237

SEQ ID NO: 98           moltype = DNA   length = 270
FEATURE                 Location/Qualifiers
source                  1..270
                        mol_type = other DNA
                        organism = Bacillus subtilis
SEQUENCE: 98
gaattcgagc tcggtaccga tcttaacatt tttcccctat catttttccg tcttcatttg    60
tcattttttc cagaaaaaat cgcgtcattc gactcatgtc taatccaaca cgtgtctctc   120
ggcttatccc ctgacaccgc ccgccgacag cccgcatggg acgattctat caattcagcc   180
gcggagtcta gttttatatt gcagaatgcg agattgctgg tttattataa caatataagt   240
tttcattatt ttcaaaaagg gggatttatt                                    270

SEQ ID NO: 99           moltype = DNA   length = 56
FEATURE                 Location/Qualifiers
source                  1..56
                        mol_type = other DNA
                        organism = T5 phage
SEQUENCE: 99
aagaatcata aaaaatttat ttgctttcag gaaaattttt ctgtataata gattca        56

SEQ ID NO: 100          moltype = DNA   length = 173
FEATURE                 Location/Qualifiers
source                  1..173
                        mol_type = other DNA
                        organism = Bacillus subtilis
SEQUENCE: 100
gctattgtaa cataatcggt acggggtga aaaagctaac ggaaaaggga gcggaaaga     60
atgatgtaag cgtgaaaaat ttttatctt atcacttgaa attggaaggg agattcttta   120
ttataagaat tgtggaattg tgagcggata acaattccca attaaaggag gaa          173

SEQ ID NO: 101          moltype = DNA   length = 231
FEATURE                 Location/Qualifiers
source                  1..231
                        mol_type = other DNA
                        organism = Bacillus subtilis
SEQUENCE: 101
aagcttctca tcaatgattt gaattggagc tcgggctggc cgtcctattg aattaaaaag    60
ccgggctctg cccccggctt ttttaaaag aaaagattga cagtataata gtcaattact   120
ataataaaat tgttcgtaca aatatttatt tataggttta ttttctatca ttagtacgta   180
tctttttgtat ttgaaagcgt tttatttat gagaaagggg cagtttacat g            231

SEQ ID NO: 102          moltype = DNA   length = 231
FEATURE                 Location/Qualifiers
source                  1..231
                        mol_type = other DNA
                        organism = Bacillus licheniformis
SEQUENCE: 102
ttctgaaatc tgtcaaaaaa aataaaaaac ataccggaaa ttaaattgac agttttttc    60
ataatgatat aatgaagttg ttcgtacaaa tatgttttg atgttagttg tacgtacata   120
taatcgcgat acagtttgag atcaaggtat gatttatgtt ttttgtaag cgttttaata   180
gtttgctatt ctacacagac accataaaga cgaggaggag gaagctattt g            231
```

```
SEQ ID NO: 103          moltype = DNA   length = 95
FEATURE                 Location/Qualifiers
source                  1..95
                        mol_type = other DNA
                        organism = lambda phage
SEQUENCE: 103
gactcctgtt gatagatcca gtaatgacct cagaactcca tctggatttg ttcagaacgc   60
tcggttgccg ccgggcgttt tttattggtg agaat                              95

SEQ ID NO: 104          moltype = DNA   length = 4809
FEATURE                 Location/Qualifiers
misc_feature            1..4809
                        note = cas9 expression cassette
source                  1..4809
                        mol_type = other DNA
                        organism = synthetic construct
SEQUENCE: 104
attcctccat tttcttctgc tatcaaaata acagactcgt gattttccaa acgagctttc   60
aaaaaagcct ctgcccccttg caaatcggat gcctgtctat aaaattcccg atattggtta  120
aacagcggcg caatggcggc cgcatctgat gtctttgctt ggcgaatgtt catcttattt  180
cttcctccct ctcaataatt ttttcattct atccctttc tgtaaagttt attttcaga   240
atactttttat catcatgctt tgaaaaaata tcacgataat atccattgtt ctcacgaag  300
cacacgcagg tcatttgaac gaattttttc gacaggaatt tgccgggact caggagcatt  360
taacctaaaa aagcatgaca tttcagcata atgaacattt actcatgtct attttcgttc  420
ttttctgtat gaaaatagtt attttcgagtc tctacggaaa tagcgagaga tgatatacct  480
aaatagagat aaaatcatct caaaaaaatg ggtctactaa aatattattc catctattac  540
aataaattca cagaatagtc ttttaagtaa gtctactctg aatttttta aaggagagg   600
gtaactaatg gataaaaaat acagcattgg tctggatatc ggaaccaaca gcgttgggtg  660
ggcagtaata acagatgaat acaaagtgcc gtcaaaaaaa tttaaggttc tggggaatac  720
agatcgccac agcataaaaa agaatctgat tggggcattg ctgtttgatt cgggtgagac  780
agctgaggcc acgcgtctga aacgtacagc aagaagacgt tacacacgtc gtaaaaatcg  840
tatttgctac ttacaggaaa ttttttctaa cgaaatggcc aaggtagatg atagtttctt  900
ccatcgtctc gaagaatctt ttctggttga ggaagataaa aaacacgaag tcaccctat   960
ctttggcaat atcgtggatg aagtggccta tcatgaaaaa taccctacga tttatcatct 1020
tcgcaagaag ttggttgata gtacggacaa agcggatctg cgtttaatct atcttgcgtt 1080
agcgcacatg atcaaatttc gtggtcattt cttaattgaa ggtgatctga atcctgataa 1140
ctctgatgtg acaaattgt ttatacaatt agtgcaaacc tataatcagc tgttcgagga 1200
aaaccccatt aatgcctctg gagttgatgc caaagcgatt ttaagcgcga gactttctaa 1260
gtcccgcgt ctgagaatc tgatcgccca gttaccaggg gaaaagaaaa atggtctgtt 1320
tggtaatctg attgccctca gtctggggct taccccgaac ttcaaatcca attttgacct 1380
ggctgaggac gcaaagctgc agctgagcaa agatacttat gatgatgacc tcgacaatct 1440
gctcgcccag attggtgacc aatatgcgga tctgtttctg gcagcgaaga atctttcgga 1500
tgctatcttg ctgtcggata ttctgcgtgt aatacccgaa atcaccaaag cgcctctgtc 1560
tgcaagtatg atcaagagat acgacgagca ccaccaggac ctgactcttc ttaaggcact 1620
ggtacgccaa cagcttccgg agaaatacaa agaaatattc tttgaccagt ccaagaatgg 1680
ttacgcgggc tacatcgatg gtggtgcatc acaggaagg ttctataaat ttattaaacc 1740
aatccttgag aaaatggatg gcacggaaga gttacttgtt aaacttaacc gcgaagactt 1800
gcttagaaag caacgtacat tcgacaacgg ctccatccca caccagattc atttaggtga 1860
acttcacgcc atcttgcgca gacaagaaga tttctatccc ttcttaaaag acaatcggga 1920
gaaaatcgag aagatcctga cgttccgcat tccctattat gtcggtcccc tggcacgtgg 1980
taattctcgg tttgcctgga tgacgcgcaa aagtgaggaa accatcaccc cttgaaactt 2040
tgaagaagtc gtgggataaag gtgctagcgc gcagtctttt atagaaagaa tgacgaactt 2100
cgataaaaac ttgcccaacg aaaaagtcct gcccaagcac tctctttat atgagtactt 2160
tactgtgtac aacgaactga ctaagtgaa atacgttacg gaaggtatgc gcaaacctgc 2220
ctttcttagt ggcgagcaga aaaaagcaat tgtcgatctt ctctttaaa cgaatcgcaa 2280
ggtaactgta aaacagctga aggaagatta tttcaaaaag atcgaatgct tgattctgt 2340
cgagatctcg ggtgtcgaag atcgtttcaa cgcttcctta gggacctatc atgatttgct 2400
gaagataata aaagacaaag actttctcga caatgaagaa aatgaagata ttctggagga 2460
tattgttttg accttgacct tattcgaaga tagagagatg atcgaggagc gcttaaaaac 2520
ctatgcccac ctgtttgatg acaaagtcat gaagcaatta agcgccgca gatatacggg 2580
gtggggccgc ttgagccgca agttgattaa cggtattaga acaagcaga gcggaaaaac 2640
tatcctggat ttcctcaaat ctgacggatt tgcgaaccgc aattttatgc agcttataca 2700
tgatgattcg cttacattca aagaggatat tcagaaggct caggtgtctg ggcaaggaac 2760
ttcactccac gaacatatag caaatttggc cggctctcct gcgattaaga aggggatcct 2820
gcaaacagtt aaagttgtgg atgaacttgt aaaagtaatg ggccgccaca gccggagaa 2880
tatcgtgata gaaatggcgc gcgagaatca acgacacaa aaaggtcaaa agaactcaag 2940
agagagaatg aagcgcattg aggaggggat aaaggaactt ggatctcaaa ttctgaaaga 3000
acatccagtt gaaaacactc agctgcaaaa tgaaaaactg tacctgtact acctgcagaa 3060
tggaagagac atgtacgtgg atcaggaatt ggatatcaat agactctcgg actatgacgt 3120
agatcacatt gtccctcaga gcttcctcaa ggatgattct atagataata aagtacttac 3180
gagatcggac aaaaatcgcg gtaaatcgga taacgtccca tcggaggaag tcgttaaaaa 3240
gatgaaaaac tattggcgtc aactgctgaa cgccaagctg atcacacagc gtaagtttga 3300
taatctgact aaagccgaac gcggtggtct tagtgaactc gataaaagcag gatttataaa 3360
acggcagtta gtagaaacgc gccaaattac gaaacacgtg gctcagatcc tcgattctag 3420
aatgaataca aagtacgatg aaaacgataa actgatccgt gaagtaaaag tcattacctt 3480
aaaatctaaa cttgtgtccg atttccgcaa agatttcagc ttttacaagg tccgggaaat 3540
caataactat caccatgcac atgatgcata tttaaatgcg gttgtaggca cggcccttat 3600
taagaaatac cctaaactcg aaagtgagtt tgttatggg gattataaag tgtatgacgt 3660
```

```
tcgcaaaatg atcgcgaaat cagaacagga aatcggtaag gctaccgcta aatactttt   3720
ttattccaac attatgaatt tttttaagac cgaaataact ctcgcgaatg gtgaaatccg   3780
taaacggcct cttatagaaa ccaatggtga acgggagaa atcgtttggg ataaaggtcg   3840
tgactttgcc accgttcgta aagtcctctc aatgccgcaa gttaacattg tcaagaagac   3900
ggaagttcaa acaggggat tctccaaaga atctatcctg ccgaagcgta acagtgataa   3960
acttattgcc agaaaaaaag attgggatca aaaaaaatac ggaggctttg attccctac   4020
cgtcgcgtat agtgtgctgg tggttgctaa agtcgagaaa gggaaaagca agaaattgaa   4080
atcagttaaa gaactgctgg gtattacaat tatggaaaga tcgtcctttg agaaaaatcc   4140
gatcgacttt ttagaggcca aggggtataa ggaagtgaaa aaagatctca tcatcaaatt   4200
accgaagtat agtcttttg agctggaaaa cggcagaaaa agaatgctgg cctccgcggg   4260
cgagttacag aagggaaatg agctggcgct gccttccaaa tatgttaatt ttctgtacct   4320
tgccagtcat tatgagaaac tgaagggcag ccccgaagat aacgaacaga acaattatt   4380
cgtggaacag cataagcact attagatga aattatagag caaattagtg aattcctcaa   4440
gcgcgttatc ctcgcggatg ctaatttaga caaagtactg tcagcttata ataacatcg   4500
ggataagccg attagagaac aggccgaaaa tatcattcat ttgtttacct taaccaacct   4560
tggagcacca gctgccttca aatattcga taccacaatt gatcgtaaac ggtatacaag   4620
tacaaaagaa gtcttggacg caaccctcat tcatcaatct attactggat tatatgagac   4680
acgcattgat cttttcacagc tgggcggaga ctaagactcc tgttgataga tccagtaatg   4740
acctcagaac tccatctgga tttgttcaga acgtcggtt gccgccgggc gtttttatt   4800
ggtgagaat                                                         4809

SEQ ID NO: 105          moltype = DNA   length = 23
FEATURE                 Location/Qualifiers
source                  1..23
                        mol_type = other DNA
                        organism = Bacillus licheniformis
SEQUENCE: 105
aatggctgcg gctctggaaa tgg                                           23

SEQ ID NO: 106          moltype = DNA   length = 17
FEATURE                 Location/Qualifiers
misc_feature            1..17
                        note = 17 bp VT
source                  1..17
                        mol_type = other DNA
                        organism = synthetic construct
SEQUENCE: 106
ggctgcggct ctggaaa                                                  17

SEQ ID NO: 107          moltype = DNA   length = 18
FEATURE                 Location/Qualifiers
misc_feature            1..18
                        note = 18bp VT
source                  1..18
                        mol_type = other DNA
                        organism = synthetic construct
SEQUENCE: 107
tggctgcggc tctggaaa                                                 18

SEQ ID NO: 108          moltype = DNA   length = 19
FEATURE                 Location/Qualifiers
misc_feature            1..19
                        note = 19bp VT
source                  1..19
                        mol_type = other DNA
                        organism = synthetic construct
SEQUENCE: 108
atggctgcgg ctctggaaa                                                19

SEQ ID NO: 109          moltype = DNA   length = 20
FEATURE                 Location/Qualifiers
misc_feature            1..20
                        note = 20bp VT
source                  1..20
                        mol_type = other DNA
                        organism = synthetic construct
SEQUENCE: 109
aatggctgcg gctctggaaa                                               20

SEQ ID NO: 110          moltype = DNA   length = 76
FEATURE                 Location/Qualifiers
misc_feature            1..76
                        note = Cas9 endoncuclease recognition domain
source                  1..76
                        mol_type = other DNA
                        organism = synthetic construct
SEQUENCE: 110
gttttagagc tagaaatagc aagttaaaat aaggctagtc cgttatcaac ttgaaaaagt   60
ggcaccgagt cggtgc                                                   76
```

```
SEQ ID NO: 111          moltype = DNA   length = 96
FEATURE                 Location/Qualifiers
misc_feature            1..96
                        note = DNA encoding gRNA targeting duplication
source                  1..96
                        mol_type = other DNA
                        organism = synthetic construct
SEQUENCE: 111
aatggctgcg gctctggaaa gttttagagc tagaaatagc aagttaaaat aaggctagtc    60
cgttatcaac ttgaaaaagt ggcaccgagt cggtgc                              96

SEQ ID NO: 112          moltype = DNA   length = 368
FEATURE                 Location/Qualifiers
misc_feature            1..368
                        note = duplication gRNA expression cassette
source                  1..368
                        mol_type = other DNA
                        organism = synthetic construct
SEQUENCE: 112
ggtagccctt gcctacctag cttccaagaa agatatccta acagcacaag agcggaaaga    60
tgttttgttc tacatccaga acaacctctg ctaaaattcc tgaaaatttt tgcaaaagt    120
tgttgacttt atctcaaagg tgtggcataa tgtgtggaat tgtgagcgct cacaattaat   180
ggctgcggct ctggaaagtt ttagagctag aaatagcaag ttaaaataag gctagtccgt   240
tatcaacttg aaaaagtggc accgagtcgg tgcgactcct gttgatagat ccagtaatga   300
cctcagaact ccatctggat ttgttcagaa cgctcggttg ccgccgggcg ttttttattg   360
gtgagaat                                                            368

SEQ ID NO: 113          moltype = DNA   length = 500
FEATURE                 Location/Qualifiers
source                  1..500
                        mol_type = other DNA
                        organism = Bacillus licheniformis
SEQUENCE: 113
gtatgaggaa ctgatggcat ctgcaggcta tatcagcgcg tctacagtcc aggaagcaag    60
aagcagctat gattccattt acgacatcgt gtcacagtac gatttagagg accttttctct  120
gtttgacagc gaaaagtgga aggtgctttc aaaaaaagac atcgaaaacc tggacaaata   180
tttcgacttt ctcgtgcagg aagcaagcag ccgaaacaaa aactgaatac ttctccgcgg   240
cacactctcc tctctatcat tttcgtctgt ttacgatcct gctgttattt tatcccttat   300
gttaactttt gtcaatattt ttcctgtcta agtatttcct atagtcaaca tttgtattaa   360
aatgttcata tcatgaattt gcgggggggga tggcgatgac aaggttcggc gagcggctca   420
aagagctgag ggaacaaaga agcctgtcgg ttaatcagct tgccatgtat gccggtgtga   480
gcgccgcagc catttccaga                                               500

SEQ ID NO: 114          moltype = DNA   length = 500
FEATURE                 Location/Qualifiers
source                  1..500
                        mol_type = other DNA
                        organism = Bacillus licheniformis
SEQUENCE: 114
atcgaaaacg gccaccgcgg cgttcccaag cccgcgacga tcagaaaatt ggccgaggct    60
ctgaaaatgc cgtacgagca gctcatggat attgccggtt atatgagagc tgacgagatt   120
cgcgaacagc cgcgcggcta tgtcacgatg caggagatcg cggccaagca cggcgtcgaa   180
gacctgtggc tgtttaaacc cgagaaatgg gactgtttgt cccgcgaaga cctgctcaac   240
ctcgaacagt attttcattt tttggttaat gaagcgaaga agcgccaatc ataaaaagcc   300
gaatttccct tttaggagaa gttcggcttt tttcggctgc cttaagcgga atccggattc   360
ggcgtcttgc ctttatgatg cttaacgggg ctcagcgcac gctcgagcca tcccatgaac   420
agatcggcga tgatcgccat cagcgccgtc gggatcgcgc tgctagaat gatcgctgtt    480
ccgttggtcg cgtttgatcc                                               500

SEQ ID NO: 115          moltype = DNA   length = 1000
FEATURE                 Location/Qualifiers
misc_feature            1..1000
                        note = rghR2 duplication editing template
source                  1..1000
                        mol_type = other DNA
                        organism = synthetic construct
SEQUENCE: 115
gtatgaggaa ctgatggcat ctgcaggcta tatcagcgcg tctacagtcc aggaagcaag    60
aagcagctat gattccattt acgacatcgt gtcacagtac gatttagagg accttttctct  120
gtttgacagc gaaaagtgga aggtgctttc aaaaaaagac atcgaaaacc tggacaaata   180
tttcgacttt ctcgtgcagg aagcaagcag ccgaaacaaa aactgaatac ttctccgcgg   240
cacactctcc tctctatcat tttcgtctgt ttacgatcct gctgttattt tatcccttat   300
gttaactttt gtcaatattt ttcctgtcta agtatttcct atagtcaaca tttgtattaa   360
aatgttcata tcatgaattt gcgggggggga tggcgatgac aaggttcggc gagcggctca   420
aagagctgag ggaacaaaga agcctgtcgg ttaatcagct tgccatgtat gccggtgtga   480
gcgccgcagc catttccaga atcgaaaacg gccaccgcgg cgttcccaag cccgcgacga   540
tcagaaaatt ggccgaggct ctgaaaatgc cgtacgagca gctcatggat attgccggtt   600
atatgagagc tgacgagatt cgcgaacagc cgcgcggcta tgtcacgatg caggagatcg   660
```

```
cggccaagca cggcgtcgaa gacctgtggc tgtttaaacc cgagaaatgg gactgtttgt    720
cccgcgaaga cctgctcaac ctcgaacagt attttcattt tttggttaat gaagcgaaga    780
agcgccaatc ataaaaagcc gaatttccct tttaggagaa gttcggcttt ttcggctgc     840
cttaagcggc atccggattc ggcgtcttgc ctttatgatg cttaacgggg ctcagcgcac    900
gctcgagcca tccatgaac agatcggcga tgatcgccat cagcgccgtc gggatcgcgc     960
ctgctagaat gatcgctgtt ccgttggtcg cgtttgatcc                         1000

SEQ ID NO: 116          moltype = DNA   length = 20
FEATURE                 Location/Qualifiers
source                  1..20
                        mol_type = other DNA
                        organism = Bacillus licheniformis
SEQUENCE: 116
gcgaatcgaa aacggaaagc                                                20

SEQ ID NO: 117          moltype = DNA   length = 20
FEATURE                 Location/Qualifiers
misc_feature            1..20
                        note = rghR2 locus forward
source                  1..20
                        mol_type = other DNA
                        organism = synthetic construct
SEQUENCE: 117
gcgaatcgaa aacggaaagc                                                20

SEQ ID NO: 118          moltype = DNA   length = 20
FEATURE                 Location/Qualifiers
misc_feature            1..20
                        note = rghR2 locus reverse
source                  1..20
                        mol_type = other DNA
                        organism = synthetic construct
SEQUENCE: 118
tcatcgcgat cggcattacg                                                20

SEQ ID NO: 119          moltype = DNA   length = 1146
FEATURE                 Location/Qualifiers
misc_feature            1..1146
                        note = Edited rghR2 locus
source                  1..1146
                        mol_type = other DNA
                        organism = synthetic construct
SEQUENCE: 119
gcgaatcgaa aacggaaagc gcggcgtgcc gaagccggcg acgatcagaa aactggcgga     60
cgctttgaaa gtcccgtatg aggaactgat ggcatctgca ggctatatca gcgcgtctac    120
agtccaggaa gcaagaagca gctatgattc catttacgac atcgtgtcac agtacgattt    180
agaggacctt tctctgtttg acagcgaaaa gtggaaggtg ctttcaaaaa aagacatcga    240
aaacctggac aaatatttcg actttctcgt gcaggaagca agcagccgaa acaaaaactg    300
aatacttctc cgcggcacac tctcctctct atcattttcg tctgtttacg atcctgctgt    360
tatttatcc cttatgttaa ctttgtcaa tatttttcct gtctaagtat ttcctatagt      420
caacatttgt attaaaatgt tcatatcatg aatttgcggt ggggatggcg atgacaaggt    480
tcggcgagcg gctcaaagag ctgagggaac aaagaagcct gtcggttaat cagcttgcca    540
tgtatgccgg tgtgagcgcc gcagccattt ccagaatcga aaacggccac cgcggcgttc    600
ccaagcccgc gacgatcaga aaattggccg aggctctgaa atgccgtac gagcagctca     660
tggatattgc cggttatatg agagctgacg agattgcga acagccgcgc ggctatgtca    720
cgatgcagga gatcgcggcc aagcacggcg tcgaagacct gtggctgttt aaacccgaga    780
aatgggactg tttgtcccgc gaagaccgc tcaacctcga acagtatttt cattttttgg     840
ttaatgaagc gaagaagcgc caatcataaa agccgaattt ccctttttag gagaagttcg    900
gctttttcg gctgccttaa gcggcatccg gattcggcgt cttgcccttta tgatgcttaa    960
cgggggctcag cgcacgatcg agccatccca tgaacagatc ggcgatgatc gccatcagcg    1020
ccgtcgggat cgcgcctgct agaatgatcg ctgttccgtt ggtcgcgttt gatccctga     1080
caatgatatc cccgaggccg cctgcgccga caaacgtgcc gatggccgta atgccgatcg    1140
cgatga                                                              1146

SEQ ID NO: 120          moltype = DNA   length = 20
FEATURE                 Location/Qualifiers
misc_feature            1..20
                        note = rghR2 sequencing primer
source                  1..20
                        mol_type = other DNA
                        organism = synthetic construct
SEQUENCE: 120
tttcgacttt ctcgtgcagg                                                20

SEQ ID NO: 121          moltype = DNA   length = 23
FEATURE                 Location/Qualifiers
source                  1..23
                        mol_type = other DNA
                        organism = Bacillus licheniformis
```

```
SEQUENCE: 121
ctttccgatc acaagttgtc cgg                                              23

SEQ ID NO: 122          moltype = DNA   length = 23
FEATURE                 Location/Qualifiers
source                  1..23
                        mol_type = other DNA
                        organism = Bacillus licheniformis
SEQUENCE: 122
tttccgatca caagttgtcc ggg                                              23

SEQ ID NO: 123          moltype = DNA   length = 23
FEATURE                 Location/Qualifiers
source                  1..23
                        mol_type = other DNA
                        organism = Bacillus licheniformis
SEQUENCE: 123
aggcccggac aacttgtgat cgg                                              23

SEQ ID NO: 124          moltype = DNA   length = 23
FEATURE                 Location/Qualifiers
source                  1..23
                        mol_type = other DNA
                        organism = Bacillus licheniformis
SEQUENCE: 124
gagttttaaa tggcgaaagg agg                                              23

SEQ ID NO: 125          moltype = DNA   length = 23
FEATURE                 Location/Qualifiers
source                  1..23
                        mol_type = other DNA
                        organism = Bacillus licheniformis
SEQUENCE: 125
ttaaatggcg aaaggaggcc cgg                                              23

SEQ ID NO: 126          moltype = DNA   length = 23
FEATURE                 Location/Qualifiers
source                  1..23
                        mol_type = other DNA
                        organism = Bacillus licheniformis
SEQUENCE: 126
gcagagtttt aaatggcgaa agg                                              23

SEQ ID NO: 127          moltype = DNA   length = 23
FEATURE                 Location/Qualifiers
source                  1..23
                        mol_type = other DNA
                        organism = Bacillus licheniformis
SEQUENCE: 127
acactcagca gagttttaaa tgg                                              23

SEQ ID NO: 128          moltype = DNA   length = 23
FEATURE                 Location/Qualifiers
source                  1..23
                        mol_type = other DNA
                        organism = Bacillus licheniformis
SEQUENCE: 128
aactctgctg agtgtcgccg ggg                                              23

SEQ ID NO: 129          moltype = DNA   length = 23
FEATURE                 Location/Qualifiers
source                  1..23
                        mol_type = other DNA
                        organism = Bacillus licheniformis
SEQUENCE: 129
aaaactctgc tgagtgtcgc cgg                                              23

SEQ ID NO: 130          moltype = DNA   length = 23
FEATURE                 Location/Qualifiers
source                  1..23
                        mol_type = other DNA
                        organism = Bacillus licheniformis
SEQUENCE: 130
aaactctgct gagtgtcgcc ggg                                              23

SEQ ID NO: 131          moltype = DNA   length = 23
FEATURE                 Location/Qualifiers
source                  1..23
                        mol_type = other DNA
```

```
                              organism = Bacillus licheniformis
SEQUENCE: 131
cattgaaatc ggcgtatccc cgg                                              23

SEQ ID NO: 132          moltype = DNA   length = 23
FEATURE                 Location/Qualifiers
source                  1..23
                        mol_type = other DNA
                        organism = Bacillus licheniformis
SEQUENCE: 132
cggggatacg ccgatttcaa tgg                                              23

SEQ ID NO: 133          moltype = DNA   length = 23
FEATURE                 Location/Qualifiers
source                  1..23
                        mol_type = other DNA
                        organism = Bacillus licheniformis
SEQUENCE: 133
aatcagcttg ccattgaaat cgg                                              23

SEQ ID NO: 134          moltype = DNA   length = 23
FEATURE                 Location/Qualifiers
source                  1..23
                        mol_type = other DNA
                        organism = Bacillus licheniformis
SEQUENCE: 134
ttcaatggca agctgattta agg                                              23

SEQ ID NO: 135          moltype = DNA   length = 23
FEATURE                 Location/Qualifiers
source                  1..23
                        mol_type = other DNA
                        organism = Bacillus licheniformis
SEQUENCE: 135
gattgtgttc aatcatgtac tgg                                              23

SEQ ID NO: 136          moltype = DNA   length = 23
FEATURE                 Location/Qualifiers
source                  1..23
                        mol_type = other DNA
                        organism = Bacillus licheniformis
SEQUENCE: 136
attagaaagg ggagtaatca tgg                                              23

SEQ ID NO: 137          moltype = DNA   length = 23
FEATURE                 Location/Qualifiers
source                  1..23
                        mol_type = other DNA
                        organism = Bacillus licheniformis
SEQUENCE: 137
aaacataaga gattagaaag ggg                                              23

SEQ ID NO: 138          moltype = DNA   length = 23
FEATURE                 Location/Qualifiers
source                  1..23
                        mol_type = other DNA
                        organism = Bacillus licheniformis
SEQUENCE: 138
gaaacataag agattagaaa ggg                                              23

SEQ ID NO: 139          moltype = DNA   length = 23
FEATURE                 Location/Qualifiers
source                  1..23
                        mol_type = other DNA
                        organism = Bacillus licheniformis
SEQUENCE: 139
agaaacataa gagattagaa agg                                              23

SEQ ID NO: 140          moltype = DNA   length = 1748
FEATURE                 Location/Qualifiers
misc_feature            1..1748
                        note = amylase expression cassette
source                  1..1748
                        mol_type = other DNA
                        organism = synthetic construct
SEQUENCE: 140
tcgctgataa acagctgaca tcaactaaaa gcttcattaa atactttgaa aaagttgtt      60
gacttaaaag aagctaaatg ttatagtaat aaaacagaat agtcttttaa gtaagtctac    120
tctgaatttt tttaaaagga gagggtaaag aatgaaacaa caaaaacggc tttacgcccg    180
```

```
attgctgacg ctgttatttg cgctcatctt ctttgctgcct cattctgcag ctagcgcagc    240
agcgacaaac ggaacaatga tgcagtattt cgagtggtat gtacctaacg acggccagca    300
atggaacaga ctgagaacag atgccccta cttgtcatct gttggtatta acgcagtatg    360
gacaccgccg gcttataagg gcacgtctca agcagatgtg gggtacggcc cgtacgatct    420
gtatgattta ggcgagttta atcaaaaagg tacagtcaga gcgaagtatg cacaaaaggg    480
agaacttaaa tctgctgtca acacgctgca ttcaaatgga atccaagtgt atggtgatgt    540
cgtgatgaat cataaagcag gtgctgatta tacagaaaac gtaacggcgg tggaggtgaa    600
tccgtctaat agatatcagg aaatcagcgg cgaatatat attcaggcat ggacaggctt    660
caactttccg ggcagaggaa caacgtattc taactggaaa tggcagtggt tccattttga    720
tggaacggat tgggaccaga gcagaagcct ctctagaatc ttcaaattcg atggaaaggc    780
gtgggactgg ccggtttctt cagaaaacg aaattatgac tatctgatgt acgcggacta    840
tgattatgac catccggatg tcgtgaatga aatgaaaaag tggggcgtct ggtatgccaa    900
cgaagttggg ttagatggat acagacttga cgcggtcaaa catattaaat ttagctttct    960
caaagactgg gtggataacg caagagcagc gacgggaaaa gaatgttta cggttggcga   1020
atattggcaa aatgatttag gggccctgaa taactacctg gcaaaggtaa attacaacca   1080
atctcttttt gatgcgccgt tgcattacaa ctttacgct gcctcaacag ggggtggata   1140
ttacgatatg agaaatattc ttaataacac gttagtcgca agcaatccga caaaggctgt   1200
tacgttagtt gagaatcatg acacacagcc tggacaatca ctggaatcaa cgggttggcga   1260
gtggttaaaa ccgttagcct acgcgtttat tctcacgaga agcggaggct atccttctgt   1320
atttatgga gatatgtacg gtacaaaagg aacgacaaca agagagatcc ctgctcttaa   1380
atctaaaatc gaacctttgc ttaaggctag aaaagactat gcttatgaa cacagagaga   1440
ctatattgat aaccccggatg tcattggctg gacgagagaa ggggactcaa cgaaagccaa   1500
gagcggtctg gccacagtga ttacagatgg gccgggcgt tcaaaaagaa tgtatgttgg   1560
cacgagcaat gcgggtgaaa tctggtatga tttgacaggg aatagaacag ataaaatcac   1620
gattggaagc gatggctatg caacattcc tgtcaataag gaatcagttt cagtatgggt   1680
gcagcaatga aagcttctcg aggttaacag aggacggatt tcctgaagga aatccgttt   1740
tttattt                                                               1748

SEQ ID NO: 141          moltype = DNA   length = 1759
FEATURE                 Location/Qualifiers
misc_feature            1..1759
                        note = amylase expression cassette
source                  1..1759
                        mol_type = other DNA
                        organism = synthetic construct
SEQUENCE: 141
gtcgctgata aacagctgac atcaatatcc tattttttca aaaatattt taaaagttg      60
ttgacttaaa agaagctaaa tgttatagta ataaaacaga atagtctttt aagtaagtct    120
actctgaatt tttttaaaag gagagggtaa agaatgaaac aacaaaaacg gctttacgcc    180
cgattgctga cgctgttatt tgcgctcatc ttccttgctgc ctcattctgc agctagcgca    240
gccgcaccgt ttaacggtac catgatgcag tattttgaat ggtacttgcc ggatgatggc    300
acgttatgga ccaaagtggc caatgaagcc aacaactat ccagccttgg catcaccgct    360
ctttgcctgc cgcccgctta caaaggaaca agccgcacgc acgtagggta cggagtatac    420
gacttgtatg acctcggcga attcaatcaa aaagggaccg tccgcacaaa atatggaaca    480
aaagctcaat atcttcaagc cattcaagcc gcccacgccg ctggaatgca agtgtacgcc    540
gatgtcgtgt tcgaccataa aggcggcgct gacggcacgg aatgggtgga cgccgtcgaa    600
gtcaatccgt ccgaccgcaa ccaagaaatc tcgggcacct atcaaatcca agcatggacg    660
aaatttgatt ttcccgggcg gggcaacacc tactccagct ttaagtgcg ctggtaccat    720
tttgacggcg ttgattggga cgaaagccga aaattaagcc gcatttacaa attcagggggc    780
atcggcaaag cgtgggattg gccggtagac acagaaaacg gaaactatga ctacttaatg    840
tatgccgacc ttgatatgga tcatcccgaa gtcgtgaccg agctgaaaaa ctggggggaaa    900
tggtatgtca acacaacgaa cattgatggg ttccggcttg atgccgtcaa gcatattaag    960
ttcagtttttt ttcctgattg gttgtcgtat gtgcgttctc agactggcaa gccgctattt   1020
accgtcgggg aatattggag ctatgacatc aacaagttgc acaattacat tacgaaaaca   1080
aacggaacga tgtctttgtt gatgcccccg ttacacaacg aattttatac cgcttccaaa   1140
tcaggggggcg catttgatat gcgcacgtta atgaccaata ctctcatgaa agatcaaccg   1200
acattggccg tcaccttcgt tgataatcat gacaccgaac ccggccaagc gcttcagtca   1260
tgggtcgacc catggttcaa accgttggct tacgccttta tctctaactcg gcaggaagga   1320
taccccgtca tcttttatgg tgactattat ggcattccac aatataacat tccttcgctg   1380
aaaagcaaaa tcgatccgct cctcatcgcg cgcagggatt atgcttacg aacgcaacat   1440
gattatcttg atcactccga catcatcggg tggacaaggg aagggtcac tgaaaaacca   1500
ggatccgggc tggccgcact gatcaccgat gggccgggag aagcaaatg gatgtacgtt   1560
ggcaaacaac acgctggaaa agtgttctat gaccttaccg caaccggag tgacaccgtc   1620
accatcaaca gtgatggatg gggggaattc aaagtcaatg gcggttcggt ttcggtttgg   1680
gttcctagaa aaacgaccta aaagcttctc gaggttaaca gaggacggat tcctgaagg   1740
aaatccgttt tttatttt                                                 1759

SEQ ID NO: 142          moltype = DNA   length = 1581
FEATURE                 Location/Qualifiers
misc_feature            1..1581
                        note = expression cassette, synthetic sequence
source                  1..1581
                        mol_type = other DNA
                        organism = synthetic construct
SEQUENCE: 142
gtcgctgata aacagctgac atcaatatcc tattttttca aaaatattt taaaagttg      60
ttgacttaaa agaagctaaa tgttatagta ataaaacaga atagtctttt aagtaagtct    120
actctgaatt tttttaaaag gagagggtaa agaatgaaac aacaaaaacg gctttacgcc    180
cgattgctga cgctgttatt tgcgctcatc ttccttgctgc ctcattctgc agcttcagca    240
```

```
gctgatcaag caggaaaaag cccggcaggc gtcagatatc atggcggtga tgaaatcatc    300
cttcagggct ttcattggaa cgtcgtcaga gaagcgccgt ataactggta taacatcctg    360
agacaacaag cgagcacaat tgccgctgat ggcttttccg caatctggat gccggttccg    420
tggagagatt ttagcagctg gacggatgga gataaaagcg gaggcggcga aggatatttt    480
tggcatgact ttaacaaaaa cggccgctat ggaagcgatg ctcaactgga caagcagca    540
ggagcacttg gaggagcagg agtcaaagtc ctgtacgatg tcgtcccgaa ccatatgaac    600
cgcttttatc cggacaaaga aatcaatctg ccggcaggcc aaagattttg gagaaacgat    660
tgcccggacc cggaaatgg accgaatgat tgcgatgatg gcgatagatt tctgggcggc    720
gaagcggatc tgaatacagg ccatccgcaa atctatgcga tgtttcggga cgaatttacg    780
aatctgagaa gcggatatgg agcggcgga tttcgctttg attttgtcag aggctatgcc    840
ccggaaagag ttgatagctg gatgagcgat tcagcggata gcagcttttg cgtcggcgaa    900
ctttggaaag aaccgagcga atatccgccg tgggattgga gaaatacagc gagctggcag    960
cagatcatca aagattggag cgatagagca aaatgcccgg tctttgactt tgccctgaaa   1020
gaacgcatgc aaaatggaag cgtcgccgat tggaaacatg gcctgaaccg gaaaatccggac  1080
ccgagatgga gagaagtcgc cgtcacgttt gtcgataacc atgacacagg atatagcccg   1140
ggacaaaatg gaggacaaca taaatggccg cttcaagatg gccttatcag acaggcgtat   1200
gcctatatcc ttacatcacc gggaacaccg gttgtttatt ggccgcatat gtatgattgg   1260
ggctatgtcg atttcatccg ccaactgatc caggttagaa gaacagcgag agtcagagcg   1320
gatagcgcca ttagctttca tagcggctat agcggacttg tcgctacagt tagcggcagc   1380
caacaaacac tggtcgtcgc cctgaatagc gatctggcaa atccgggaca agttgctagc   1440
ggcagcttta gcgaagcagt caatgccagc aatggccaag tcagagtctg gaagcggga   1500
agcggagatg gaggaggaaa tgacggcggc taaaagagca gagaggacgg atttcctgaa   1560
ggaaatccgt ttttttattt t                                             1581

SEQ ID NO: 143         moltype = DNA   length = 1452
FEATURE                Location/Qualifiers
misc_feature           1..1452
                       note = Synthetic Cytophaga sp. variant #2 amylase
                        expression cassette
source                 1..1452
                       mol_type = other DNA
                       organism = synthetic construct
SEQUENCE: 143
gcagcgacaa acggaacaat gatgcagtat ttcgagtggt atgtacctaa cgacggccag    60
caatggaaca gactgagaac agatgccccct tacttgtcat ctgttggtat tacagcagta   120
tggacaccgc cggcttataa gggcacgtct caagcagatg tggggtacgg cccgtacgat   180
ctgtatgatt taggcgagtt taatcaaaaa ggtacagtca gaacgaagta tggcacaaaa   240
ggagaactta atctgctgtg caacacgctg cattcaaatg gaatccaagt gtatggtgat   300
gtcgtgatga atcataaagc aggtgctgat tatacagaaa acgtaacggc ggtggaggtg   360
aatccgtcta atagatatca ggaaacgagc ggcgaatata atattcaggc atggacaggc   420
ttcaacttc cgggcagagg aacaacgtat tctaactgga atggcagtgt ttccattttt   480
gatggaacgg attgggacca gagcagaagc ctctctagaa tcttcaaatt ccatggaaag   540
gcgtgggact ggccggtttc ttcagaaaac ggaaattatg actatctgat gtacgcggac   600
tatgattatg accatccgga tgtcgtgaat gaaatgaaaa agtggggcgt ctggtatgcc    660
aacgaagttg ggttagatgg atacagactt gacgcggtca acatattaa atttagctttc   720
ctcaaagact gggtggataa cgcaagagca gcgacgggaa agaaatgtt tacggttggc    780
gaattttggc aaaaatgattt aggggcccct gaaataactacc tggcaaaggt aaattacaac   840
caatctcttt tgatgcgcc gttgcattac aactttttacg ctgcctcaac agggggtgga   900
gcgtacgata tgaaatat tcttaataac acgttagtcg caagcaatcc gacaaggct     960
gttacgttag ttgagaatca tgacacacag cctggacaat cactggaatc aacagtccaa   1020
ccgtggttta aaccgttagc ctacgcgttt attctccgtg gaagcggaag ctatcctcg   1080
gtatttttatg gagatatgta cggtacaaaa ggaacgacaa catatgagat ccctgctctt   1140
aaatctaaaa tcgaaccttt gcttaaggct agaaaagact atgcttatgg aacacagaga   1200
gactatattg ataaccccga tgtcattggc tggacgagag aaggggactc aacgaaagcc   1260
aagagcggtc tggccacagt gattacagat gggccgggcg gttcaaaaag aatgtatgtt   1320
ggcacgagca atgcgggtga aatctggtat gatttgacag ggaatagaac agataaaatc   1380
acgattggaa gcgatggcta tgcaacattt cctgtcaatg ggggctcagt ttcagtatgg   1440
gtgcagcaat ga                                                        1452

SEQ ID NO: 144         moltype = DNA   length = 846
FEATURE                Location/Qualifiers
misc_feature           1..846
                       note = synthetic allele glcT1 sequence
source                 1..846
                       mol_type = other DNA
                       organism = synthetic construct
SEQUENCE: 144
gtgaacagat cctttaccgt tgaaaaggta ctcaacaaca acgtttttaat cgctctccat    60
gattacaca gagaagttgt cttgattggc aaaggaatcg gttttggtaa aaagcgcgga   120
gatcttatcg aacatgagaa ctacgaaaaa atgtttatcc tggaaaatga taaggaacaa   180
tcgcagtata agaagctctt cacttatgtc gatgaaaaaa tggttgatat cgccaatgat   240
gtcatctacc atatcgcgca aaaaatcggc cagccgctga cgaacacat tcatgtcgcc   300
ctgacggacc atatcgcatt tgcagttaag cgtctagaaa agggatttga tatgaaaaat   360
ccgttttttgc ttgagacgga atcgctttat ccgaaggaat acgaagtcgc caaggaagcc   420
gtcgatatga ttaatgaaaa atccgacatt cagctgcctg aaggtgaaat cgggttcatc   480
gcgcttcata tccacagtgc gatgacaaac cgcccgcttt ctgaagtcaa tcagcattca   540
caactgatct ccaggcttgt ccaggtcatc gaagattcat tccagatgca agtcaacagg   600
gaaagcgtga actatttgcg gctgatcagg cacttgcgct ttacgattga caggataaaa   660
cgggacgagc cgattcagga accggaaaaa ttaatgttgt tgttgaaaac ggaatatccg   720
```

-continued

```
ctgtgttaca atactgcttg gaagatgatc aagatcttgc agcaagcgct caagaaaccg    780
gttcatgagg cagaagccgt ttatttgaca ttgcatttgt accgtttgac taataaaatt    840
tcataa                                                                846
```